US006485081B1

(12) United States Patent
Bingle et al.

(10) Patent No.: US 6,485,081 B1
(45) Date of Patent: Nov. 26, 2002

(54) SAFETY SYSTEM FOR A CLOSED COMPARTMENT OF A VEHICLE

(75) Inventors: Robert L. Bingle, Holland, MI (US); Roger L. Koops, Hamilton, MI (US); Niall R. Lynam, Holland, MI (US); Kevin C. McCarthy, Tucson, AZ (US); Eric J. Hoekstra, Holland, MI (US); Kenneth Schofield, Holland, MI (US); Eugenie V. Uhlmann, Tucson, AZ (US); Gimtong Teowee, Tucson, AZ (US); Brent J. Bos, Tucson, AZ (US); David W. Taylor, Fenton, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/648,560

(22) Filed: Aug. 25, 2000

Related U.S. Application Data

(63) Continuation-in-part of application No. 09/605,233, filed on Jun. 28, 2000, now Pat. No. 6,254,261, which is a continuation-in-part of application No. 09/516,831, filed on Mar. 1, 2000, now Pat. No. 6,390,529, and a continuation-in-part of application No. 09/484,754, filed on Jan. 18, 2000, which is a continuation of application No. 09/275,565, filed on Mar. 24, 1999, now Pat. No. 6,086,131.

(60) Provisional application No. 60/135,393, filed on May 21, 1999.

(51) Int. Cl.[7] .......................... E05B 65/10; E05B 65/12; B62D 25/10; G08B 19/00

(52) U.S. Cl. .............................. 296/76; 49/141; 70/264; 292/DIG. 43; 292/DIG. 65; 340/425.5

(58) Field of Search .............................. 296/76; 70/256, 70/264; 292/DIG. 29, DIG. 43, DIG. 65; 49/141; 340/522, 425.5

(56) References Cited

U.S. PATENT DOCUMENTS 1,523,495 A 1/1925 Silberman .................... 362/501
1,629,456 A 5/1927 Pellegrini .................... 362/501
1,684,499 A 9/1928 Mayer ...................... 292/336.3

(List continued on next page.)

FOREIGN PATENT DOCUMENTS

DE 2636099 2/1978
DE 3732936 9/1987
DE 9006007 6/1991

(List continued on next page.)

OTHER PUBLICATIONS

Prosecution File for Reissue Application 09/344,384, filed Jun. 24, 1999, for Reissue of U.S. Patent 5,859,479 already of record.

Commonly assigned, co–pending U.S. patent application, Ser. No. 09/484,754 filed Jan. 18, 2000 by McCarthy et al.

Commonly assigned, co–pending U.S. patent Application, Ser. No. 09/605,233 filed Jun. 28, 2000 by Bingle et al.

"Kit 62 Movement Detector Components", Sep. 24, 1994 p. 1–5.

*Primary Examiner*—D. Glenn Dayoan
*Assistant Examiner*—Hilary Gutman
(74) *Attorney, Agent, or Firm*—Van Dyke, Gardner, Linn & Burkhart, LLP

(57) ABSTRACT

A release system adapted for use in opening a deck lid of a vehicle includes a gas operable assist device and at least one of a manual input device and an occupant detector. The release system is positionable within a compartment at least partially closed by the deck lid. The compartment has a release mechanism for opening the deck lid and the release system is adapted for operation from the interior of the compartment. The gas operable assist device is connectable to the release mechanism and is operable to actuate the release mechanism to open the deck lid in response to a user input to the manual input device or a detection of an occupant within the compartment by the occupant detector. The gas operable assist device includes at least one of a compressed gas container and a pyrotechnic element.

46 Claims, 22 Drawing Sheets

U.S. PATENT DOCUMENTS

| | | | | | |
|---|---|---|---|---|---|
| 1,721,347 | A | | 7/1929 | Macrae et al. | 362/501 |
| 2,117,160 | A | | 5/1938 | Gale | 292/336.3 |
| 2,360,227 | A | | 10/1944 | Hemphill | 362/464 |
| 2,688,865 | A | | 9/1954 | Foster et al. | 70/129 |
| 2,760,050 | A | | 8/1956 | Porsche | 362/501 |
| 3,016,968 | A | * | 1/1962 | Lenz et al. | 292/DIG. 43 |
| 3,241,344 | A | | 3/1966 | Peters | 70/279 |
| 3,553,448 | A | | 1/1971 | Davis et al. | 240/7.1 |
| 3,582,639 | A | * | 6/1971 | Chamberlain | 362/496 |
| 3,596,484 | A | * | 8/1971 | Peters | 292/DIG. 43 |
| 3,678,716 | A | | 7/1972 | Cobb | 70/92 |
| 3,759,556 | A | * | 9/1973 | Wright | 292/DIG. 65 |
| 3,766,539 | A | | 10/1973 | Bradshaw et al. | 340/258 |
| 3,829,693 | A | | 8/1974 | Schwarz | 250/338 |
| 3,839,640 | A | | 10/1974 | Rossin | 250/353 |
| 3,956,732 | A | | 5/1976 | Teich | 340/64 |
| 3,992,909 | A | * | 11/1976 | McGhee | 70/92 |
| 4,007,955 | A | | 2/1977 | Kobayashi | 292/216 |
| 4,052,716 | A | | 10/1977 | Mortensen | 340/233 |
| 4,080,812 | A | * | 3/1978 | Knott | 70/256 |
| 4,122,371 | A | | 10/1978 | Talmage et al. | 362/464 |
| 4,127,966 | A | * | 12/1978 | Schmidt | 49/141 |
| 4,155,233 | A | * | 5/1979 | Lira | 70/92 |
| 4,166,955 | A | | 9/1979 | Keller | 250/342 |
| 4,242,669 | A | | 12/1980 | Crick | 340/567 |
| 4,312,197 | A | | 1/1982 | Carrion et al. | 70/135 |
| 4,318,089 | A | | 3/1982 | Frankel et al. | 340/567 |
| 4,322,959 | A | | 4/1982 | Mochida | 70/241 |
| 4,342,210 | A | | 8/1982 | Denningham | 70/278 |
| 4,365,232 | A | | 12/1982 | Miller | 362/464 |
| 4,371,205 | A | | 2/1983 | Kaveney, Jr. | 292/48 |
| 4,379,971 | A | | 4/1983 | Smith et al. | 250/342 |
| 4,384,207 | A | | 5/1983 | Doctor | 250/349 |
| 4,418,335 | A | | 11/1983 | Genähr | 340/565 |
| 4,437,003 | A | | 3/1984 | Doctor | 250/338 |
| 4,441,023 | A | | 4/1984 | Doctor et al. | 250/338 |
| 4,464,649 | A | * | 8/1984 | Her | 340/471 |
| 4,468,657 | A | | 8/1984 | Rossin | 340/555 |
| 4,507,654 | A | | 3/1985 | Stolarczyk et al. | 340/545 |
| 4,556,796 | A | | 12/1985 | Renals | 250/338 |
| 4,604,524 | A | | 8/1986 | Kotlicki et al. | 250/342 |
| 4,612,442 | A | | 9/1986 | Toshimichi | 250/353 |
| 4,645,233 | A | | 2/1987 | Bruse et al. | 280/808 |
| 4,667,990 | A | | 5/1987 | Quantz | 292/201 |
| 4,697,081 | A | | 9/1987 | Baker | 250/338 |
| 4,704,533 | A | | 11/1987 | Rose et al. | 250/342 |
| 4,709,153 | A | | 11/1987 | Schofield | 250/353 |
| 4,745,284 | A | | 5/1988 | Masuda et al. | 250/338 |
| 4,746,910 | A | | 5/1988 | Pfister et al. | 340/567 |
| 4,752,768 | A | | 6/1988 | Steers et al. | 340/567 |
| 4,764,755 | A | | 8/1988 | Pedtke et al. | 340/541 |
| 4,775,347 | A | | 10/1988 | Takada et al. | 445/44 |
| 4,797,657 | A | | 1/1989 | Vorzimmer et al. | 340/541 |
| 4,825,079 | A | | 4/1989 | Takamatsu et al. | 250/338.3 |
| 4,848,114 | A | | 7/1989 | Rippe | 70/263 |
| 4,848,509 | A | | 7/1989 | Bruhnke et al. | 180/297 |
| 4,857,912 | A | | 8/1989 | Everett, Jr. et al. | 340/825.3 |
| 4,868,390 | A | | 9/1989 | Keller et al. | 250/338.3 |
| 4,881,148 | A | * | 11/1989 | Lambropoulos et al. | 361/172 |
| 4,895,009 | A | | 1/1990 | Kleefeldt et al. | 70/264 |
| 4,928,212 | A | | 5/1990 | Benavides | 362/501 |
| 4,930,864 | A | | 6/1990 | Kuster et al. | 350/167 |
| 4,933,668 | A | | 6/1990 | Oyer et al. | 340/541 |
| 4,952,808 | A | | 8/1990 | Turnbull et al. | 250/338.3 |
| 4,954,813 | A | | 9/1990 | August, Sr. et al. | 340/571 |
| 4,979,384 | A | | 12/1990 | Malesko et al. | 70/241 |
| 4,981,314 | A | | 1/1991 | Carr | 292/347 |
| 4,982,094 | A | | 1/1991 | Matsuda | 250/342 |
| 5,003,800 | A | * | 4/1991 | Bublewicz | 70/264 |
| 5,027,104 | A | | 6/1991 | Reid | 340/541 |
| 5,030,012 | A | | 7/1991 | Hagins et al. | 374/31 |
| 5,045,702 | A | | 9/1991 | Mulleer | 250/342 |
| 5,054,826 | A | | 10/1991 | Dow et al. | 292/125 |
| 5,063,371 | A | | 11/1991 | Oyer et al. | 340/541 |
| 5,071,160 | A | | 12/1991 | White et al. | 280/735 |
| 5,077,549 | A | | 12/1991 | Hershkovitz et al. | 340/567 |
| 5,084,696 | A | | 1/1992 | Guscott et al. | 340/541 |
| 5,093,656 | A | | 3/1992 | Dipoala | 340/522 |
| 5,174,643 | A | | 12/1992 | Priesemuth | 362/464 |
| 5,216,407 | A | | 6/1993 | Hwang | 340/426 |
| 5,219,413 | A | | 6/1993 | Lineberger | 180/272 |
| 5,283,551 | A | | 2/1994 | Guscott | 340/567 |
| 5,297,010 | A | | 3/1994 | Camarota et al. | 362/540 |
| 5,317,620 | A | | 5/1994 | Smith | 379/40 |
| 5,406,171 | A | | 4/1995 | Moody | 362/464 |
| 5,409,273 | A | * | 4/1995 | Claar et al. | 292/DIG. 43 |
| 5,424,711 | A | | 6/1995 | Müller et al. | 340/426 |
| 5,424,712 | A | | 6/1995 | Rosenberger | 340/426 |
| 5,424,718 | A | | 6/1995 | Müller et al. | 340/567 |
| 5,445,326 | A | * | 8/1995 | Ferro et al. | 292/DIG. 43 |
| 5,482,314 | A | | 1/1996 | Corrado et al. | 280/735 |
| 5,488,610 | A | | 1/1996 | Schwarz | 340/521 |
| 5,580,153 | A | | 12/1996 | Motz | 362/496 |
| 5,581,230 | A | | 12/1996 | Barrett | 362/501 |
| 5,585,625 | A | | 12/1996 | Spies | 250/221 |
| 5,636,536 | A | | 6/1997 | Kinnucan | 70/107 |
| 5,663,704 | A | | 9/1997 | Allen et al. | 340/426 |
| 5,693,943 | A | | 12/1997 | Tchernihovski et al. | 250/342 |
| 5,711,559 | A | | 1/1998 | Davis | 292/340 |
| 5,719,551 | A | * | 2/1998 | Flick | 340/426 |
| 5,726,629 | A | | 3/1998 | Yu | 340/565 |
| 5,737,083 | A | | 4/1998 | Owechko et al. | 356/375 |
| 5,793,291 | A | * | 8/1998 | Thornton | 340/425.5 |
| 5,805,056 | A | | 9/1998 | Mueller et al. | 340/426 |
| 5,848,802 | A | | 12/1998 | Breed et al. | 280/735 |
| 5,859,479 | A | | 1/1999 | David | 307/10.8 |
| 5,887,466 | A | | 3/1999 | Yoshizawa | 70/257 |
| 5,933,090 | A | * | 8/1999 | Christenson | 70/256 |
| 6,018,292 | A | | 1/2000 | Penny, Jr. | 340/426 |
| 6,024,388 | A | | 2/2000 | Tomah et al. | 292/216 |
| 6,086,131 | A | | 7/2000 | Bingle et al. | 296/76 |
| 6,091,322 | A | * | 7/2000 | Ang et al. | 340/425.5 |
| 6,130,614 | A | * | 10/2000 | Miller et al. | 340/425.5 |
| 6,166,625 | A | | 12/2000 | Teowee et al. | 340/426 |
| 6,209,933 | B1 | * | 4/2001 | Ang et al. | 292/DIG. 43 |
| 6,222,442 | B1 | * | 4/2001 | Gager et al. | 340/426 |
| 6,335,687 | B1 | * | 1/2002 | Terashima et al. | 340/573.1 |
| 6,339,376 | B1 | * | 1/2002 | Okada | 340/562 |
| 6,349,984 | B1 | * | 2/2002 | Marrazzo et al. | 292/336.3 |

FOREIGN PATENT DOCUMENTS

| | | | | |
|---|---|---|---|---|
| EP | 0235372 | | 11/1986 | |
| GB | 2252438 | A | 8/1992 | |
| GB | 2266799 | A | 11/1993 | |
| JP | 58188458 | | 12/1983 | E05B/65/19 |
| WO | WO9813235 | | 4/1998 | B60R/25/10 |
| WO | WO9904119 | | 1/1999 | E05B/65/19 |

* cited by examiner

2413

SAFETY SYSTEM FOR A CLOSED COMPARTMENT OF A VEHICLE

CROSS REFERENCE TO RELATED APPLICATIONS

The present application is a continuation-in-part of U.S. patent application, Ser. No. 09/516,831, filed Mar. 1, 2000, now U.S. Pat. No. 6,390,529, and a continuation-in-part of U.S. patent application Ser. No. 09/484,754, filed Jan. 18, 2000, which claims priority on U.S. Provisional application Ser. No. 60/135,393, filed May 21, 1999, and a continuation-in-part of U.S. patent application Ser. No. 09/605,233, filed Jun. 28, 2000, now U.S. Pat. No. 6,254,261, , which is a continuation of U.S. patent application Ser. No. 09/275,565, Mar. 24, 1999, now U.S. Pat. No. 6,086,131, which are hereby incorporated by reference herein in their entireties.

FIELD OF THE INVENTION

This invention relates generally to a mechanism for opening a door to a compartment and, more particularly, to a mechanism for opening a deck lid of a vehicle from inside the space enclosed by the deck lid. This invention further relates to a sensing system to sense conditions in a compartment and to generate a response. More particularly, this invention pertains to a system that senses conditions within a vehicle compartment, such as the presence of a human or other animal, and also senses other vehicle conditions. The system responds to the sensed conditions in a predetermined manner. The response includes, for example, actuating an indicator and/or controlling a latching mechanism.

BACKGROUND OF THE INVENTION

Typically, the deck lid or door to a trunk space is opened by a key being inserted and turned in a lock cylinder from a position exteriorly of the deck lid or by a button or lever that is positioned within the passenger compartment of the vehicle. While it has been suggested that a handle be placed in the interior of the trunk space, because of numerous difficulties, to date, vehicle manufacturers have not included a device specifically for opening the trunk from the inside of the trunk space. Even fold down rear seats, which are common in many vehicles today, cannot be folded down from within the trunk space. Although placement of a release mechanism in the trunk space has been suggested in the prior art, no commercially acceptable mechanism or device has been developed. Therefore, if a person is within the trunk space when the deck lid is closed, there is no way for a person to open the deck lid and get out of the trunk.

When the deck lid is closed, the space within the trunk is typically small and very dark. Although a light source is typically provided in a trunk to provide light to the trunk space when the trunk space is open, these lights are deactivated when the trunk is closed, in order to prevent excessive drain on the battery of the vehicle. Therefore, when a person is trapped within a trunk, it is nearly impossible to see anything within the trunk, such that even if a release mechanism were operable within the trunk, a person would not be able to find the mechanism after the deck lid had been closed. Furthermore, due to the cramped and tight space within a trunk, a person's movements to reach and operate a release mechanism are extremely restricted.

This inability to open a trunk of a vehicle from inside the trunk space has unfortunately led to many injuries and even deaths over the years. When the deck lid is closed, the interior space of the trunk may reach extreme temperatures during the summer time, such that a person can only survive therein for a short period of time. Typically, these injuries and deaths occur to children, who enter the trunk to either play or hide and then trap themselves within the trunk by closing the deck lid.

Because a person trapped within the trunk of the vehicle may be a small child, the person's abilities to respond to a release mechanism within the trunk may be limited. Even if a handle, button or the like is visible to a child, the child may be too afraid to even attempt to use the device or may be too weak to activate the release mechanism. Because there is no way to detect the child within the trunk, the child may remain trapped therein until the trunk is opened from the outside.

Vehicle sensing systems typically utilize sensors to detect occupants in the passenger compartment of a vehicle. These systems utilize the sensed information for airbag deployment and/or intrusion alert. Conventional sensing-alert systems do not address the problem of preventing humans and/or pets from being trapped in a vehicle such as, for example, a vehicle cargo compartment (trunk). Automobiles are particularly dangerous as there are multiple means of entry into the trunk, for example, fold-down rear seats, remote keyless entry modules, and push-buttons or pull levers under the dashboard or beside the seat or otherwise located in the vehicle compartment that when actuated release the trunk. Typically there is no means of exit from the trunk once inside. In particular, automobile trunks present a potential safety hazard to humans and pets because the latching mechanism may close while they are in the trunk. This is particularly true for young children who may accidentally become trapped in the trunk of a car and suffer serious physical injury and/or emotional distress because they are unable to escape and there is no means for notifying someone that they are trapped.

Therefore, there is a need in the art for an interior trunk release mechanism which is highly visible under minimal lighting conditions such as when the deck lid of the trunk is closed. Furthermore, the release mechanism should be easily recognizable and operable even by children, and should avoid damage or deterioration of existing vehicle systems, such as the battery or electrical system, while remaining operable even when the vehicle is shut off. In the event that an occupant in the trunk may be a small child, the release mechanism preferably should be operable to automatically detect the presence of a person within the trunk and to automatically assist the person in opening the trunk in response to such detection. Furthermore, there is a need for a system that can sense when a person is in the vehicle passenger compartment or trunk compartment and generate a response to facilitate their release.

SUMMARY OF THE INVENTION

The present invention is intended to provide a mechanical apparatus for activating a release mechanism for a deck lid of a trunk of a vehicle from within the interior space of the trunk.

According to a first aspect of the present invention, a release system is adapted for use in opening a deck lid of a vehicle and is positionable within a compartment substantially enclosed by the deck lid. The release system comprises an electrically operable actuating device which is connectable to the release mechanism and at least one of a manual input device and an occupant detector, said actuating device being operable to at least partially actuate the release mechanism to open the deck lid in response to a user input to said manual input device or a detection of an occupant within the compartment by said occupant detector. Preferably, the release system comprises a self contained release module which is connectable to the release mechanism of the deck lid and electrically connected to a power source, such as a vehicle battery or the like.

Preferably, the occupant detector comprises a temperature sensor and/or motion sensor and determines the presence of a person or animal within the trunk in response to detection of motion or a predetermined temperature. Preferably, the manual input device comprises a handle and may further comprise a handle sensor at the handle which is operable to detect movement of the handle and/or touching of the handle. The handle may comprise a bright color and be in contrast to a dark background upon which it is installed. Preferably, the color is selected to convey a safe and friendly image to a child, such as a yellow or bright green color.

The assist device is operable to ease manual operation of the handle as the handle is moved to activate the release mechanism. The assist device may also be operable independent of any manual movement of the handle, while the handle may be operable independent of the assist device, in case power is disconnected from the assist device. Preferably, the assist device comprises an electrically operated solenoid, a gas operable piston, or a compressed spring which is connected to the handle or to a lever or extension connected to the handle.

In one form, the release system may further comprise an illumination source. Preferably, the illumination source comprises a self-luminous light, such as a Tritium gas capsule, and/or may comprise a non-incandescent light, such as a light emitting diode or any other illumination source. The illumination source is operable to provide either direct or indirect illumination to the handle of the present invention. The illumination source may be temporarily activated upon closure of the deck lid and may be further activated upon an activating event, such as movement of the handle or detection of a person or animal within the trunk space by the occupant detector.

In another form, the release system includes a control, which is operable to activate the actuating device in response to said manual input device and/or said occupant detector. The control may be further operable to activate and deactivate the illumination source in response to one or more activating events, and may provide an audio signal to an occupant in response to detection of the occupant.

According to another aspect of the present invention, the release system includes a handle, a release assist device, an occupant detection system, an illumination source and a control circuit. The handle is interconnected to a release mechanism of the compartment and at least partially provides a mechanical advantage such that the release mechanism may be activated upon exertion of less than 20 Newtons in a predetermined direction on the handle. The illumination source provides illumination to the handle and is activated by the control circuit upon an occurrence of an activating event.

According to yet another aspect of the present invention, a release system is adapted for use in opening a compartment of a vehicle and is positionable within the compartment and substantially enclosed by a lid. The lid is openable by an electrically controlled latch. The release system is adapted to activate the latch in response to an activation of the release system.

In one form, the release system includes an electromechanical device which activates the latch when at least a portion of the device is moved. Preferably, the electromechanical device is a button and the activation is a pressing of the button.

In another form, a release system adapted for use in opening a deck lid of a vehicle is provided, the release system being positionable within a vehicle compartment (such as a trunk compartment) that is at least partially closed by the deck lid, the compartment having a release mechanism for opening the deck lid. The release system is adapted for operation from the interior of the compartment and includes an assist device. The assist device is connectable to the release mechanism and comprises at least one of an electrically operable actuating device, a mechanically operable actuating device and a gas operable actuating device. The release system includes at least one of a manual input device and an occupant detector. The assist device is operable to actuate the release mechanism to open the deck lid in response to either or both of a user input to the manual input device or a detection of an occupant within the compartment by the occupant detector. In one embodiment, the assist device comprises a solenoid. In another embodiment, the assist device comprises a gas operable actuating device, such as a piston in communication with a compressed gas source, which is connectable to the release mechanism. In yet another embodiment, the assist device comprises a mechanically operable actuating device such as a compressed spring member.

This invention further relates to a system for detecting humans and animals that may be trapped in a compartment, such as the trunk of a vehicle. Accordingly, another embodiment is directed to an apparatus for controlling the status of a compartment of a vehicle. This apparatus includes a first sensor, which is disposed in the compartment and generates an alert signal responsive to sensed conditions in the compartment. A controller is coupled to the sensor and receives the alert signal. In response to the received alert signal, the controller generates a control signal in accordance with the received alert signal. A mechanism is coupled to the controller and disposed in the compartment. The mechanism receives the control signal from the controller and enters an open position when actuated by the control signal.

Another embodiment is directed to an apparatus for controlling a light source in a compartment. This apparatus includes a latching mechanism that is mounted on the compartment. The latching mechanism generates a mechanism signal indicative of latching mechanism position. A sensor, typically a pyroelectric sensor, is mounted on a surface of the compartment and senses thermal changes by sensing changes in radiant flux. When the sensor senses a change in the flux and a change in heat, the sensor generates an alert signal. The light source is mounted on a surface of the compartment for emitting light energy when actuated. A controller is coupled to the latching mechanism, the sensor and the light source, for receiving the alert signal from the sensor and the mechanism signal from the latching mechanism. The controller generates a control signal as a function of the alert signal and the mechanism signal. The control signal actuates the light source when the alert signal is received and the mechanism signal indicates the compartment is closed.

Yet another embodiment is directed to a method for controlling the status of a compartment latch of a vehicle. This method includes the steps of sensing conditions in the compartment at predetermined time intervals. An alert signal indicative of the sensed conditions is generated. Then a motion signal indicative of vehicle motion is generated. The alert signal and the motion signal are transmitted to a controller and a control signal is generated in accordance with the alert signal and the motion signal. The compartment latch is actuated in response to the control signal.

Yet another embodiment is directed to a vehicle cargo compartment control system for controlling an actuatable latch disposed on a cargo compartment of a vehicle. The vehicle is capable of generating a motion signal indicative of a state of vehicle motion. A sensor is disposed in the cargo compartment, and senses the presence of an occupant in the cargo compartment. The sensor generates a sensor signal when an occupant is sensed. A controller, which is coupled to the sensor and the actuatable latch of the cargo compartment, receives the sensor signal and the motion signal. The controller determines whether the sensor signal exceeds a predetermined threshold. The controller actuates the latch of the cargo compartment when the sensor signal exceeds the predetermined threshold and the motion signal indicates the vehicle is in a stationary state.

Yet another embodiment is directed to a latch release system for actuating a trunk latch of a vehicle. The vehicle is capable of generating a vehicle motion signal indicative of vehicle motion. The vehicle has a passenger compartment and a trunk compartment. The latch release system comprises a sensor, mounted in the interior of the trunk compartment, that senses thermal energy in the trunk compartment and generates an output signal indicating a sensed quantity of thermal energy in the trunk compartment. An indicator, mounted in the passenger compartment of the vehicle, is capable of illumination. A controller, mounted on the vehicle and coupled to the sensor and the indicator, receives the output signal from the sensor and compares the magnitude and quantity of the output signals received from the sensor to a predetermined magnitude and a predetermined time period to establish an alarm condition. The controller also receives the vehicle motion signal from the vehicle indicative of vehicle motion. The controller actuates the trunk latch when an alarm condition has been established and the vehicle motion signal indicates the vehicle is in a stationary state. The controller illuminates the indicator when an alarm condition has been established and the vehicle motion signal indicates the vehicle is in a non-stationary state.

Yet another embodiment is directed to a latch release system for selectively conditioning the opening of a normally closed trunk compartment lid of a movable vehicle. The vehicle is capable of generating a vehicle motion signal indicative of vehicle motion and has an indicator mounted on a passenger compartment of the vehicle. The trunk compartment lid has latched and unlatched states and is latched into its latched state by a selectively releasable latching mechanism disposed on the trunk compartment lid. The system comprises a sensing circuit mounted on the vehicle for sensing the presence of an occupant within the trunk compartment. The sensing circuit produces an output signal in response to sensing an occupant. A control circuit is coupled to the sensing circuit, the indicator, and the latching mechanism. The control circuit receives the output signal from the sensing circuit and receives the vehicle motion signal, and responsive to the output signal illuminates the indicator when the vehicle motion signal indicates the vehicle is moving. The control circuit conditions the latching mechanism to unlock the trunk compartment when the vehicle motion signal indicates that the vehicle is stationary.

Yet another embodiment is directed to a sensor system for sensing an occupant in a vehicle compartment comprising a primary sensor, mounted in the compartment, for sensing the presence of a living being such as a human in the compartment. The primary sensor is adapted to generate an output signal upon receiving adequate input. A controller is coupled to the primary sensor, for receiving the output signal from the primary sensor and generating a control signal based on the output signal. The control signal is transmitted to one or more destinations.

Yet another embodiment is directed to a system for sensing an occupant in a vehicle compartment comprising a primary sensor. The primary sensor is mounted in the compartment and senses the presence of a living being such as a human in the compartment. The primary sensor is adapted to generate a primary output signal upon receiving adequate input. One or more secondary sensors are coupled to the primary sensor and activate upon receiving the primary output signal from the primary sensor. The secondary sensors generate a secondary output signal. A controller, coupled to the secondary sensor, receives the secondary output signal from the secondary sensor and generates a control signal based on the secondary output signal. The control signal is transmitted to one or more destinations. These destinations are, for example, an indicator light, a trunk latch mechanism, horn, headlights, interior lights, a pager and a remote keyless entry module.

Therefore, the present invention provides a trunk release system which is easily recognizable and operable by a child, as children are the ones typically harmed by being trapped in a trunk. The release system is easy to activate and is preferably a bright friendly color so as not to frighten or confuse a child who may be trapped within the trunk. Preferably, the release system further comprises an automatic assist device which is operable to automatically assist a person to activate the trunk release in response to a detection of a person within the trunk and/or an attempt by the person to activate the release mechanism. Furthermore, an illumination source is preferably provided to increase the visibility of the release mechanism. The illumination source should only be activated for a limited period of time in order to prevent excessive drain on the battery of the vehicle. The present invention further provides for a system for sensing an occupant in the trunk or other vehicle compartment. The trunk may be automatically opened by the system in response to a detection of a person or animal within the compartment.

These and other objects, advantages, purposes and features of this invention will become apparent upon review of the following specification in conjunction with the drawings.

DESCRIPTION OF THE PREFERRED EMBODIMENTS

Figure 1:
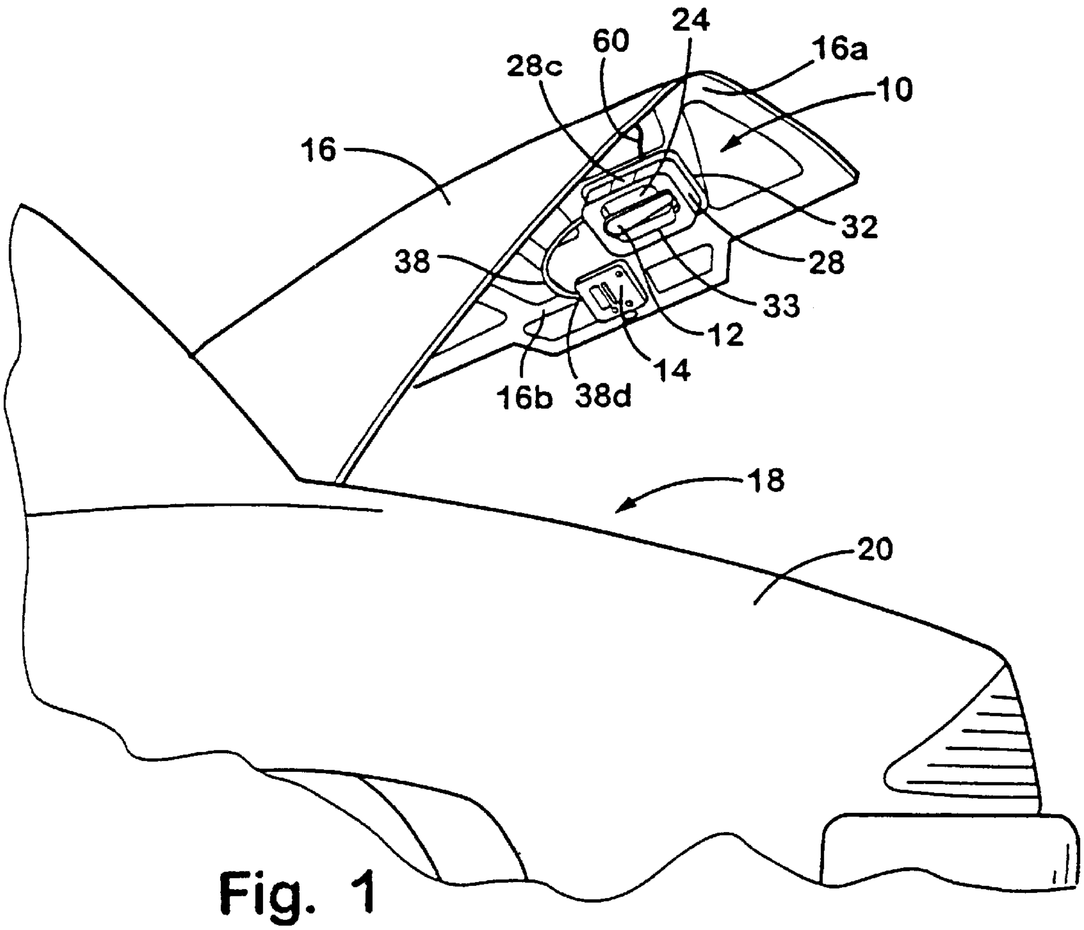
FIG. 1 is a perspective view of a deck lid of a vehicle incorporating the present invention.
Figure 2:
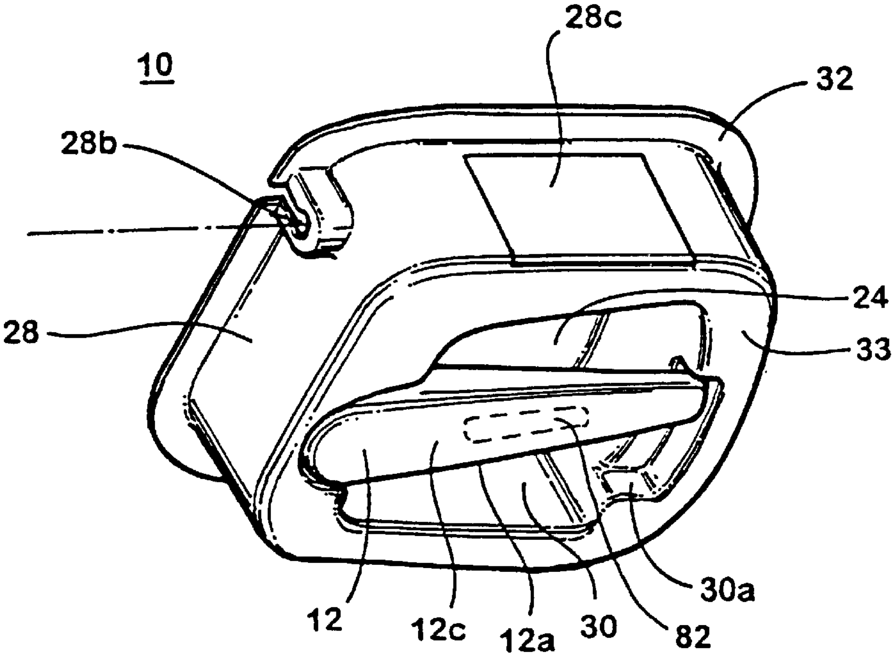
FIG. 2 is a front perspective view of the present invention prior to it being installed in the vehicle.
Figure 3:
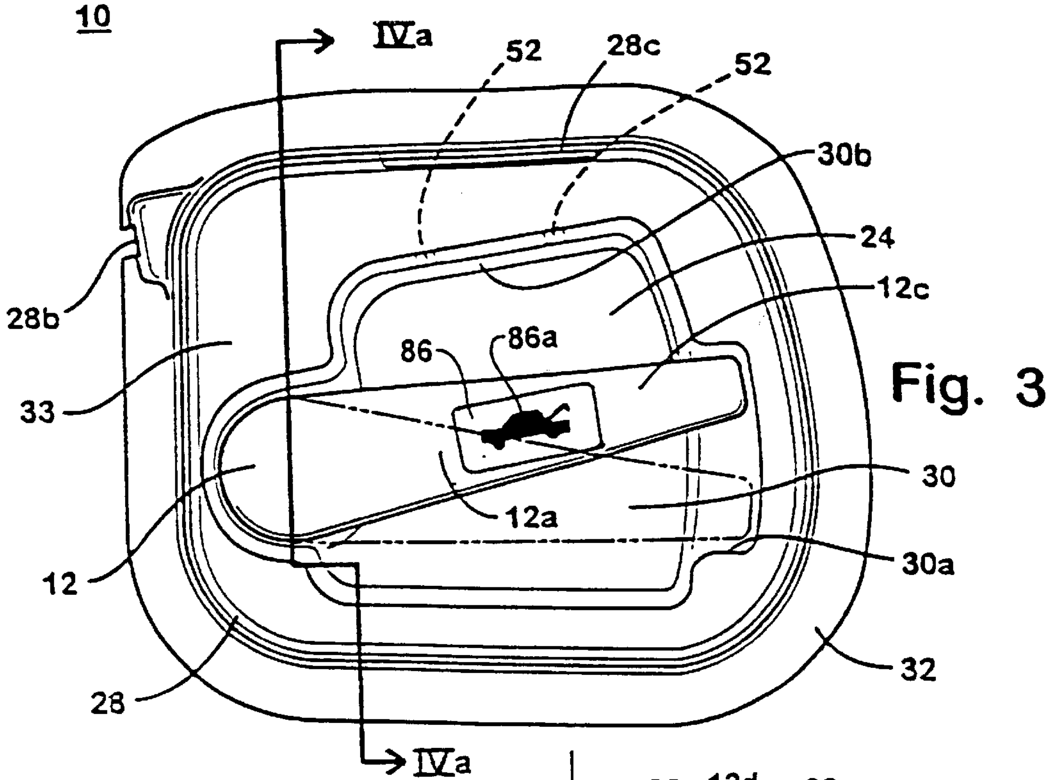
FIG. 3 is a front elevation of the housing and handle of the present invention.

Referring now specifically to the drawings and the illustrative embodiments depicted therein, there is shown in FIG. 1 a safety release apparatus or assembly 10, which includes a handle 12 which is interconnected to a release mechanism 14 for opening a deck lid or trunk lid 16 of a trunk compartment 18 of a vehicle 20. The vehicle 20 may be a sedan, coupe or even a hatchback or the like, which includes a storage compartment 18 substantially enclosed by a lid or door 16, such as a trunk or the like. Handle 12 of safety release apparatus 10 is interconnected with release mechanism 14 of deck lid 16 such that release mechanism 14 is activated, and deck lid 16 is subsequently opened, in response to a movement of handle 12. Safety release mechanism 10 is mounted on an interior surface 16*a* of either the deck lid 16 or elsewhere within trunk space 18, so as to allow an operator of safety apparatus 10 to open the trunk from within trunk space 18. Most preferably, safety mechanism 10 is mounted on a downward extending portion or waterfall 16*b* of deck lid 16, as shown in FIG. 1. However, clearly safety release apparatus 10 may be mounted elsewhere within trunk space 18 of vehicle 20, such as on a sidewall of the trunk space or the like, without affecting the scope of the present invention.

Handle 12 of the present invention is preferably injection molded from a resinous polymeric material such as polycarbonate/PBT or polycarbonate/ABS or the like and includes a long handle portion 12*a* and a shaft portion 12*b* (FIGS. 4*b* and 5), which provides for a pivot axis 22 of handle 12. However, handle 12 may alternatively be a switch, push button or any other electromechanical device which may be electronically interconnected to an electronic latch mechanism, such that movement of at least a portion of the device releases the release mechanism in order to open the trunk. It is further envisioned that the handle may be any manual input device, such as a button, switch, touch surface or even a voice activated microphone system, such that the release mechanism is activated in response to a person's voice being detected within trunk space 18, as discussed below.

Preferably, handle 12 is designed and formed so as to be easily recognizable as an opening device for a door or the like, and further is formed with rounded edges along the handle portion 12*a* so as to make it a comfortable handle for a child or other occupant within the trunk to grasp and operate. Handle 12 may further include text or a picture on a facing surface 12*c* to convey to an operator of handle 12 that handle 12 is for opening the trunk. Furthermore, the color of handle 12 is preferably selected to be a "friendly" color for children, so that any small child which may become trapped within trunk space 18 will not fear the handle as being something that is hot or otherwise harmful to touch. Preferably, the color selected is a bright green or yellow, which has been shown to convey a bright yet "friendly" or cool to touch appearance to the handle. It is important that the handle be child friendly so that even the smallest and youngest children who may be trapped within the trunk will not be afraid to operate the handle 12.

By providing a light color which does not convey an image of heat or otherwise harmful material, the handle 12 of the present invention is more likely to be grasped and operated by small children than a handle which may otherwise be of a "harmful" color, such as red or orange, which a child may believe is hot to touch. In order to make handle 12 more visible in minimum lighting conditions, handle 12 is also preferably mounted adjacent to a background 24 that is of a substantially darker color than handle 12, so as to provide a stark contrast between the handle and its background for better visibility of the handle in minimal lighting conditions. The background 24 may be a surface of a housing 28 for safety release assembly 10 or may be an interior surface of the trunk space 18 or deck lid 16 itself.

Safety release apparatus 10 preferably is installed within a housing 28, which is secured within trunk space 18 such that handle 12 is positioned within a recess 30 of housing 28. Housing 28 is preferably injection molded from a resinous polymeric material such as polycarbonate/PBT or polycarbonate/ABS or the like and may be black or another dark color. Housing 28 functions to protect handle 12 from being bumped or damaged by items which may be stored within trunk space 18 of vehicle 20. Not only does this prevent damage to handle 12 or other components of safety release apparatus 10, but housing 28 also substantially precludes the possibility of handle 12 being accidentally contacted and moved by the stored items so as to prevent unintentional opening of trunk space 18.

As best shown in FIGS. 2–4*a*, housing 28 includes a substantially flat and outward extending flange 32 along its rearward end and a raised perimeter, front surface 33. Flange 32 allows for easy installation of the present invention, as fasteners or adhesive or the like may be inserted through or applied to flange 32 and then secured to an interior surface of either deck lid 16 or other interior surface of the trunk space 18 of the vehicle 20. Clearly, the safety release mechanism 10 may be installed on a vehicle during the assembly of the vehicle by the manufacturer, or may be installed later as an after market unit, without affecting the scope of the present invention.

Figure 4A:
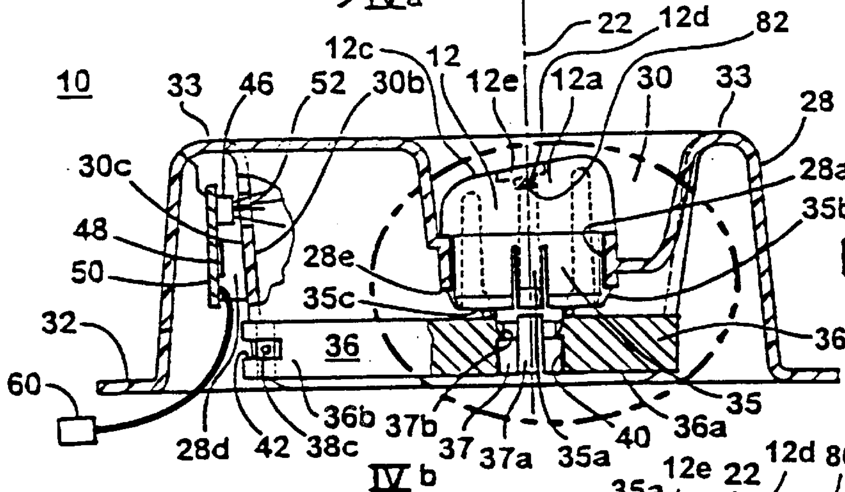
FIG. 4*a* is a cross-sectional view taken substantially along line IVa—IVa in FIG. 3.
Figure 4B:
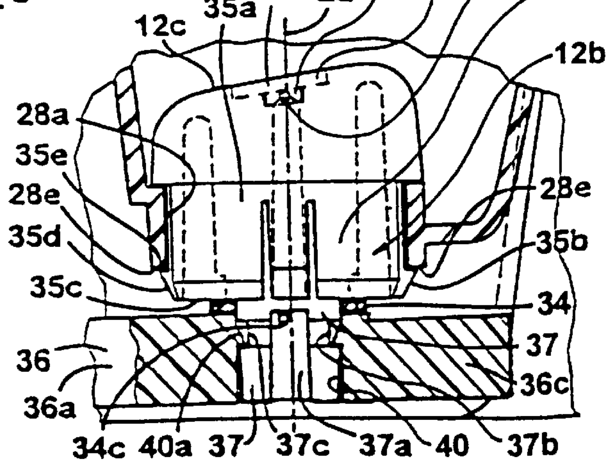
FIG. 4*b* is an enlarged view of the area labeled IVb in FIG. 4*a;*

Handle 12 is preferably positioned within recess 30 of housing 28 below or behind the plane of front surface 33 such that the handle may pivot about its axis 22 within recess 30. Perimeter surface 33 helps protect handle 12 from stored items within trunk or compartment 18, and helps prevent accidental activation of handle 12. Recess 30 may also include at least one stop 30a, which limits rotational travel of handle 12 within a predetermined range. Preferably, as shown in FIGS. 4*a* and 4*b*, handle 12 includes a cylindrical bearing or barrel section 35 which has longitudinally extending sections 35*a* separated by slots which are generally parallel to the pivot axis 22 of handle 12. The slots allow the longitudinal sections 35*a* to flex inward as shaft 12*b* is inserted into opening 28a in housing 28. Barrel section 35 may also include a plurality of resilient, angled flange or tabs 35*b* formed at a free end 35*c* of longitudinal sections 35*a* and extending radially outwardly therefrom. Tabs 35*b* each have an inclined outer edge or surface 35*d* and a substantially flat, planar edge 35*e* extending generally perpendicular to axis 22 when handle 12 is mounted in opening 28*a*. As shaft 12*b* is inserted into opening 28*a*, the inclined surfaces 35*d* of tabs 35*b* engage the opening 28*a* and cam the sections 35*a* inwardly and guide insertion of barrel section 35 through opening 28*a*. As tabs 35*b* protrude through opening 28*a*, flat edges 35*e* engage an interior surface 28*e* of housing 28 adjacent opening 28*a* so as to snap fit handle 12 into housing 28. This allows handle 12 to be easily rotated within opening 28*a*, yet substantially precludes handle 12 from being pulled outward from opening 28*a*.

Additionally, a biasing member 34, such as a torsional spring or the like (FIG. 5), may be provided about shaft 12*b* of handle 12 in order to bias handle 12 in an initial position. Biasing member 34 preferably is positioned around a lower end 37 of handle shaft 12*b*, such that one end 34*a* of biasing member 34 engages a stop tab 34*b* on housing 28 and another end 34*c* engages a slot 37*a* along lower portion 37 of shaft 12*b*. This substantially fixes both ends 34*a* and 34*c* of biasing member 34 so that rotational movement of handle 12 about axis 22 winds the torsional spring, which then provides a rotational force on shaft 12*b* to return handle 12 to its initial position.

Figure 5:
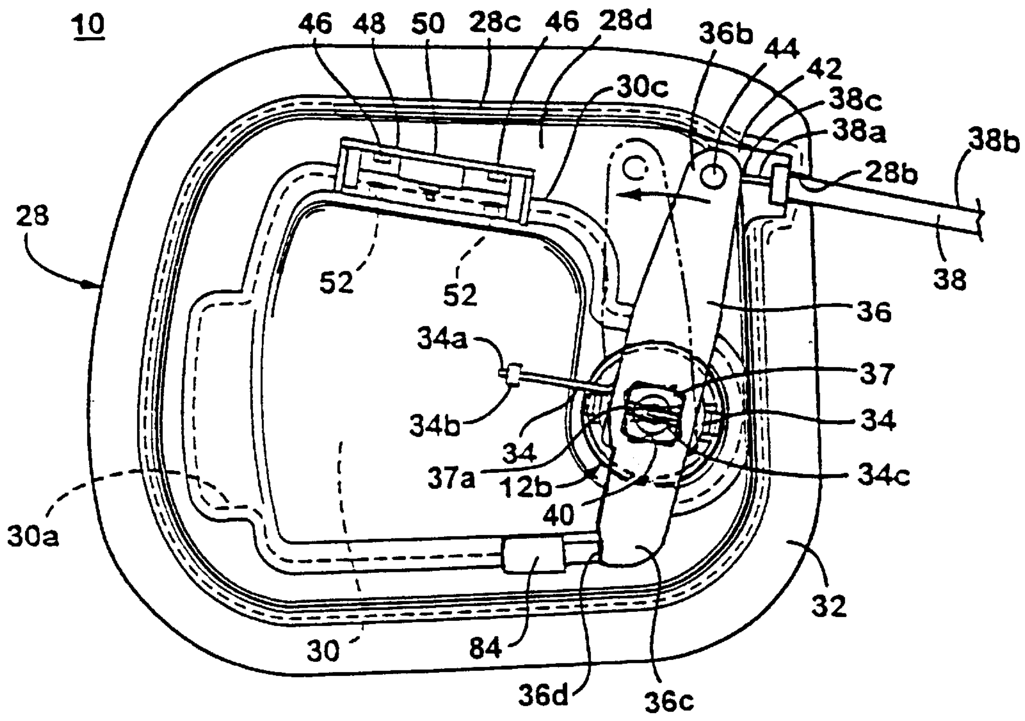
FIG. 5 is a rear elevation of the present invention.

Preferably, handle 12 is interconnected to release mechanism 14 by a lever 36 and a cable 38, as best shown in FIGS. 4*a* and 5. The lever 36 is attached to lower portion 37 of shaft 12*b*, which extends downward from handle 12*a* through barrel section 35 and is of a lesser diameter than barrel section 35. Lower portion 37 is substantially non-circular at its free end and includes slot 37*a* extending longitudinally along its axis 22. Slot 37*a* allows lower portion 37 to flex inward for attachment of lever 36 thereto and further provides for the end 34*c* of biasing member 34, as discussed above. An annular groove 37*b* may also be included around lower portion 37 for securing lever 36 thereto.

As best shown in FIGS. 4*a* and 4*b*, lever 36 is preferably a substantially straight lever arm, which includes an opening 40 at a center region 36*a* through which lower portion 37 of shaft 12*b* is inserted, such that lever 36 is fixedly secured to shaft 12*b* of handle 12. Lever 36 may include angled tabs 40*a* protruding inwardly at opening 40 to engage a corresponding lip 37*c* along groove 37*b* of shaft 12*b*, thereby snapping lever 36 onto lower portion 37 to prevent lever 36 from being removed from shaft 12*b*. Tabs 40*a* of lever 36 function similarly to tabs 35*b* of barrel section 35 as they engage lip 37*c* and prevent lever 36 from being removed from shaft 12*b*. As lower portion 37 of shaft 12*b* is inserted through opening 40 in lever 36, tabs 40*a* cam lower portion 37 inward, as slot 37*a* allows lower portion 37 to flex inwardly, until tabs 40*a* snap into groove 37*b*. Preferably, both opening 40 and lower end 37 of shaft 12*b* are correspondingly substantially non-circular, such that lever 36 cannot rotate relative to shaft 12*b*. More preferably, opening 40 and lower shaft end 37 are substantially square as shown in FIG. 5.

At a cable end 36*b* of lever 36, there is located an attaching slot 42 or the like, which may be secured to cable 38. An opposite end 36*c* of lever 36 may extend from center region 36*a* and provide an engaging surface 36*d*, such as a flattened or notched region, for engagement with an electrically operable actuating or release assist device 84, as discussed below. As shown in FIGS. 4*a* and 5, an underside of housing 28 provides for a cavity in which lever 36 is also substantially encased, again to prevent damage to the lever and to further prevent accidental activation of the release mechanism 14.

Cable 38 preferably comprises an inner cable 38*a* and an outer sheath 38*b* through which inner cable 38*a* may travel. At each end 38*c* and 38*d* of inner cable 38*a* is a pin 44 for engaging a corresponding slot or other attaching means. Pin 44 on a first end 38*c* of inner cable 38*a* is secured to slot 42 on lever 36 while a pin (not shown) on a second end 38*d* of inner cable 38*a* is likewise secured to a slot (not shown) on release mechanism 14. Outer sheath 38*b* of cable 38 is secured to housing 28 through a cable opening 28*b* in one side and to a bracket (not shown) substantially adjacent release mechanism 14. Movement of first end 38*c* of inner cable 38*a* therefore results in a substantially similar amount of travel of second end 38*d* of inner cable 38*a*, while cable 38 is maintained by sheath 38*b* in a predetermined path between housing 28 and release mechanism 14.

When handle 12*a* is grasped and pivoted about its pivot axis 22, lever 36 is correspondingly pivoted about the same axis 22. As shown in FIG. 5, this results in cable end 36*b* of lever 36 traveling along an arcuate path which causes a linear travel of substantially the same distance to occur to first end 38*c* of inner cable 38*a*. As first end 38*c* travels along the arcuate path, second end 38*d* of inner cable likewise is moved a linear distance substantially equal to the linear travel of first end 38*c*. Safety release assembly 10 is designed such that pivoting handle 12*a* until handle 12*a* is approximately at stop 30*a* in recess 30 results in a predetermined amount of cable travel in cable 38 so as to activate release mechanism 14, thereby opening deck lid 16 of vehicle 20. Preferably, this pivot requirement is less than approximately a 15-degree rotation of handle 12. Although shown and described as including a lever and cable to activate release mechanism 14, clearly the present invention may incorporate other mechanical means for interconnecting the handle 12 to the release mechanism 14, without affecting the scope of the present invention. For example, end 36*b* of lever 36 may be directly connected to release mechanism 14 or to another form of linkage, such as an additional lever arm or the like.

Preferably, actuating device 84 is operable to ease movement of the handle and lever to activate the release mechanism and open the trunk of the vehicle. Actuating device 84 is preferably an electrically operable pull mechanism, such as a solenoid or a muscle wire, which is operable to pull (or push or provide other appropriate motion) a mechanical linkage or cable mechanism to actuate the trunk release mechanism 14 in response to an electrical signal. Actuating device 84 may be operable to assist movement of the handle as the handle is being moved, or may be operable independent of movement of the handle, such that actuating device 84 may activate release mechanism 14 in response to an activating event or to movement of handle 12 or detection of an occupant within the trunk space, as discussed below. Preferably, actuating device 84 comprises a solenoid, as shown in FIG. 5, which is operable to engage the engaging surface 36*d* of end 36*c* of lever 36 and to pivot lever 36, and thus handle 12, toward an opening position to activate the release mechanism, when device or solenoid 84 is activated. The solenoid 84 may be mounted at lever 36 such that solenoid 84 is operable to either push or pull the lever arm in order to activate the release mechanism 14 of the trunk.

Preferably, solenoid 84 is oriented such that handle 12 may still be pivoted toward the open position independent of activation of the solenoid, such that the handle is still fully operational without assistance from assist device 84, in order to provide a fully mechanical release of the trunk if power is disconnected from safety release assembly 10. The solenoid may be mounted at safety release assembly 10 to directly pivot the lever arm, or may be mounted external to the release assembly, such that the solenoid indirectly causes movement of the lever arm and/or the mechanical linkage to release the trunk. Alternately, the assist device may be positioned immediately adjacent to or at the trunk release mechanism 14 to directly activate the release mechanism in response to a movement of handle 12 or an occupant detection. Although shown and described as a solenoid which is engaged with lever 36, the actuating device 84 may otherwise comprise a conventional solenoid for activating the release mechanism of the trunk via a button or other switch positioned in the cabin of the vehicle, a muscle wire (a known wiring which is operable to contract when electricity is applied thereto. Muscle wires, which are also known as shape memory alloys, can assume radically different forms or "phases" at distinct temperatures. When conducting an electric current, the muscle wire heats and shortens in length, generating a usable amount of force. Muscle wires typically are bi-metals such as of a nickel-titanium alloy such as Nitinol) attached to assembly 10 such that as the wire contracts when electricity is applied, the contraction of the wire pulls at and assists in pivoting the handle or in activating the release mechanism, or independently activates the release mechanism, in response to movement of handle 12 or detection of a person or animal within the trunk space. Also, the assist device, such as actuating device 84, can comprise a motor mechanism and/or a motor-driven gear, without affecting the scope of the present invention.

Alternately, the assist device can optionally comprise a compressed gas source that, upon detection of an occupant trapped in a trunk compartment and/or upon a trapped occupant touching or pulling a trunk release handle or element, a gas powered-cylinder can be actuated to generate the pull needed to release the trunk latch mechanism and thus release the trunk lid to allow the trapped occupant to escape. Thus, for example, actuating device 84 can comprise a gas-operated piston in communication with a compressed gas (such as air or carbon dioxide) cylinder. For example, pressurized carbon dioxide can be held in a compact capsule or cartridge that is readily removable for service replacement after discharge. When a trapped person contacts a trunk release element, such as an active trunk release handle and/or a passive detector (such as a pyro sensor or similar thermal sensor, such as are disclosed in commonly assigned U.S. patent application Ser. No. 08/901,929, filed Jul. 27, 1997 by Gimtong Teowee et al. of Donnelly Corporation entitled PYROELECTRIC INTRUSION DETECTION IN MOTOR VEHICLES, now U.S. Pat. No. 6,166,625, the entire disclosure of which is hereby incorporated by reference herein), indicating that a person is trapped, the gas cylinder is caused to discharge into the gas-powered piston, which pulls a cable or the like to release the trunk latch. Since the power used to release the latch is provided by the compressed gas source, this can occur even in the complete absence of electric power in the trunk (such as might be the case in an abandoned vehicle whose battery has depleted). Therefore, by combining a manually operable trunk release handle with a compressed gasactuated assist element, the mechanical advantage of the handle can be greatly enhanced. Thus, for example, a trapped child, attracted to a self-luminous trunk release handle, need only exert sufficient force to open the valve of the compressed gas cylinder or cartridge to release the compressed gas to actuate a piston that pulls a cable that releases the trunk latch.

As described above, the release handle or element for use in opening a deck lid of a trunk compartment of a vehicle may include or be connected to a gas operable actuating or assist device that is connected to the deck lid latch. The pressure of the gas released from, for example, a compressed gas container, such as a compressed carbon dioxide container or cylinder (that can be a compact cylinder of the dimension such as is conventionally used to power air pistols, tonic water dispensers and the like), can be harnessed to generate a pulling action on a cable connected to the latch of the trunk deck lid, and so release it from the inside to allow escape of a trapped individual. The potential energy of the gas stored in the gas cylinder, when released, can generate a force of 10 to 50 Newtons, or more, pulling on the trunk lid release mechanism. Preferably, at the operating temperature of the vehicle, the pressurized gas contained within the container is in a liquid state.

It is further envisioned that a gas operable actuating or assist device for release of a trunk latch can be provided that utilizes a pyrotechnic device to generate a high gas pressure when fired. For example, a pyrotechnic device such as is conventionally used to deploy an automotive air bag can be used. Air bag deployment actuators, as known in the automotive art, commonly include a pyrotechnic device that typically consists of a compact canister (typically a cylinder) containing an explosive substance. When the explosive substance is detonated, it rapidly produces a large volume of gas, and this gas fills and deploys the air bag in milliseconds. Such air bag deploying canisters are economically available, and are deemed safe to use in an automobile.

One embodiment of this present invention utilizes an air bag canister as part of the trunk deck lid release system. These pyrotechnic elements, such as air bag canisters, are compact and one (or more) can be included into or connected to a trunk-release handle mechanism located within the trunk interior. When a trapped occupant triggers the explosive in the pyrotechnic element (such as by causing a detonating cap to activate by pulling on a trigger mechanism that releases a spring-loaded plunger or arm), the resultant gas generated by the explosion can cause a mechanical element such as a piston to move, thus exerting a pulling force on a cable connected to the trunk latch to release the deck lid. The mechanical effort required by the trapped occupant is minimal, as all that need be done is, in effect, to pull or otherwise actuate the trigger to explode the pyrotechnic device, and thus release the gas that operates opening of the deck lid. No electrical power of any kind need be present, making such a gas-operated release mechanism particularly useful in releasing children trapped in the trunk of a parked and abandoned vehicle that has lost all battery power. Optionally, such a pyrotechnic gas operable assist device or release mechanism can include a motion detector such as the thermal sensors described in the present invention in order to effect release of a trapped occupant in the trunk. Operation of the pyrotechnic device can be locked-out, as described in the present invention, to prevent operation when it would be unsafe or unnecessary to activate the device (such as when the vehicle is being normally driven). Use of such a pyrotechnic element in conjunction with the safety handle and/or the automatic occupancy detection systems of the present invention allows provision of a compact, reliable, trapped-occupant release mechanism for a vehicle trunk, even when the trunk release latch is not configured to be electrically operable. Thus, the pyrotechnic element-activated release systems of the present invention are suitable to use for OEM and aftermarket installations in a wide variety of vehicles. It is further envisioned that the gas operable assist device may be useful in opening any other doors or compartments of a vehicle. For example, the gas operable assist device may be useful in opening an emergency exit door or window of a school bus or the like, in order to provide a quick release or opening of the door or window to facilitate a quick exit of the vehicle. The quick release of the exit may be accomplished with minimal effort on the part of the person opening the door or window.

Alternately, or additionally, the assist device of this present invention can comprise a mechanical assist device such as a coiled spring that stores potential energy in a compressed spring member. Thus, for example, a trapped child, attracted to a trunk release handle, need only exert sufficient force to displace a mechanical member, such as a pin or the like, that is holding back a coiled spring that, when so released, pulls a cable that releases the trunk latch. Having a trunk release module that includes a manual release handle and a compressed gas-powered assist device and/or a mechanical assist device such as a compressed spring member is an advantage since their successful operation is dependent neither on presence of electrical power nor on the strength of the trapped occupant. Therefore, with such non-electrical assist devices, the only effort required of, for example, a child trapped in a trunk compartment, is pressing a button or moving a handle or a similar low-effort user-input action. This low-effort user-input action serves as a trigger that actuates the assist device (such as releasing a valve on a compressed gas source or moving a pin to release a compressed spring that is storing potential energy), and requires application of minimal force by the user. Once so triggered, the assist device, be it a gas-assist device or a spring-assist device, provides the power to generate the force that pulls the trunk lid release latch to release the trunk lid and so enable the trapped occupant to escape. Note that the assist device can be located at, and optionally as part of, the trunk latch mechanism.

Although safety release assembly 10 is shown and described as including a handle, lever and cable system, it is further envisioned that other means of activating a release latch or mechanism may be implemented. For example, for a vehicle including an electronically operated latch, the safety release assembly may include an electromechanical device for signaling or activating the latch and thus opening the deck lid. The electromechanical device may be a push button, handle or switch positioned within the trunk space and electronically interconnected with the latch mechanism, such that activation or movement of the device energizes a solenoid within the latch mechanism or otherwise causes the latch mechanism to release, thereby opening the trunk. The device may be a bright color and may be easily recognized and operated by a small child in accordance with the present invention as discussed above.

Preferably, safety release assembly 10 further comprises at least one illumination source 46 and/or 82 for providing illumination to handle 12, and an electronic control circuit 48 for at least temporarily activating the illumination source 46 and/or 82 in response to at least one activating event, as discussed below. The illumination source may be a direct source 82 or may be an indirect source 46 of illumination at handle 12. The illumination provided by illumination source 46 or 82 allows a person who may be trapped within trunk space 18 to see handle 12 so as to grasp the handle and open the trunk, as the trunk space would otherwise be too dark for a person to see where the handle is located. This is especially critical when a child is trapped in the trunk, as a child would not even know to look for such a handle, much less know where the handle may be positioned within the trunk. Most preferably, the light emitted by illumination source 46 or 82 will be of low intensity and a "friendly" color to avoid frightening a child, who may believe that the handle is hot if it is illuminated by a bright light or the like.

Preferably, the illumination source comprises a handle illumination source 82 positioned at or along handle 12, to provide direct illumination of handle 12. Handle illumination source 82 may comprise any known lighting source and preferably comprises a light source which has a minimal or no draw of current from the vehicle battery or the power source. Alternately, or in addition thereto, handle illumination source 82 may be provided by handle 12 being made out of a highly visible and glowing phosphorescent material or the like. Preferably, handle illumination source 82 comprises a self-luminous light source, which provides continuous illumination without a draw of current from a power source and without the need for periodic exposure to light (such as is the case with conventional phosphorescent materials which, because they lose their light emission intensity when stored in the dark without exposure to a light source to recharge, are not self-luminous light sources). Self-luminous light sources are preferred over phosphorescent or fluorescent materials, since self-luminous light sources do not require light, such as sunlight, to charge. In contrast to self-luminous light sources, the illumination provided by phosphorescent and/or fluorescent materials decreases in intensity the longer the materials remain in a dark or dimly or sporadically lit area. Because the light source of the present invention is located within the trunk of a vehicle, there will be little, if any, ambient light present for prolonged periods of time. A self-luminous light source is thus preferred, since it provides substantially constant illumination intensity regardless of the surrounding lighting conditions. Preferably, the self-luminous light source is operable to provide light and intensity of at least approximately 5,000 micro-lamberts. The self-luminous and self-sufficient light source preferably comprises a Tritium gas capsule, which requires no light or electricity to charge and thus provides illumination, via radioactive decay of the elements, with no draw on the vehicle's battery. Tritium gas capsules are known and are available in various sizes, shapes, and colors, such as those commercially available from SRB Technologies Inc. of Winston-Salem, N.C. The Tritium gas capsules comprise an isotope of hydrogen which has a long operable life of at least approximately 12 years. These self-sufficient light sources comprise low levels of radioactive material, but are safe and have been approved for various consumer applications. A suitable self-sustaining light source is available from SRB Technologies Inc of Winston-Salem, N.C. under the trade name Saunders-Roe Betalight®, and requires no electrical energy or light exposure to illuminate.

Preferably, handle illumination source 82 further comprises a back lit, substantially transparent panel 86, which may further comprise a symbol or icon 86*a*, such as a vehicle with a trunk open (FIG. 3) or an arrow in the direction which the handle should be moved to open the trunk, or any text or other picture which may convey to a person within the trunk that movement of the handle will activate the release mechanism of the trunk. Handle 12 may then comprise a light recess 12*d* along its surface 12*c*. Light recess 12*d* may be recessed within a back lit panel recess 12*e* along surface 12*c*, such that the substantially transparent panel 86 is mountable within recess 12*e* and substantially encases illumination source 82 within light recess 12*d*. Handle illumination source 82 is securable along and within light recess 12*d* to provide direct illumination of handle 12 from within handle 12. Although shown and described as being positioned along handle 12, an indirect light source may be positioned elsewhere at safety release assembly 10 or elsewhere within trunk space 18 to provide an indirect illumination of handle 12 when the trunk is closed, without affecting the scope of the present invention.

As shown in FIGS. 4*a* and 5, illumination source 46 may alternately (or additionally) be located on a circuit board or chip 50 containing control 48, and may be substantially encased along with control 48 within housing 28 in order to prevent damage to illumination source 46 or control 48 by items stored within the trunk. Illumination source 46 may project light through at least one slot or opening 52 in a side wall 30*b* of recess 30 such that illumination source 46 is directed toward handle portion 12*a* of handle 12. Handle portion 12*a* may also be twisted or angled such that the facing surface 12*c* of handle portion 12*a* is angled toward illumination source 46 in order to receive and reflect illumination from illumination source 46 over a greater surface area. A removable access panel 28*c* (FIG. 2) may also be included on housing 28 to provide for easy access for installation and maintenance of both control circuit 48 and illumination source 46 within a cavity 28*d* formed by housing 28. Preferably, control circuit 48 is snap fit onto an interior side 30*c* of sidewall 30*b* such that illumination source 46 is aligned with slot 52. Control circuit 48 further includes a wiring harness and connector 60 for connecting control circuit 48 to a power source (not shown) located on vehicle 20, such as the vehicle battery or the like.

Illumination source 46 is thus provided to illuminate handle 12 when the deck lid of 16 of vehicle 20 is closed, since the trunk space 18 becomes very dark when fully enclosed. Illumination source 46 may comprise a self luminous light source or may comprise at least one light emitting diode (LED) or other non-incandescent illumination source (such as organic or inorganic electroluminescent sources, phosphorescent sources, etc.), since these types of illumination sources eliminate or minimize the drain on the vehicle battery when they are activated, as well as being highly durable and long-lasting. The light sources may be selected to provide illumination in a preferred color, such as green or yellow, and may be selected to draw a minimal amount of current from the vehicle battery or the like. Preferably, an LED is selected which draws less than about 45 milliamps when activated, and more preferably, the LED draws less than or equal to about 30 milliamps when activated. Such LEDs are commercially available, examples being a Hyper-Bright LED manufactured by Siemens or other LEDs manufactured by Hewlett-Packard. Most preferably, illumination source 46 comprises at least two LEDs, so that if one fails for some unforeseen reason, there is still at least one additional LED providing illumination to handle 12. Although illumination source 46 is shown and described as an LED or the like, clearly other illumination sources may be provided in varying locations within the trunk without affecting the scope of the present invention. Additionally, illumination source 46 may be an incandescent source, such as a filament lamp, a halogen lamp, a neon lamp, or the like. Illumination source 46 may also serve as the standard trunk light, which is normally activated when the trunk or deck lid is opened, thereby providing light to the entire trunk space when the trunk is closed.

Figure 6:
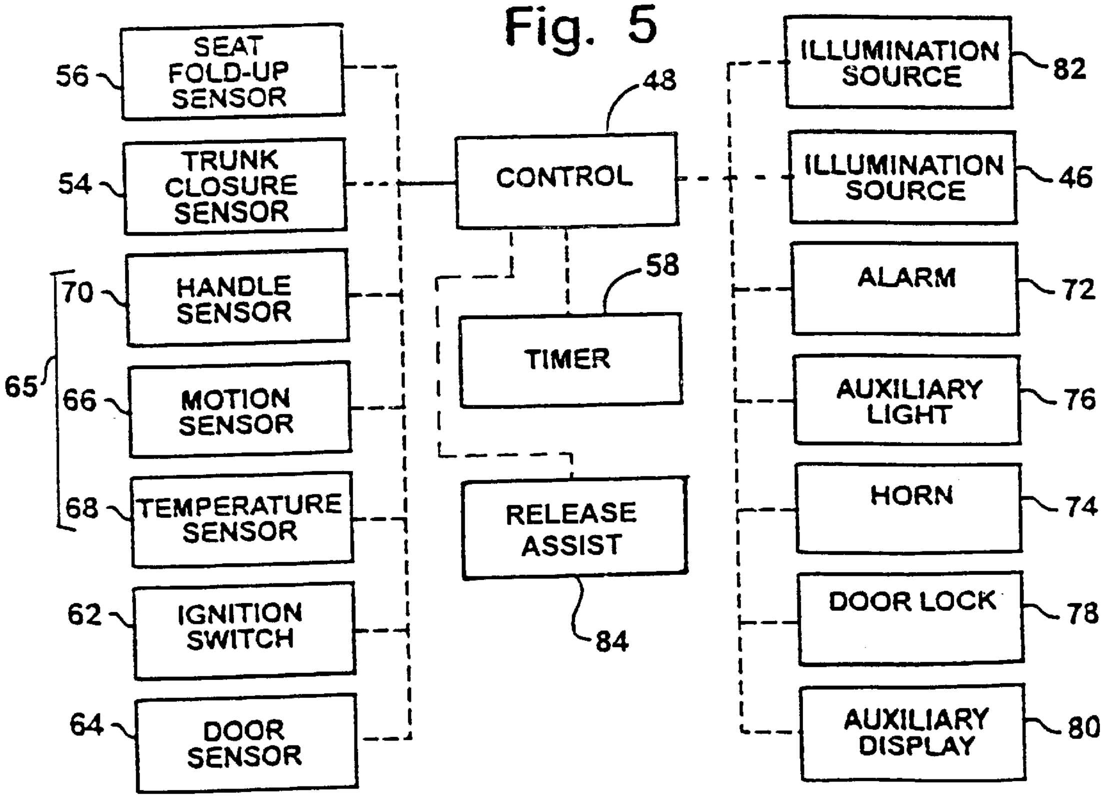
FIG. 6 is a block diagram of the control circuit of the present invention.

If illumination source 46 and/or 82 comprises a self-luminous light source, then the illumination source is thus continuously activated or luminescent. Alternately, however, control 48 may be operable to activate illumination source 46 or handle illumination source 82 upon an occurrence of an activating event. The activating event may be the closing of deck lid 16 and/or the closing or folding back of any fold-down rear seats which may be present in vehicle 20. For example, as shown in FIG. 6, vehicle 20 may include a trunk closure sensor 54 and/or a seat sensor 56 to provide a signal to control circuit 48 when the trunk is closed or the seats are folded to their upright position, thereby enclosing trunk space 18. Preferably, control circuit 48 also functions to deactivate illumination source 46 after a period of time following the activating event. For example, control circuit 48 may include a timer or other timing mechanism 58 which triggers deactivation of illumination source 46 after a predetermined period of time, such as thirty minutes or an hour, has elapsed following the initial activation of illumination source 46. Control circuit 48 continues to reset and reactivate illumination source 46 upon subsequent occurrences of one or more activating events, following deactivation of illumination source 46 after the predetermined period of time has elapsed.

Referring now to FIG. 6, control circuit 48 may also activate illumination source 46 and/or 82 in response to additional activating events, such as an ignition switch 62 of vehicle 20 being activated, a door sensor 64 signaling that a door of vehicle 20 is being opened or closed or other functions of vehicle 20 which pertain to the entering or leaving of vehicle 20 or movement of the vehicle. Safety release assembly 10 may further include one or more occupant sensors 65, such as a motion detector or sensor 66 (such as a pyro detector, and preferably a low current pyro detector as are disclosed in commonly assigned U.S. patent application Ser. No. 08/901,929, filed Jul. 27,1997 by Gimtong Teowee et al. of Donnelly Corporation entitled PYRO-ELECTRIC INTRUSION DETECTION IN MOTOR VEHICLES, now U.S. Pat. No. 6,166,625) and/or a temperature sensor 68, such as a bolometer, within trunk space 18, so as to provide a signal to control circuit 48 when a movement or predetermined temperature of an object in trunk space 18 is detected. The occupant sensor 65 may be of the type disclosed in commonly assigned U.S. patent application Ser. No. 09/484,754, filed Jan. 18, 2000 by McCarthy et al. for COMPARTMENT SENSING SYSTEM, U.S. Provisional Application, Ser. No. 60/135,393, filed May 21, 1999 by McCarthy et al. for COMPARTMENT SENSING SYSTEM, and in EPC Application No. 00650023.5, filed Mar. 23, 2000 by Bingle et al. for SAFETY SYSTEM FOR A CLOSED COMPARTMENT OF A VEHICLE, the disclosures of which are hereby incorporated herein by reference. Safety release assembly 10 may also comprise a handle sensor 70 which detects contact with or movement of handle 12 to provide an additional signal to control circuit 48. Handle sensor 70 may be a push button or a motion detector at handle 12, or may be a touch pad at a surface of handle 12, which senses contact of handle 12. The touch pad may be temperature sensitive, so as to be capable of discriminating between the touch of a person and contact of the handle by an item stored within trunk space 18. The touch pad or soft touch surface of handle 12 may detect and discriminate human touch from other items via capacitive, resistive or inductive activation and control 48 may then activate the illumination source 46 and/or 82 and/or the assist mechanism 84 in response to such discrimination.

Preferably, the trunk occupancy detection sensor or sensors are passive sensors which substantially continuously monitor the trunk space or handle when the deck lid is closed. Control circuit 48 may then, in response to a signal from the motion detector 66, the temperature sensor 68, or the handle sensor 70, activate illumination source 46 and/or 82 to provide illumination of handle 12 in trunk space 18 or may activate assist or actuating device 84. Furthermore, in response to such signals, which convey a message that a person or animal may be entrapped within trunk space 18, control circuit 48 may activate other additional auxiliary signals or displays. For example, control circuit 48 may activate an alarm 72, a horn 74, an auxiliary light 76 elsewhere on vehicle 20, a door or trunk lock or lock release 78 of vehicle 20, an auxiliary message display 80, which may be within vehicle 20 or remote from the vehicle, or the like, in order to provide an operator or anyone else within the vicinity of vehicle 20 information pertaining to a person or animal being entrapped within the trunk space 18 of the vehicle. The alarm 72, auxiliary light 76, horn 74, message display 80, lock system 78 or the like may be activated upon a first detection of motion or temperature within trunk space 18, or may alternatively be activated upon a second, third, or fourth occurrence of such detections. The number of detections required prior to an alarm or the like being activated by control circuit 48 are preferably reset following an opening and closing of deck lid 16 or a folding down of a rear seat within vehicle 20, if applicable. It is further envisioned that control 48 may activate a voice chip and speaker, in order to convey a voice message which provides instructions as to how to open the trunk, in response to detection of an occupant therein.

Preferably, illumination source 82 is self-luminous and thus continuously luminescent, and control 48 is operable to activate assist device 84 in response to occupant sensors 65. As discussed above, the control 48 may further activate an alarm, horn, an auxiliary light, an auxiliary message display or the like in response to such a detection. The passive occupancy detection sensors and the control 48 are thus operable as a "smart release" system, which is operable to activate the release mechanism 14 of the deck lid 16 when a person or animal is sensed or detected within the trunk. The control 48 may further function to first determine whether or not the vehicle is moving prior to activating assist device 84, in order to prevent opening the trunk while the vehicle is being driven down the road. The control may thus be interconnected to other vehicle sensors, such as the ignition, a wheel speed sensor, or the like to determine the status of the vehicle prior to opening the trunk. If the trunk release mechanism 14 is an electrical release, the mechanism is typically locked out or inoperable when the vehicle ignition is on. The control 48 may be otherwise operable to initially activate illumination source 46 and/or 82 upon a first activating event, as discussed above, and delay activation of assist device 84 until the smart release occupant sensors confirm that an occupant is within the trunk space of the vehicle. For example, control 48 may delay actuation of assist device 84 until two or more movements are detected within the trunk space or until a threshold temperature is measured over a prolonged period of time. However, control 48 may also be operable to activate assist device 84 in response to a first touch or movement of handle 12. In vehicles that already comprise an electrical trunk latch/release mechanism, the electrical release mechanism may be electrically actuated to automatically open the trunk in response to any movement of handle 12 and/or the occupant detection sensors 65. The electrical release mechanism may thus be operable to assist in the opening of the trunk with handle 12 or to automatically open the trunk independent of further movement of handle 12.

When installed in the vehicle, the present invention therefore provides for illumination source 46 and/or 82 to be continuously on or activated for a period of time following closure of the trunk and/or a folding of rear seats of vehicle 20. While the illumination source 46 and/or 82 is activated, a child or other person who may be entrapped within trunk space 18 will be able to easily see and identify handle 12. Because it is difficult for a person to move about within the small trunk space of a typical vehicle, and because typically it is a very small child that may be entrapped therein, the present invention also provides a handle 12 which is very easily pivoted about its axis so as to open deck lid 16 of vehicle 20. Preferably, handle 12, lever 36 and cable 38 cooperate to allow release mechanism 14 of deck lid 16 to be opened with only a minimal amount of force being applied to handle portion 12*a*. The force required to pivot handle 12 about its pivot axis 22, thereby activating release mechanism 14 of deck lid 16, is preferably less than or equal to about 20 Newtons applied in a direction substantially perpendicular to the handle portion 12*a*. More preferably, the force required to open deck lid 16 is less than or equal to about 15 Newtons and most preferably, the force required is less than or equal to about 10 Newtons. Furthermore, activation of assist device 84 further increases the mechanical advantage of the system, such that an even lesser or little to essentially no force is required to pivot the handle and open the trunk. A person who is trapped within trunk space 18, upon identifying the handle 12 as a means in which to open the trunk of the vehicle, merely grasps the handle and easily pivots the handle, which subsequently activates release mechanism 14 of vehicle 20 as discussed above. Once release mechanism 14 is activated, the trunk lid may be easily pushed open so as to allow the person to get out of the trunk.

Figure 7:
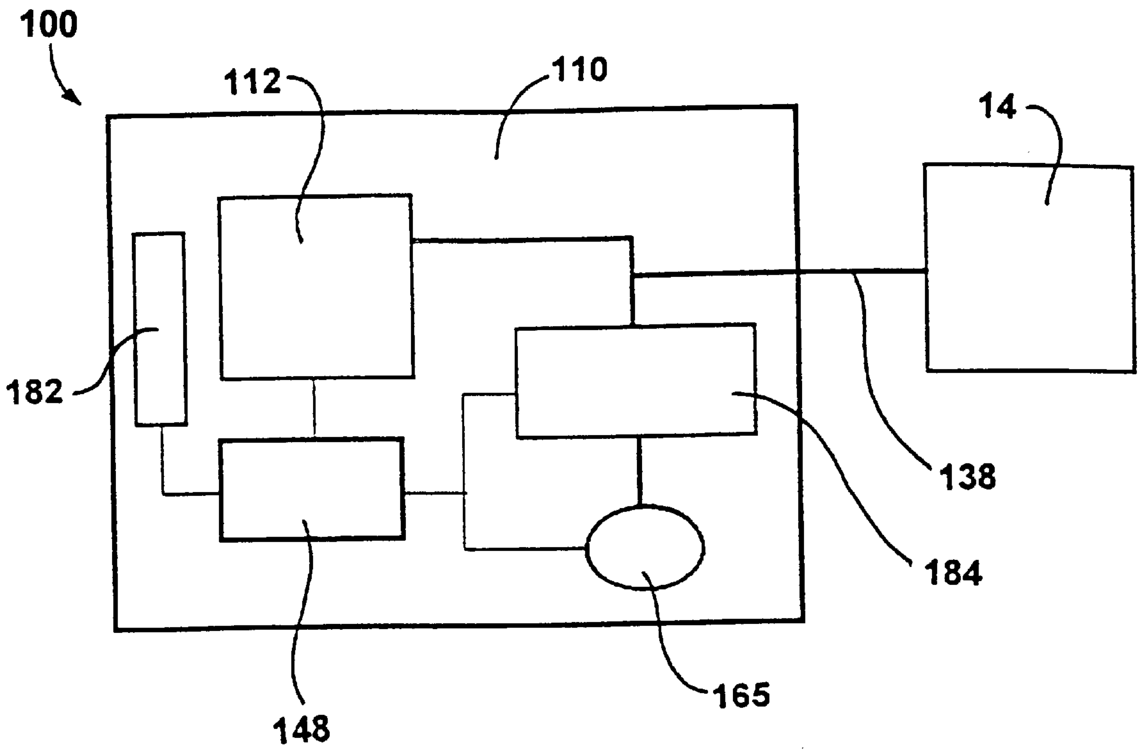
FIG. 7 is a block diagram of an active/passive trunk release module in accordance with the present invention.

Referring now to FIG. 7, an active/passive trunk release system 100 is operable to actively and passively monitor the trunk space of a vehicle. The system is connected to and includes trunk release mechanism 14, which may be a conventional mechanical release mechanism or may be an electrically operable release mechanism. Trunk release system 100 comprises a trunk release module 110 which is operable to actuate release mechanism 14 in response to detection of an occupant within the trunk space, as discussed below. Preferably, release module 110 is a unitary, substantially enclosed module, which may be manufactured remotely from a vehicle assembly plant and purchased by a vehicle manufacturer and then readily installed in the trunk of a vehicle during manufacture of the vehicle. Alternately, the release module 110 may be readily installed in the trunk of a vehicle as an aftermarket device, without affecting the scope of the present invention. Release module 110 is a self contained, electrically operable unit which needs only to be electrically connected to a power source, such as a vehicle battery, and mechanically or electrically (depending on the vehicle application) connected to the trunk release mechanism 14. Release module 110 may be adapted for implementation with a mechanical or electromechanical trunk release mechanisms which may or may not be designed for electrical actuation.

Trunk release module 110 comprises an actuating device 184, which is preferably substantially similar to actuating device 84, discussed above, and a control 148, which is operable to actuate actuating device 184 in response to an electronic signal. Release module 110 further includes at least one of an active manual input device 112 and/or a passive occupancy detection sensor system or device 165. Actuating device 184 is preferably then operable to actuate, or assist in actuating, release mechanism 14 in response to input device 112. Preferably, actuating device 184 is an electrically operable tensile or pulling mechanism, such as a solenoid or a muscle wire, which provides mechanical assistance to the input device 112 in actuating release mechanism 14 via a cable or linkage 138. Cable or link 138 may be any mechanical linkage between release module 110 and release mechanism 14, such that manual actuation of input device 112 and/or electrical actuation of actuating device 184 (via activation of input device 112 and/or detection of an occupant by occupancy detection system 165 discussed below) causes link 138 to pull on release mechanism 14 to release the deck lid. It is further envisioned that link 138 may otherwise be an electrical signal to an electrically operable trunk release mechanism. The assistance by actuating device 184 may thus greatly increase the mechanical advantage of a handle or the like in opening the trunk of a vehicle. Preferably, control 148 is operable to detect activation of input device 112 and trigger actuating device 184 accordingly.

Active input device 112 is operable to activate trunk release mechanism 14 via linkage or cable 138, in response to a human signal or input. For example, input device 112 may comprise a handle mechanism similar to handle 12 discussed above, where the input may be a contact or turning or rotating of the handle. Alternately, input device 112 may comprise a button, touch panel or the like, where input device 112 activates the release mechanism 14 in response to input device 112 being touched, depressed, moved, or the like. It is further envisioned that input device 112 may even comprise a microphone system which receives a human voice message from an occupant of the trunk and activates the release mechanism 14 in response thereto. Input device 112 thus is operable to actuate release mechanism 14 in response to any active contact or voice message by an occupant of the trunk space of the vehicle.

Release module 110 may alternately, or additionally, include occupancy detection system 165, which is passively operable to detect a presence of a person or animal within the trunk of the vehicle. Occupancy detection system 165 is preferably similar to detection sensors 65 discussed above, and comprises a thermal sensor, such as a pyro detector, and/or a motion detector. The sensor or sensors are preferably operable to continuously monitor the trunk space of the vehicle. If an occupant is detected, actuating device 184 is then actuated to automatically actuate release mechanism 14 to open the trunk of the vehicle. As discussed above with respect to actuating device 84, actuating device 184 may be operable to actuate release mechanism 14 only after it is determined that the vehicle is not moving. It is further envisioned that the occupancy detection system may be operable in a sentinel mode, whereby the sensors monitor the compartment and control 148 is operable to activate an illumination source or an audio device, such as a voice chip, to issue exit instructions, in response to an initial detection of an occupant. Upon further confirming detection of an occupant and/or in response to subsequent input to manual input device 112, actuating device 184 may then function to activate release mechanism 184.

As shown in FIG. 7, trunk release module 110 may further include an illumination source 182 to provide illumination of the trunk space or at least of the input device 112. Illumination source 182 is preferably self-luminous such that it provides continuous illumination of the trunk space. However, illumination source 182 may otherwise be any other form of light source, such as an LED or incandescent bulb, and may be actuable via control 148 in response to an activating event or detection of an occupant within the trunk space, as discussed above. Preferably, illumination source 182 includes one or more light-emitting light sources, such as solid-state light emitting diodes (LED), available from numerous sources. Various colors of LED can be used (or combined) such as blue, white, orange, yellow, red, amber and red-orange. Alternatively, an illumination source may be supplied as a conventional incandescent light source, a halogen light source, a fluorescent light source such as a vacuum fluorescent lamp, a light pipe such as fiber-optic bundle forming a light pipe, and the like. Most preferably, illumination is achieved using non-incandescent light sources, such as light emitting diodes (LEDs), organic light emitting material, electroluminescent sources (both organic and inorganic), and the like, and most preferably such non-incandescent sources are low power and are directed sources, such as described in commonly assigned U.S. Pat. No. 5,938,321 and U.S. patent application entitled INTERIOR MIRROR ASSEMBLY FOR A VEHICLE INCORPORATING A SOLID-STATE LIGHT SOURCE, Ser. No. 09/287,926, filed Apr. 7, 1999, now U.S. Pat. No. 6,139,172, which are hereby incorporated herein by reference in their entireties, and such as is disclosed in co-pending and commonly assigned U.S. patent application Ser. No. 09/466,010, filed Dec. 17, 1999, the entire disclosure of which is hereby incorporated by reference herein, and in co-pending and commonly assigned U.S. patent applications Ser. No. 09/449,121, filed Nov. 24, 1999 by Barry W. Hutzel et al. of Donnelly Corporation, and entitled REARVIEW MIRROR ASSEMBLY WITH UTILITY FUNCTIONS, and Ser. No. 09/585,379, filed Jun. 1, 2000 by Barry W. Hutzel et al. and entitled REARVIEW MIRROR ASSEMBLY WITH UTILITY FUNCTIONS, the entire disclosures of which are hereby incorporated by reference herein.

Accordingly, trunk release module 110 provides a self-contained module for opening the trunk of a vehicle from within the trunk space. The actuating device may be operable to assist an input device, such as a handle, button, or touch panel in opening the deck lid, and/or may be operable to automatically open the deck lid in response to detection of an occupant within the trunk space. The module is especially adapted for vehicles where the trunk release mechanism is not electrically powered, whereby a cable or other mechanical linkage is movable, via pushing or pulling at a remote end, to release the deck lid. However, the present invention is equally applicable to electrically actuable trunk release mechanisms.

An alternate embodiment of the present invention provides for a module, which comprises a handle, sensors, and/or illumination source, a control, and a housing similar to those discussed above, and further optionally includes a license plate holder and lock cylinder for the deck lid, which are positioned on an exterior surface of the deck lid. This embodiment may also optionally include an exterior handle such that the trunk may be opened from outside the vehicle without having to insert a key within the lock cylinder or otherwise enter the vehicle to release a trunk release lever from within the vehicle. The module is installed through an opening in the trunk lid and preferably includes a lock cylinder and release mechanism for opening the trunk. The module preferably further comprises at least one of an illumination source, which is operable to illuminate the handle, and a release assist device, which is operable to assist an occupant of the trunk in opening the trunk or to automatically open the trunk in response to a smart release sensor system.

Therefore, the present invention provides a safety release apparatus for opening a deck lid or trunk of a vehicle from within the trunk space. The apparatus of the present invention is easy to install in the vehicle, and is easily recognizable and operable by a small child that may become trapped within the trunk of the vehicle. The color and intensity of the handles and illumination are selected to convey a friendly, non-hot appearance to the handle, such that a child will easily see the handle and not be afraid to grasp the handle in order to open the trunk. Furthermore, the control circuit of the present invention is operable to activate the illumination source or other auxiliary signal in response to an activating event and to deactivate the illumination source after a period of time in order to minimize the overall drain on the vehicle battery. The illumination source is also selected to comprise a non-incandescent device, such as an LED or the like, which is highly durable and long lasting, yet requires a minimal amount of energy from the battery of the vehicle, even while it is activated. Alternately, the illumination source may comprise a self-luminous light source, which is operable to continuously illuminate the handle while requiring no current drawn from the battery or power source (which typically is the vehicle battery, although optionally, a separate, auxiliary battery can be provided). Accordingly, even if power is lost to the vehicle, the self luminous illumination source remains operable to illuminate the handle. Alternately, or in addition thereto, the color of the handle may be selected to be a light or bright color, which starkly contrasts the background on which the handle is installed, so as to remain visible in very low light conditions and/or when power is lost.

Although the control circuit of the present invention requires connection to an electrical power source in order to detect an occupant within the trunk space or to actuate the release assist device, and/or to provide illumination to the handle, preferably no electrical power is required to operate the handle and thus release the release mechanism in order to open the trunk of the vehicle. Preferably, the handle, lever, cable and release mechanism are all mechanical devices, and may override the assist device such that the trunk may be opened even when there is a power loss to the vehicle itself. Preferably, the present invention provides a substantially self contained release module which may be installed within the trunk space of a vehicle and connected to the existing trunk release mechanism or latch. The module is operable to provide assistance to the handle in releasing the deck lid or to independently release the deck lid in response to a detection of an occupant within the trunk compartment.

Providing a trunk release module that includes an assist device that may be electrically powered and/or that is gas or spring powered has many advantages, particularly when the components of the module (that can include an active manually-operable trunk release element such as a handle, touch surface or button, and/or a passive, occupant sensing element, such as a thermal sensor assembly that thermally detects body motion in the trunk, and/or an assist device, whether electrically operable such as a solenoid or gas operable such as a gas-operated piston, and/or a coupling/cable connecting to the trunk latch mechanism) are housed together in a unitary module assembly. Thus, an automotive supplier can supply such a unitary module (with the various components assembled together and with the module substantially sealed against contamination from the outside environment such as by rain, dust, dirt and the like) to an automaker to fit into new vehicles being assembled on a new vehicle assembly line, or can supply to the aftermarket as a retrofit for an existing fleet of vehicles.

Referring now to FIGS. 8–25, the present invention pertains to a sensing system for compartment applications, particularly for providing an indication of a person or animal trapped in the trunk or passenger compartment of a vehicle, such as an automobile.

Figure 8:
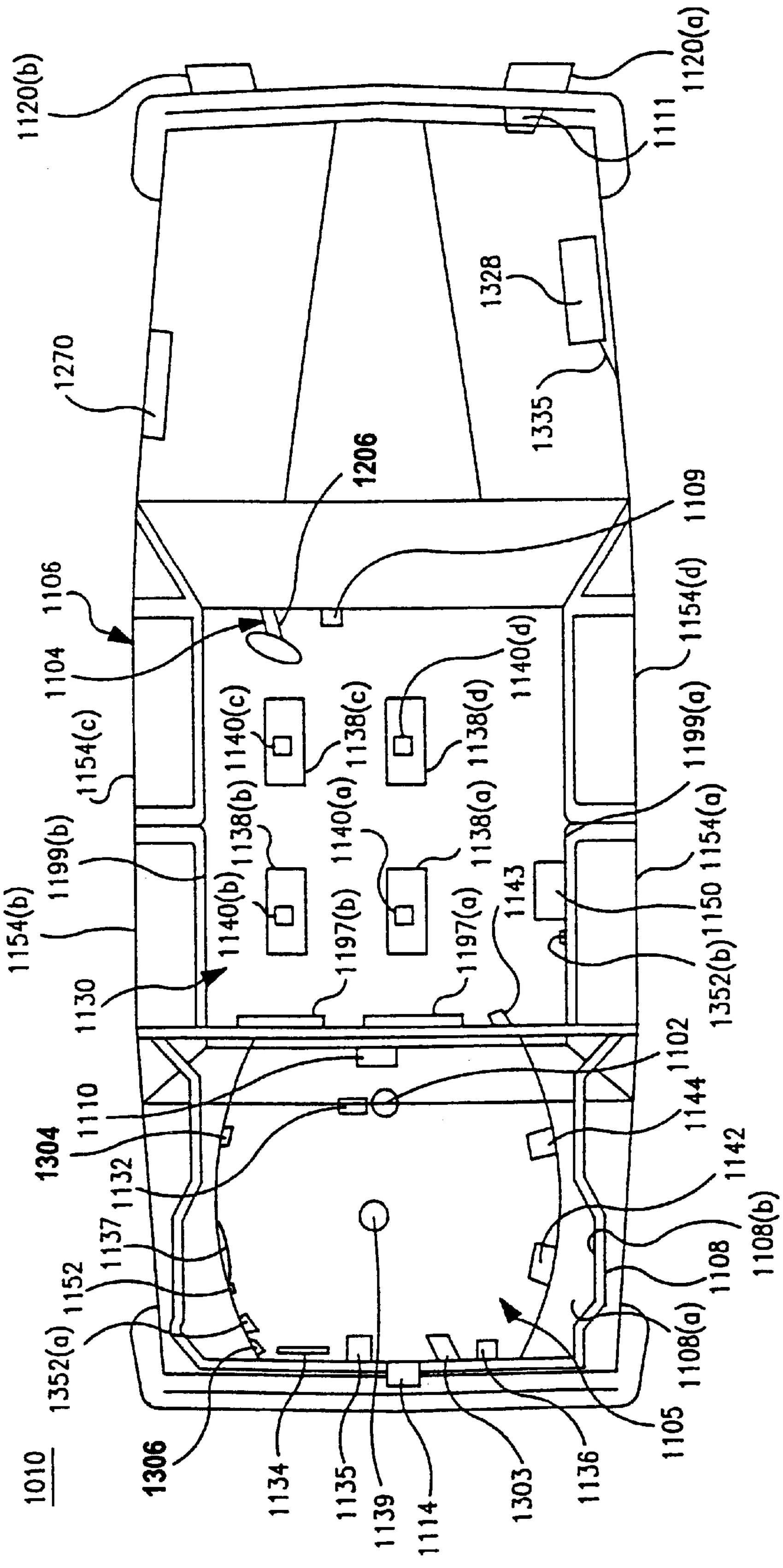
FIG. 8 shows a vehicle having a compartment sensing system.

FIG. 8 shows the system 1010 in the environment of a vehicle 1106. The vehicle 1106 is a conventional automobile with door locks 1154(*a*) . . . (*d*) and any other options available on the vehicle 1106.

A sensor 1102, such a pyroelectric infrared (PIR) sensor (also referred to as a detector herein), is disposed in a compartment 1105, which is shown as a trunk or baggage compartment or cargo compartment or other storage compartment provided in the vehicle. Alternatively, the sensor 1102 could be mounted in the passenger compartment 1130.

The interior cabin of a vehicle 1106 parked in a sunny climate can reach air temperatures in excess of 150° Fahrenheit and humans and pets can be rapidly overcome by the heat. For such applications, the sensor 1102 is suitably mounted in locations such as the rear-view mirror, in the dome light or in the headliner of the vehicle. An occupant sensing system with a sensor mounted on a rear-view mirror is described in commonly assigned U.S. patent application Ser. No. 08/901,929 filed Jul. 27, 1997, now U.S. Pat. No. 6,166,625, which is hereby incorporated by reference in its entirety herein.

PIR sensors are inexpensive and reliable sensors that require very low power to detect sudden changes in the thermal profile of a compartment 1105, 1130 due to movement of a living being. The PIR sensor is particularly desirable because of the high reliability and sensitivity of the device. A preferred PIR sensor has sufficient sensitivity to detect the thermal changes inside a compartment 1105, 1130. A desirable sensing device should have detection capability preferably greater than $10^5$ cm Hz/W (and most preferably greater than $10^6$ cm Hz/W), low noise and high signal to noise ratio. Furthermore, the sensor should be able to resolve a body at a temperature of about 37° C. moving at a frequency of approximately 5 Hz and at a distance of about 1–7 meters. Preferably, the sensor should also be able to resolve a body about 37° C. at a velocity of 0.1–3 m/s and at a distance of about 0.25–5 meters.

One or more PIR sensors may be utilized to acquire sufficient sensing input. The PIR sensor 1102 typically comprises single or multiple elements enclosed in the same package. The package may be a standard TO-5 transistor package, which is a popular metal can package such as the P7178 series available from Hamamatsu™ or the LHi 954 available from Heimann®. A PIR packaged in plastic such as epoxy, polysilane or silicone may also be used. The package may include thin film elements, a thick film load resistor, and a Junction-Field-Effect Transistor (JFET) preamplifier. Preferably, all components are hermetically sealed in the package. The sensor may also incorporate RF immunity into the TO-5 package such as a 220 microfarad capacitor in parallel with the pyroelectric elements or metallic grid or coating to reduce stray RF to the elements. Thus, the sensor can incorporate electronic compounds to improve rejection of RF noise to achieve signal amplification and/or noise reduction.

Other types of sensors that are also suitable include thermopile detectors, image sensors, radar, ultrasonic, carbon dioxide sensors, bolometers and a thermal imaging camera.

Floor mats 1138(*a*)–(*d*) include sensing elements 1140(*a*)–(*d*) that are capacitive, resistive and/or pressure sensitive. The mats 1138 are placed on the floor of the trunk compartment 1105 or passenger compartment 1130 and are used to produce a signal indicative of the presence of a human or animal in the trunk or passenger compartment. In this embodiment, when a human or pet applies pressure to the mat 1138, a signal is produced by the associated sensor 1140. The signal is indicative of a sensed pressure exerted by the weight of a human or animal. The signal is used by a controller 1110 to produce a visible indication or release a latch. Also, shock sensors 1142, microphones 1144, level sensors 1136, cameras 1304, and/or bolometers 1306 are suitably used to sense movement in the trunk compartment 1105.

Level sensor 1136 is coupled to controller 1110 to sense whether the vehicle is being elevated at either end, such as when the vehicle is being towed.

Cameras 1304 are used to scan the compartment and generate images. Such cameras are known to those skilled in the art.

Bolometers 1306 are coupled to controller 1110 and are broad band detectors that are sensitive to electromagnetic radiation. Although the bolometer is essentially a Wheatstone bridge, with two platinum strips, when one strip receives radiation, its electrical resistance changes slightly compared to the other strip. The measured difference indicates the amount of radiation received. More advanced bolometers use materials more sensitive to temperature, such as semiconductors, indium, antimonide and germanium mixed with gallium or indium. Microfabrication techniques enable the production of arrays of bolometers. Bolometer 1306 is either a single bolometer or an array of bolometers available from Honeywell®.

Shock sensor 1142 is coupled to controller 1110 and is used for detecting impact on portions of the vehicle, for example an occupant striking a compartment wall or glass window while attempting to escape. Shock sensor 1142 is, for example an SH15 sensor available from FBII®.

Microphone 1144 is coupled to controller 1110 and is used to detect sound in the compartment, such as a trapped occupant calling for help.

It is an embodiment of the invention that any combination of the above-listed sensing mechanisms could be used in conjunction with other of the sensing means to sense a human or animal in a passenger compartment 1130 or cargo compartment 1105 of a vehicle 1106. For example, a pyro sensor 1102 is suitably combined with a shock sensor 1142 such that thermal energy and motion detection are required to generate a signal indicating the presence of a person or animal. The combination of a plurality of sensors reduces the likelihood of a false alarm.

It is also an embodiment that selected ones of the above-listed sensing mechanisms are operated such that power consumption by the system is minimized. For example, sensing mechanisms that require less power to operate are used as primary sensing mechanisms, which are used to trigger secondary sensing mechanisms. Once the secondary sensing mechanisms are triggered, they can confirm that a viable signal is present. Typically, the primary sensing mechanisms are used to constantly monitor the status of the compartment and upon sensing a possible occupant in the compartment transmit a signal to the secondary sensing mechanisms.

It is also an embodiment of the invention that the sensing system 1010 generates a stepwise response by activating particular selected mechanisms, waiting a particular period of time and activating additional mechanisms. For example, the thermal sensor 1102, upon sensing an occupant triggers controller 1110 to illuminate a light 1139. When additional activity in the vehicle 1106 is sensed within a predetermined period of time, the controller 1110 will activate a tell/tale indicator 1109. If additional input is received, the controller 1110 actuates the trunk release mechanism 1114.

The step-wise response permits one level of response when a primary sensor is triggered and a second level of response when a secondary sensor is triggered.

Typically, a human body emits radiation in the 8–14 micron wavelength range with a peak emission typically around 9.3 microns. This radiation, emitted as IR radiation, is absorbed by the thermal sensor, preferably converted to heat, and later to an electric signal. Therefore, a filter material should be installed between the sensor and the view to block radiation in other wavelength ranges to avoid false alarms. The system 1010 should require less than about one Watt of power, and preferably less than about 0.1 Watts, and most preferably less than about 0.02 Watts, when employed in a vehicle in the parked state. Since the system 1010 receives power from the car battery 1328, via line 1335, the system 1010 will not function when the battery 1328 is not sufficient. Therefore, it is an embodiment of the instant invention to provide an auxiliary power supply 1270 that supplies power solely for the passive trunk release system (PTRS), and, optionally to the trunk release mechanism.

Conventional vehicles use a 12 volt battery as a power supply. The sensing system 1010 is continually activated when the vehicle ignition is not operating. The sensing system 1010 typically draws less than about 15 mA, preferably less than about 8 mA, more preferably less than about 1 mA and most preferably, less than about 0.5 mA. In vehicles with a 42 volt battery power supply or a 48 volt power supply, the sensing system 1010 current draw is less than about 3.75 mA, preferably less than about 1.25 mA, more preferably less than about 0.25 mA and most preferably less than about 0.125 mA.

The exemplary vehicle 1106 illustrated in FIG. 8 has a trunk deck 1108 with inner and outer surfaces 1108A and 1108B, respectively. For trunk applications, the thermal sensor 1102 is suitably mounted in a number of different locations including the deck lid 1108, underneath a parcel shelf in the trunk 1105 (parcel shelf not shown), the front of the trunk (i. e., on the inside behind the license plate), and on the back of the trunk, for example, on the inside portion of the back seats 1197A and 1197B. The security of the mounting is very important since movement of the thermal sensor 1102 against the vehicle body could cause a false signal. Mounting techniques include mechanical attachments and/or adhesive attachments and typically include, for example, adhesives, Velcro™, pins, bolts and screws. The mounting of the thermal sensor 1102 can either be distinct or integral. If the mounting is distinct, it can be for example, a separate mounting bracket or back plate. If integral, the mounting is molded into the housing of the sensor 1102. Typically the thermal sensor 1102 is mounted on the trunk lid 1108 or alternatively attached at the parcel shelf at the trunk to prevent possible damage when luggage or other objects are placed in the trunk.

A latch mechanism 1114 is mounted on the vehicle 1106 to enable the trunk deck 1108 to maintain a closed position in relation to the vehicle 1106. The latch mechanism 1114 can be actuated when the thermal sensor 1102 generates an alert signal and a controller 1110 causes the latch mechanism 1114 to enter an "open" position and thus open the trunk deck 1108. The latch mechanism 1114 is capable of generating a trunk lid status signal indicative of whether the trunk lid is "OPEN" or "CLOSED." This trunk lid status signal is transmitted to the controller 1110.

Alternatively, a latch module (not shown in FIG. 8) is suitably located remotely from the latch mechanism 1114 and generates a trunk lid status signal indicative of the position of the trunk lid 1108.

A tell/tale light 1109 is mounted on the dashboard of the vehicle 1106 and coupled to controller 1110. The tell/tale light 1109 is suitably actuated when the sensor 1102 detects a change in the temperature of the compartment 1105 such that the sensor 1102 generates an alert signal and the controller 1110 activates the tell/tale light 1109. The location of the tell/tale light 1109 is a design choice and lacks criticality. Indeed, the system 1010 could function without the tell/tale light 1109, and utilize other indicators, such as interior lights 1150, horn 1111, headlights 1120(*a*) and (*b*) or any combination thereof. One example of using the horn 1111 to indicate a sensed condition is sounding the horn 1111 to produce the SOS signal, which will be reserved exclusively to signify a human being trapped in the vehicle 1106. Also, the headlamps 1120(*a*) and (*b*) could flash an SOS signal to indicate a human is trapped in the vehicle 1106. Also, activating a conventional anti-theft vehicle alarm system (not shown), turning on the interior lights 1150 of a vehicle, and/or activating a telemetric, wireless vehicle remote command system such as an ONSTAR™ or RESCU™ (not shown) system are other examples of indicating that a sensed condition is present in the vehicle 1106.

In addition to the SOS signal another pattern of output by the horn, headlamps, interior lights and the like could be used. This output signal could be reserved specifically for a trapped occupant such that people hearing the output or seeing the signals would understand the significance of the output.

Ignition module 1206 is typically located on the steering column and is coupled to controller 1110. In one embodiment, when the ignition 1107 is "ON," indicating that the engine is running, the controller 1110 will not activate the latch mechanism 1114. Thus, the trunk lid 1108 will not open if the engine is running.

Temperature sensor modules 1352(*a*) and 1352(*b*) are also mounted in the compartments 1105, 1130, respectively, to sense ambient temperature. The temperature sensing modules 1352(*a*) and 1352(*b*) are coupled to the controller 1110. When the ambient temperature exceeds a predetermined quantity, the controller 1110 will generate a control signal more quickly. This has the advantage that if a child is trapped in a trunk 1105 on a hot day, the latch mechanism 1114 trunk release will be actuated in less time. This will reduce the likelihood that a trapped child will suffer injuries related to excessive heat. The thermal sensor 1102 is also suitably coupled to temperature sensors 1352(*a*) and 1352(*b*) and is adapted to provide different signal strengths with changes in the ambient temperature. The temperature can be monitored by temperature modules 1352 and used to influence the gain of the output so that a reliable signal is received at all times. This reduces the likelihood of a false alarm condition since the baseline of the thermal sensor 1102, which might drift upward as the ambient temperature increases, is corrected. The signal received from the temperature sensing modules 1352 is used to determine whether an alert signal is generated. For example, in a situation in which the ambient temperature of the vehicle passenger compartment 1130 is between 55 and 70 degrees Fahrenheit, the system 1010 may not generate an indication at all, since it is acceptable for passengers to be in the passenger compartment 1130 at such temperatures.

One potential for false detection is towing the vehicle 1106 (ignition of car in "PARK") with hot or cold groceries or other items that influence the temperature of the cargo compartment 1105 on passenger compartment 1130. The movement of the vehicle 1106 may cause these items to shift, thus generating a positive detection signal. One method to prevent this is to utilize a level sensor 1136, which is coupled to the controller 1110, so that when the level sensor 1136 detects a towing condition, the controller 1110 is disabled.

It is possible that an output signal may be generated falsely by movement of the body of the vehicle 1106 (i.e. rocking a vehicle 1106 that has a bag of ice in the trunk 1105). In order to overcome this possible concern, the thermal sensor 1102 is suitably combined with motion detector 1132. The combination of the motion sensor 1132 and the thermal sensor 1102 means that unless both sensors are triggered, an alarm condition will not be generated.

Use of the level sensor 1136 to detect vertical and horizontal movement will reduce the likelihood of a false alarm generated by wind gusts, since wind gusts typically produce primarily horizontal movement components and very slight vertical movement components. Also, filtering the received signals reduces the likelihood of a false alarm situation, since humans moving in a vehicle compartment 1105, 1130 will typically generate signals with a frequency between about 0.05 Hz and 10 Hz, more preferably between about 0.075 Hz and 5 Hz, and most preferably between about 0.1 Hz and 2.0 Hz. Thus filtering signals with a frequency below three Hertz is typically acceptable.

Inanimate objects in motion are greatly dependent on the resonant frequency of the vehicle. For example the General Motors™ 2000 Impala™ has a resonant frequency at about 2.25 Hz. Almost all heated or cooled inanimate objects will oscillate at this frequency for that particular car. All automobile natural frequencies will differ according to the size of the vehicle.

Optionally, movement of inanimate objects put into motion by resonant motion of a vehicle can be distinguished from human or animal motion. This is achieved on the basis of frequency motion resulting from car motion that can only occur at a frequency at or above that frequency of the car.

Another potential for false detection is when the vehicle 1106 is in a car wash and hot and/or cold groceries are also in the vehicle cargo compartment 1105 or passenger compartment 1130. In order to prevent an alarm condition, a motion sensor 1132 to sense motion within the vehicle compartments 1105, 1130 is suitably used in conjunction with the thermal detector 1102.

In situations in which the vehicle is rocked or in a carwash, it is preferable to have the trunk lid 1108 remain closed.

Various indication alternatives may be used, including the flashing of interior lights 1150, siren and a cellular phone call to 911 or another user-specified number to alert the user or other personnel of an alarm condition. Depending on the type of vehicle 1106 the system output may vary. For some vehicles, the trunk lid can be released through the Body Control Module (BCM) 1151. The BCM release of the truck lid 1108 will require the PTRS system 1010 to ground an output to the BCM 1151. For other vehicles, the trunk lid 1108 must be released directly. The system 1010 would then supply a pulse to the rear compartment lid motor 1303. Other indications such as sounding the horn 1111, flashing the lights 1120(*a*) and 1120(*b*), and/or sounding an alarm are suitably used. Also, activating or "beeping" a remote keyless entry module, or activating a LO-Jack™ system are other means of indicating that a human or animal has been sensed in the vehicle 1106.

Another feature of this invention is seat position sensors 1199(*a*) and 1199(*b*) that provide an indication of seat position. Thus, rear seats 1197(*a*) and (*b*) referred to collectively as 1197, of vehicle 1106 seal off the trunk compartment 1105 when they are in an upright position. Seat position sensors 1199 sense the position of seats 1197 and when the seats are not in an upright position, the trunk latch 1114 will not be actuated. This enables passengers to occupy the trunk compartment 1105 without activating the system when the rear seats 1197 are down. This is particularly useful in compact cars in which the rear seats 1197 are put down for additional storage. The status of the rear seat position is suitably used to determine whether to generate an alarm condition. For example, if the rear seats 1197 have been folded down and the trunk lid 1108 has not been opened prior to a sensed signal, the controller 1110 determines that any received signal is a false alarm and will not generate an alarm condition.

The rear seats 1197 are also coupled to the controller 1110 such that if the seat position sensors 11 99(*a*) and 1199(*b*) indicate that the rear seats 1197 are in the upright position and an alarm condition is generated, the rear seats 1197 will be released. This will provide a means of escaping from the trunk compartment 1105 into the passenger compartment 1130 of the vehicle 1106. This permits exit from the trunk compartment 1105 without compromising the security of the vehicle 1106.

Speakers 1137 are mounted in the trunk compartment 1105 of the vehicle 1106 so that a recorded message is played when an alarm condition is generated. This message may be recorded by an owner of the vehicle who may have a child who is likely to be trapped in the trunk of the vehicle 1106. Thus, a child trapped in the trunk 1105 of the family car will hear a recorded message by their parent. This message could instruct the child regarding release, i.e. pulling on a manual release handle 1134 or to stay calm.

Alternatively, a solid state chip 1152 is suitably used to output a pre-recorded message when an alarm condition is generated. The content of this pre-recorded message is typically instructions regarding exiting the vehicle 1106.

An illumination source, such as a light, 1139 is coupled to controller 1110 and is mounted in the trunk compartment 1105 to illuminate the compartment 1105. Typically the light 1139 is positioned to illuminate manual release handle 1134. The light 1139 is typically an array of LEDs that are capable of emitting blue light, yellow light, white light, green light, orange light, red light or any combination thereof.

Also, a second illumination source, such as a light, 1135 may be suitably disposed at or within handle 1134 to illuminate the handle 1134 from within. This enables a handle to be illuminated when a person is sensed in the trunk. This is used in conjunction with a pre-recorded message instructing the trapped person to pull the illuminated handle.

Figure 9:
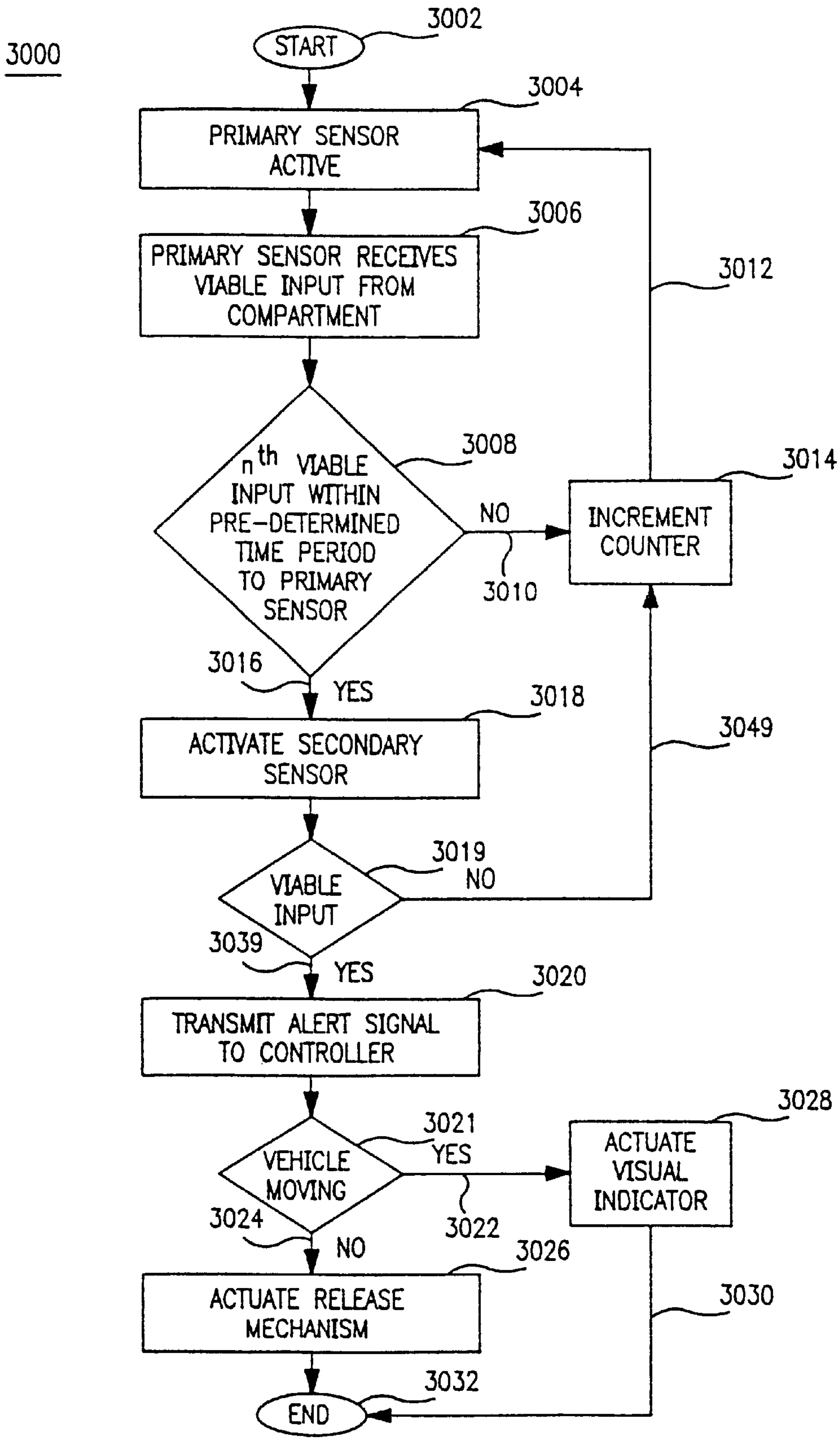
FIG. 9 is a flowchart showing activation of primary and secondary sensing devices.

FIG. 9 is a flow chart 3000 showing steps using primary sensing mechanisms in conjunction with secondary sensing mechanisms to generate an alert condition. These steps are suitably stored on a computer readable medium. This has the advantage that only a minimum number of sensors (i.e., primary sensors) need to be constantly monitoring a compartment area. The primary sensors suitably alert the secondary sensors when the primary sensors sense viable input. This reduces the possibility of false triggers because the secondary sensors confirm that an alert condition is present prior to the controller generating an output to a destination such as an indicator or a trunk release. The steps shown in FIG. 9 are used with primary and secondary sensors that have the capability to determine whether the sensed input is a viable signal. Once that determination has been made by the primary sensor(s) the primary sensor(s) send a primary output signal to the secondary sensor(s). The secondary sensor(s) then begin sensing the compartment area. The secondary sensor(s), where appropriate, transmit a secondary output signal to the controller. The controller uses the secondary output signal to activate a trunk release, illuminate a light source, illuminate an indicator or some other action as described herein.

Alternatively, it is also an embodiment of the invention that the primary sensor(s) transmit all sensed inputs to the controller and the controller determines when to actuate the secondary sensor(s). The secondary sensor(s), once actuated, would transmit all sensed inputs to the controller and the controller determines when an alert condition (i.e., adequate quantity of viable signals within a predetermined period of time) is sensed, and thereby transmit a control signal to a destination.

As shown in FIG. 9, block 3002 is a start block. Block 3004 shows that one or more primary sensors are active to continuously monitor either the cargo compartment or the passenger compartment of a vehicle. The primary sensors are typically low power consumption sensing devices to reduce power drawn by the sensing system. Block 3006 shows that the primary sensor receives viable input from the compartment. Decision block 3008 determines whether or not the number of viable signals received from the primary sensor exceed a predetermined number within a predetermined period of time. Thus, block 3008 helps determine whether a human is being detected. If not line 3010 shows that a counter is incremented as shown in counter box 3014. Line 3012 shows the counter, which has been increased transmits the quantity of signals to block 3004. If a viable signal has been detected line 3016 shows that a secondary sensor is activated as shown in block 3018. The secondary sensors then begin receiving input from the compartment and each of the secondary sensors determine whether or not a viable signal is detected, as shown in block 3019. If not, line 3049 leads to counter block 3014, to increment the counter.

When the secondary sensor(s) determine that a viable signal has been received, a secondary sensor alert signal is sent to controller as shown in block 3020, via line 3039. Block 3021 is a decision block for determining whether or not the vehicle is moving. If it is, line 3022 shows that a visual indicator is actuated. This is typically a tell/tale light as described herein. Line 3030 shows that the process goes to end block 3032. If the vehicle is not moving, line 3024 leads to block 3026 which actuates a release mechanism, which is typically a trunk release mechanism to open the trunk. End block 3032 is then reached.

Figure 10:
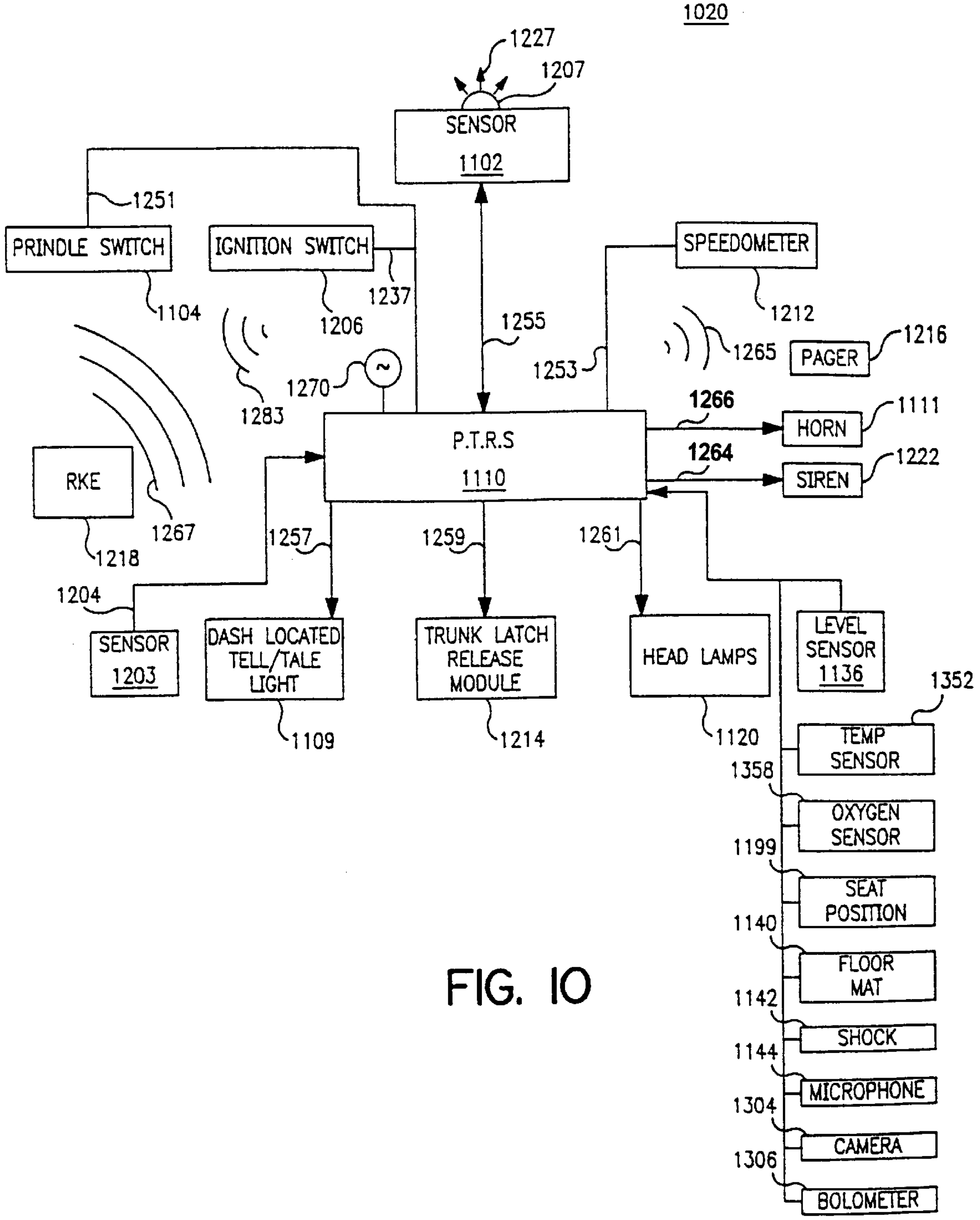
FIG. 10 shows a block diagram of the components of a compartment sensing system.

FIG. 10 is a diagram showing the components of an exemplary compartment sensing system 1020. System 1020 includes sensor 1102 coupled to a light emitting diode (LED) 1207 for emitting light energy 1227. This device provides illumination and may illuminate a release mechanism, for example a symbol or text such as "pull here" which will release the trunk lid. This LED 1207 also suitably flashes when a human is detected and thereby attract the trapped human closer to the sensor 1102 and increase the signal strength. The sensor 1102 also suitably detects variations in a thermal profile of a compartment. Thus, sensor 1102 detects how the thermal profile varies over time; specifically detection of an instantaneous rate of change of temperature (T) with time (t) ($\delta T/\delta t$). The system 1020 can also be used with a manual handle (shown as element 1134 in FIG. 8) which when pulled provides an exit path from the compartment.

The sensor 1102 is coupled to control module 1110 shown as PTRS module, via bidirectional interconnector 1255. The PTRS module 1110 (also referred to as controller 1110) receives alert signals from the sensor 1102 and actuates LED 1207. The PTRS module 1110 is coupled to the transmission gear selector commonly called PRNDL switch 1104, via interconnector 1251. Interconnector 1251 is suitably a wire. Ignition switch module 1206 and the speedometer module 1212 are coupled to PTRS module 1110 via interconnectors 1237 and 1253, respectively. The PRNDL switch 1104, ignition switch module 1206 and speedometer module 1212 generate signals indicative of their current state of operation and transmit them to the PTRS module 1110. The PTRS module 1110 utilizes these signals to determine whether to generate an alert signal and/or latch release signal.

PTRS module 1110 outputs a control signal to tell/tale indicator 1109, which is typically located on the dashboard of the vehicle, via interconnector 1257. The PTRS module 1110 is also capable of outputting an actuating signal to the trunk latch release module 1214 via interconnector 1259. The trunk latch release module 1214 includes a motor and a trunk latch, shown herein as elements 1303 and 1114, respectively. The actuating signal is used to release a trunk lid from a closed position to an open position. The PTRS module 1110 outputs control signals to other destinations such as headlamps 1120, siren 1222 and horn 1111 via interconnectors 1261, 1264 and 1266, respectively. The PTRS module 1110 is also designed to transmit signals 1283 to a remote receiver 1218, such as a remote keyless entry module (RKE). These signals 1283 are used to actuate the RKE module so that the trunk lid is opened. The PTRS module 1110 also transmits signals 1265 to pager 1216 that outputs an indication that the sensor 1102 has generated an alert signal. This indication could be text or a number code displayed on pager 1216.

The sensor 1102 and/or PTRS module 1110 also may receive signals 1267 from a remote keyless entry module 1218. This enables a user to activate an alert signal from a remote location. The PTRS module 1110 is coupled to the Prindle (PRNDL) switch 1104, via interconnector 1251. Interconnector 1251 is suitably a wire. Ignition switch module 1206 and the speedometer module 1212 are coupled to PTRS module 1110 via interconnectors 1237 and 1253, respectively. The Prindle switch 1104, ignition switch module 1206 and speedometer module 1212 generate signals indicative of their current state of operation and transmit them to the PTRS module 1110. The PTRS module 1110 utilizes these signals to determine whether to generate an alert signal.

The compartment sensing system 1020 can be packaged with other trunk components such as a trunk light, an RKE system, and a spare tire assembly to decrease packaging and space requirements.

The sensor 1102 can also sense ambient light and in a situation in which the trunk volume, shown as 1105 in FIG. 8, is not dark, the sensor module 1102 and PTRS module 1110, will not activate the light source 1207.

Additional sensors shown as sensor 1203, which are similar to sensor 1102, may be used for additional detection. Alternatively, the additional sensors 1203 are any combination of the types of sensing mechanisms described herein.

Power supply 1270 is suitably an auxiliary power supply. Power supply 1270 is connected to PTRS module 1110 and provides power to PTRS module 1110. Alternatively, any suitable power supply voltage is acceptable. Specifically, it is an embodiment of the invention to utilize a 42 volt power supply.

Temperature sensor 1352 provides input to the PTRS module 1110. This input is indicative of the sensed ambient temperature in the vehicle cargo compartment or passenger compartment depending on the location of the sensor 1352. The system 1020 receives temperature input to determine if a hazardous condition exists in the interior of a vehicle due to heat. If the temperature module 1352 senses that the vehicle passenger compartment exceeds 70 degrees Fahrenheit, and an alarm condition is generated, the system 1020 might also start the car engine and automatically turn on an air conditioning system in the vehicle, opens automatic windows of the vehicle and/or unlock the doors of the vehicle. Seat position sensor 1199, level sensor 1136, oxygen sensor 1358, shock sensor 1142, microphone 1144, camera 1304, bolometer 1306 and floor mat sensors 1140 also provide input to the PTRS module 1110 indicative of the various conditions. (See discussion relating to FIG. 8.)

Any combination of the above-listed sensors may be used to provide input to PTRS module 1110.

The system 1020 suitably functions as an anti-theft alarm system when sensors 1102 and 1203 are mounted in the passenger compartment of the vehicle (shown as compartment 1130 in FIG. 8). Sensor 1102 is suitably mounted in the dome light or overhead console to sense the presence of a person or animal. When a person or animal is sensed, an alarm condition is generated as described above.

Figure 11:
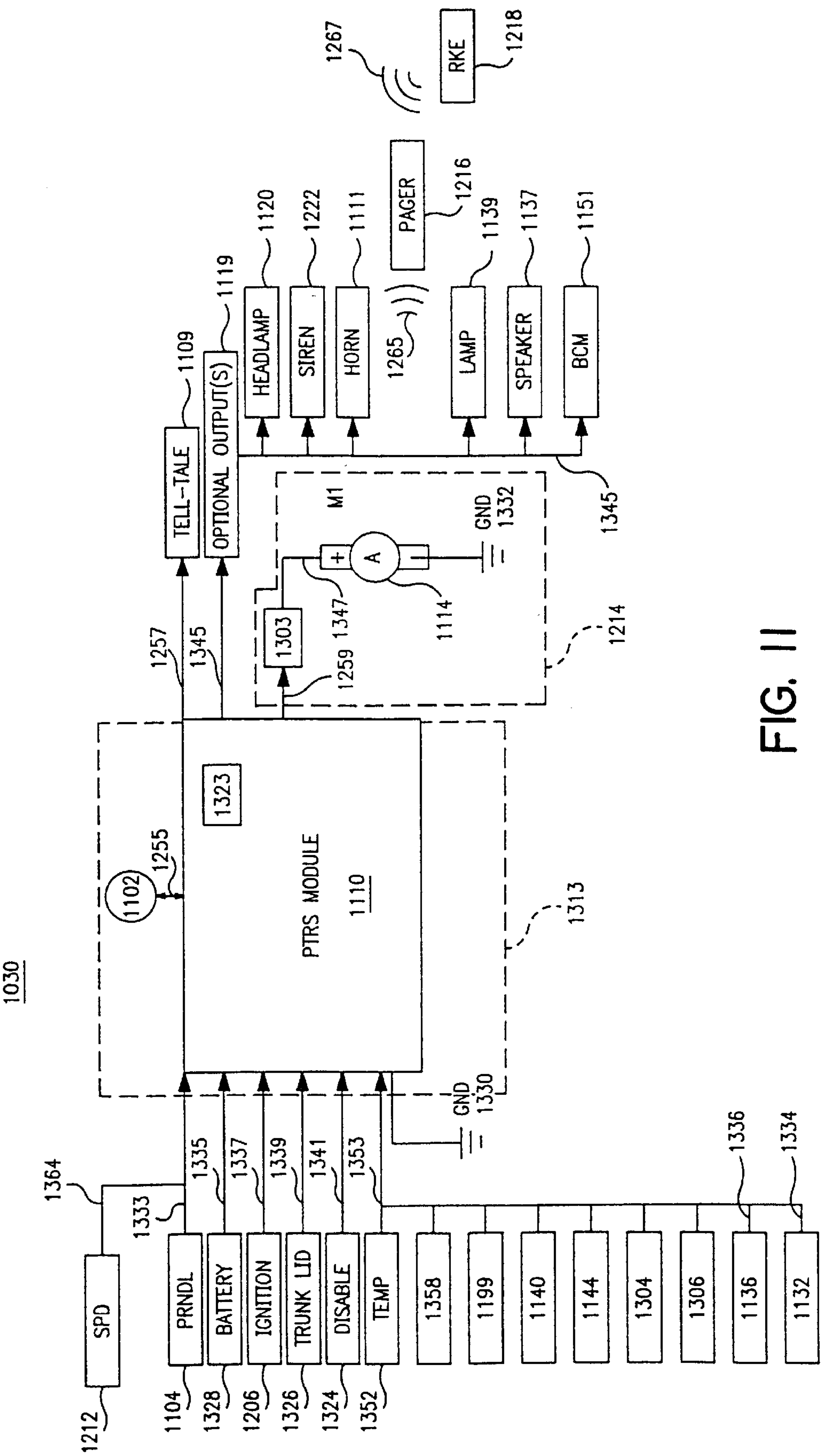
FIG. 11 shows a block diagram of a PTRS module and associated components.

FIG. 11 shows a PTRS module 1110 with a thermal detector module 1102 coupled thereto via bidirectional interconnector 1255. The combined PTRS module 1110 and detector module 1102 forms a detection device 1313. The detection device 1313 utilizes inputs from various input modules to generate one or more outputs. The detection device 1313 is coupled to the input modules and output modules through any one of a variety of transmission means. Although nearly all the interconnections are shown as wires, for reasons of clarity, it is apparent to those skilled in the art that other transmission means can also be used. For example, electro-optical coupling, a wireless transmission means such as radio frequency (RF), Infrared (IR), or microwave. A wireless broadcast network could also be used, a wired network bus, local area wireless network as well as a car area network, controlled area network, local area network. In a preferred embodiment, a protocol such as BlueTooth™ from Motorola is used. Types of transmission means for transmitting signals within a vehicle are disclosed in commonly assigned co-pending U.S. patent application Ser. No. 09/466,010, entitled INTERIOR REARVIEW MIRROR SOUND PROCESSING SYSTEM, filed Dec. 17, 1999, by J. DeLine et al., which is hereby incorporated by reference in its entirely herein. The inputs provide indications of the status of system 1030, which is typically disposed in an automobile, and include, for example, whether the automobile is running or whether the trunk lid is open. Parameters that can be used for the detection device 1313 to make a valid decision as to whether or not to actuate the trunk release mechanism 1114 typically include, status of deck lid (open or closed) ignition switch (on or off), transmission state (PRNDL), vehicle speed, temperature inside trunk, supply voltage at the sensor, time and date when signal triggered, and oxygen level and/or carbon monoxide level in the vehicle compartment.

FIG. 11 shows detection device 1313 receiving power from battery 1328 via wire 1335. The battery 1328 is suitably the vehicle battery and/or an auxiliary power supply to power the PTRS System 1030. Ignition module 1206 provides input to detection device 1313 via wire 1337. This input is indicative of the whether the engine of the vehicle is running. Input from a trunk lid module 1326, which indicates the position of the trunk deck, is received by detection device 1313 via wire 1339. Speedometer module 1212 is coupled to detection device 1313 via interconnector 1364. Speedometer module 1212 produces a signal indicative of whether the vehicle is moving, and more specifically, at what speed the vehicle is moving.

Oxygen sensor 1358 is used to sense the amount of oxygen in a compartment. The oxygen sensor 1358 transmits a signal indicative of the oxygen level in the compartment to detection device 1313 via interconnector 1360. The detection device 1313 utilizes the output from the oxygen sensor to determine how quickly to actuate trunk release mechanism 1114. For example, when the oxygen level is below a predetermined threshold, the detection device 1313 will generate a release signal to actuate trunk release mechanism 1114 more quickly. This reduces the likelihood that a person trapped in a compartment will suffocate.

Alternatively, a gas sensor (such as oxygen sensor 1358 or a carbon monoxide gas sensor) is used to sense the level of carbon monoxide in a compartment. In a situation in which the carbon monoxide level exceeds a pre-determined threshold, the detection device 1313 will actuate the trunk release mechanism 1114 more quickly than when there is no threat of carbon monoxide poisoning to a human being or other animal.

Car seat sensor 1143 also increases sensitivity when present. It is an embodiment to utilize a car seat sensor 1143, coupled to controller 1110. Car seat sensor 1143 is mounted in the passenger compartment and senses if a child car seat is present. Also, a user can set the unit 1143 when installing a child-safety car seat. The child/infant car seat sensor 1143 is used to direct special attention to movement in that area. Infants left alone in a car seat have limited motion since they are strapped in a particular location. The car seat sensor 1143 provides additional protection against a child being left in a child/infant car seat inadvertently.

Level sensor 1136 is coupled to detection device 1313 via interconnector 1336, seat position sensor 1199 is coupled to detection device 1313 via interconnector 1399, motion sensor 1132 is coupled to detection device 1313 via interconnector 1334 and RKE module 1218 provides signals 1267 to detection device 1313.

Floor mat sensors 1140, microphone 1144, camera 1304 and bolometer 1306 also provide input to detection device 1313. The interconnectors are not numbered, but are apparent to those skilled in the art.

Disable signals indicative of the operating status of one or more peripheral modules are transmitted from disable module 1324, via wire 1341 to detection device 1313. The disable module 1324, which is suitably a switch for disabling the system 1030 can be activated by a user to prevent the detection device 1313 from generating a trunk release signal. This enables a user to deactivate the system 1030. The disable module 1324 is typically located on the detection device 1313 or alternatively on the dashboard of the vehicle. Although only one disable module is shown it is apparent to those skilled in the art that a plurality of disable modules may be used with the present invention. A disable module 1324 may be coupled (interconnections not show) to one or more of the peripheral modules to disable selected peripheral modules.

Also, each peripheral module can have a disable switch so that a user can disable any particular module or combination of modules that they wish to disable. Although the individual disable switches are not shown, it will be apparent to one skilled in the art that the disable switches are part of each peripheral module.

There may be instances when it is desired to have the system 1030 non-functional, such as when traveling with pets in the trunk. In order to assure safety, the system 1030 is programmed to reset with every ignition cycle and/or every trunk lid opening so that the operator does not forget that the system 1030 was turned off. Also, the detection device 1313 is suitably programmed so that the disable module 1324 is disengaged when the keys are in the ignition and/or, when the car is running so that a young child would not be able to disarm it. When the disable module 1324 is activated, such as pushing and holding an "ON/OFF" switch down, with the deck lid closed and/or the rear seats up, the system 1030 will recognize this as a trapped human and will immediately activate a response, such as open the trunk lid, flash lights 1120, and/or honk the horn 1111. When the system 1030 is disabled, the tell/tale light 1109 is suitably continuously lit to signal an operator of the vehicle that the system 1030 is disabled.

Another function for the disable module 1324 is a panic-mode button. In this case, depressing the button 1324 and holding the button down, would immediately release the trunk lid as opposed to waiting a pre-determined period of time specified by an algorithm. This would grant the victim immediate release from the trunk.

A self-test feature using a self-test button 1323 is used to demonstrate that the system 1030 is operational. In this mode upon depressing the button 1323, the system 1030 would signal that it is operational by, for example, an audible sound, a dashboard light, and/or a blinking LED. One could enter self-test mode by pressing the self-test button 1323 on the detection device 1313 for a specified length of time or self-test mode could be performed with every ignition cycle. One example of a potential self-test protocol could be as follows:

To initiate the self test the deck lid must be open.

Hold the self-test button 1323 down for 10 seconds, chirp the horn once at 2 seconds chirp horn 3 times at 10 seconds to indicate the self-test mode hand wave to cycle the latch release mechanism and to reset the system.

The detection device 1313 also suitably receives input from PRNDL module 1104 via wire 1333. The signal from PRNDL module 1104 indicates whether the wheels of the vehicle are engaged. The detection device 1313 processes the received inputs to generate one or more output signals. For example, if the trunk lid module 1326 senses that the trunk is in the open position, the detection device 1313 will not generate a signal to actuate trunk release latch 1114, since the trunk lid is not closed. Similarly, if the detection device 1313 receives a signal from the PRNDL module 1104 that the wheels of the vehicle are moving, the detection device 1313 will not actuate the trunk release latch 1114 since opening the trunk of an automobile while the automobile is moving would present a potential safety hazard.

In a situation in which the vehicle is moving, the detection device 1313 would generate a control signal to an indicator. For example the detection device 1313 would output a signal to a tell/tale indicator 1109 via interconnector 1257. The tell/tale indicator 1109 illuminates and thereby provides notification to the operator of the vehicle that an alert situation has been detected, for example a child in the trunk. The operator could then manually open the trunk once the vehicle is stopped.

The detection device 1313 is also capable of generating a control signal to activate other destinations. These destinations include indicators described in relation to FIG. 10 and are shown as headlamp 1120, siren 1222, horn 1111, lamp 1139, Speaker 1137, BCM 1151, and pager 1216 via signals 1265. Depending on the type of vehicle the system output may vary. For some vehicles, the trunk lid can be released through the Body Control Module (BCM) 1151. The BCM 1151 release of the deck lid will require the PTRS system to ground an output to the BCM 1151. For other vehicles, the deck lid must be released directly. The detection device 1313 would then supply a pulse to the rear compartment lid motor 1303, via interconnector 1259. Other indications shown as optional outputs 1119 are activated via interconnector 1345. These optional outputs include for example, a cellular phone call, and ONSTAR™ signal.

The trunk release module 1214, which is typically a motor 1303 and a latching mechanism 1114 for attaching the trunk lid to the vehicle, is actuated upon receiving a control signal, via interconnector 1347, from detection device 1313. In this embodiment the trunk lid input 1326 sends a signal to the detection device 1313 indicating that the trunk lid is not in the closed position. If the trunk lid is open, the detection device 1313 will not actuate trunk release module 1214.

Figure 12:
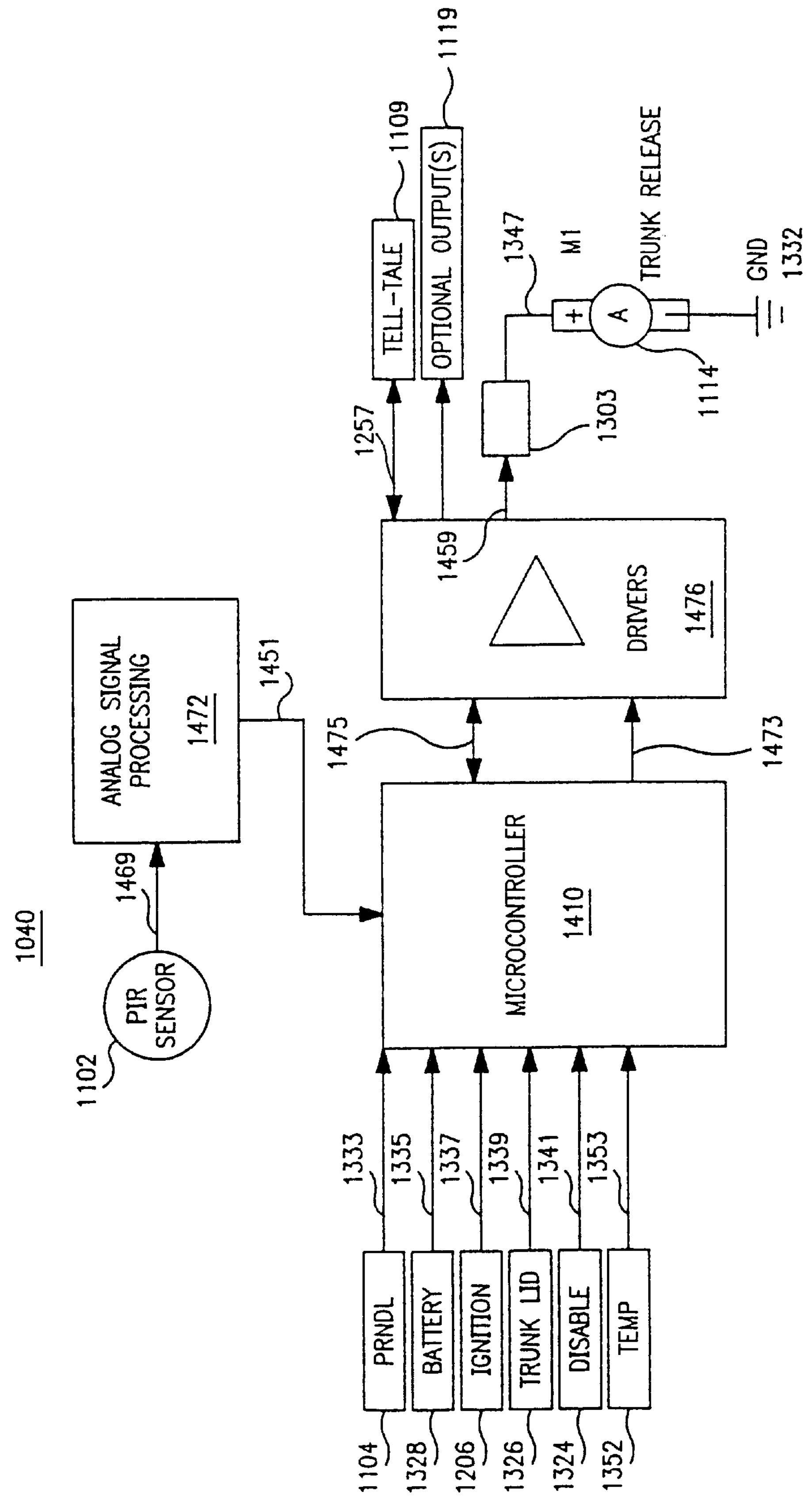
FIG. 12 shows a second embodiment of the compartment sensing system.

FIG. 12 depicts compartment sensing system 1040. FIG. 12 specifically shows a microcontroller 1410 and drivers 1476 for generation of control signals. System 1040 includes PIR sensor 1102 for determining a thermal profile in a compartment. The PIR sensor 1102 transmits a signal representing sensed ambient conditions in a compartment to analog signal processing unit 1472, via interconnector 1469. Analog signal processing unit 1472 processes the input and transmits a signal generated as a function of the thermal profile to microcontroller 1410, via interconnector 1451. Microcontroller 1410 also receives inputs from battery 1328, via interconnector 1335, trunk lid module 1326 via interconnector 1339, transmission gear switch (PRNDL module) 1104, via interconnector 1333, ignition module 1206 via interconnector 1337, disable module 1324 via interconnector 1341 and temperature module 1352 via interconnector 1353. Also, other inputs such as speedometer, floor mats, camera, bolometer, level, motion, microphone and oxygen sensors are also utilized as shown in FIG. 11. The microcontroller 1410 outputs signals to driver unit 1476 via bidirectional interconnectors 1473 and 1475, which are suitably wires. Wires 1473 and 1475 are each two wires for bidirectional communication between microcontroller 1410 and driver unit 1476.

The driver unit 1476 transmits signals from the microcontroller 1410 to output indicators such as tell/tale indicator 1109, and optional outputs 1119. Other output indicators such as horn, headlamps, siren and pager as discussed above are also utilized. The tell/tale light 1109 also transmits a signal to driver 1476 via bidirectional interconnector 1257 indicating the status of the tell/tale light 1109. The driver unit 1476 also outputs a control signal to trunk motor 1303, via interconnector 1459 to actuate the opening of the trunk latch 1114. Thus, the microcontroller 1410 will actuate the trunk latch 1114 on reception of an alert signal generated by the PIR sensor 1102.

Figure 13:
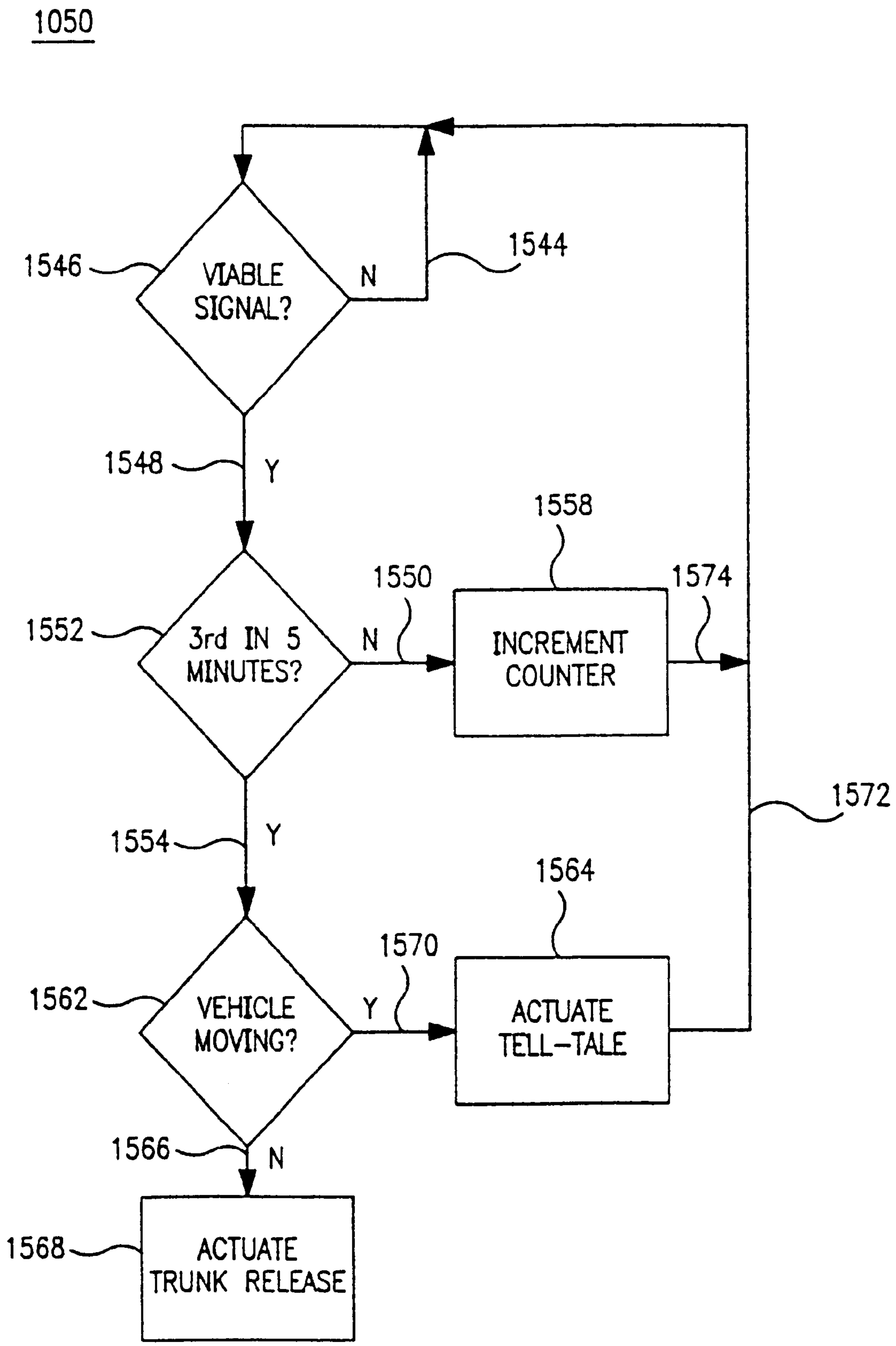
FIG. 13 shows a trunk release algorithm.

FIG. 13 shows trunk release algorithm 1050 to actuate a trunk release upon detection of a viable signal. These steps are suitably programmed and stored on a computer-readable medium. A viable signal is a signal that is produced upon detection of an event. Viable signal decision block 1546 receives input from increment counter block 1558 and actuate tell/tale signal block 1564 via lines 1574 and 1572, respectively.

The viable signal block 1546 outputs a signal via line 1544 if there are no events sensed by the sensors described above. An event is typically a detected activity detected by one or more of the sensors. For example, a thermal detector would designate an event as a sensed change in thermal characteristics of a compartment. If the viable signal module 1546 receives an event signal from the sensor (not shown) it transmits a signal to the checking module 1552 via line 1548. Checking module 1552 makes a determination whether or not a pre-specified number of viable signals have been received in a predetermined period of time. If this is not the case, a signal is transmitted on line 1550 to increment counter block 1558.

Increment counter module 1558 accumulates the quantity of viable signals received until the quantity exceeds a predetermined quantity. The increment counter module 1558 sends output to viable signal module 1546 via line 1574. If the criteria for a viable signal is met, a notification signal is transmitted on line 1554 to a vehicle moving decision block 1562. The vehicle moving decision block 1562 senses whether or not a vehicle is in motion. If the vehicle is moving, the vehicle moving block will not actuate a trunk release and thus prevent the trunk of a vehicle from opening. This is a safety feature to prevent the trunk from opening when the automobile is moving. If the vehicle moving block 1562 senses the vehicle is moving, it will transmit a signal to a tell/tale indicator 1564 via interconnection means 1570, which is suitably a wire, thereby providing an indication that a person or pet may be trapped in the trunk.

If the vehicle moving block 1562 does not sense that the vehicle is in motion when a notification signal is received from checking module 1552, vehicle moving block 1562 transmits a signal to actuate trunk release module 1568 via line 1566. Thus, if a person or animal is sensed in the trunk, and the vehicle is not moving the trunk latch will be released, permitting escape.

Figure 14:
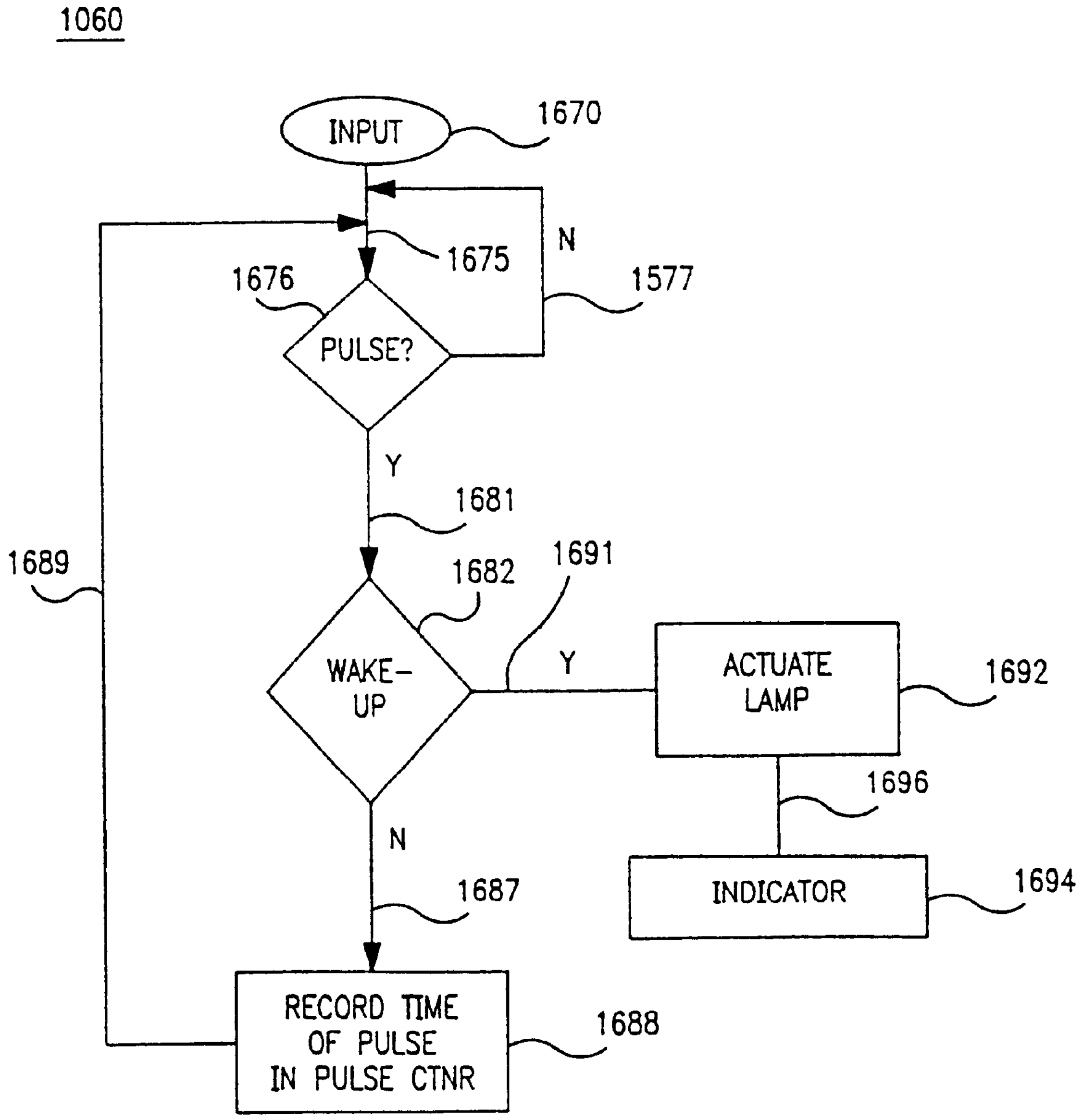
FIG. 14 shows a light source control algorithm.

FIG. 14 shows a flow chart 1060 for controlling a light source mounted in a compartment upon detection of a person or animal in the compartment. This embodiment is suitably used with the latch release mechanism described above. Alternatively, this embodiment is used without the latch release feature and provides light to illuminate a compartment such as a trunk when a person is sensed in the trunk. When a person is sensed in the trunk and the trunk is closed, a light source, mounted in the trunk will be actuated. This permits illumination in the trunk, and thereby facilitate release. In this embodiment, rather than releasing a latch, a light source is activated to enable a trapped person to see in the closed compartment. The apparatus discussed in relation to FIG. 11 is readily modified to include only the components necessary to actuate a light source (light source shown as lamp 1139 in FIG. 11).

FIG. 14 shows a flowchart 1060 of steps that are suitably programmed on a computer-readable medium. These steps are used to actuate a lamp when a viable signal is sensed. Input block 1670 receives input from a sensor (not shown), such as a PIR sensor shown as element 1102 above. The input block 1670 outputs a signal to pulse decision block 1676 via line 1675. The pulse decision block 1676 determines whether or not there is a viable pulse sensed or whether noise or interference has been sensed. If the pulse is not viable, feedback loop 1577 receives a signal to check the pulse signal again. If a viable pulse has been determined a signal is transmitted to wake up decision block 1682 via line 1681. The wake up decision block 1682 determines whether or not a pre-specified number of viable pulses has been received in a pre-specified period of time. If this condition is not met, the wake up decision block 1682 transmits a negative signal to record the time of pulse to timekeeping block 1688 via line 1687.

The recorded time of pulses is transmitted via line 1689 to be input to pulse decision block 1676. If the predetermined number of viable pulses has been exceeded in a pre-specified period of time, a wake up signal is transmitted to actuate lamp block 1692 via line 1691. This causes a light source, such as an LED or lamp, described above or other illumination device to illuminate a compartment. If the light source is illuminated, a signal is sent to an indicator, such as a tell/tale light in the passenger compartment indicating that the lamp in the trunk is "ON." This is shown as line 1696 to tell/tale indicator block 1694.

An air pocket trapped between lens and sensor provides a cavity between the thermal sensor and lenslet or lens surface 1713. This air pocket insulates the sensor from fluctuations in temperature.

Figure 15:
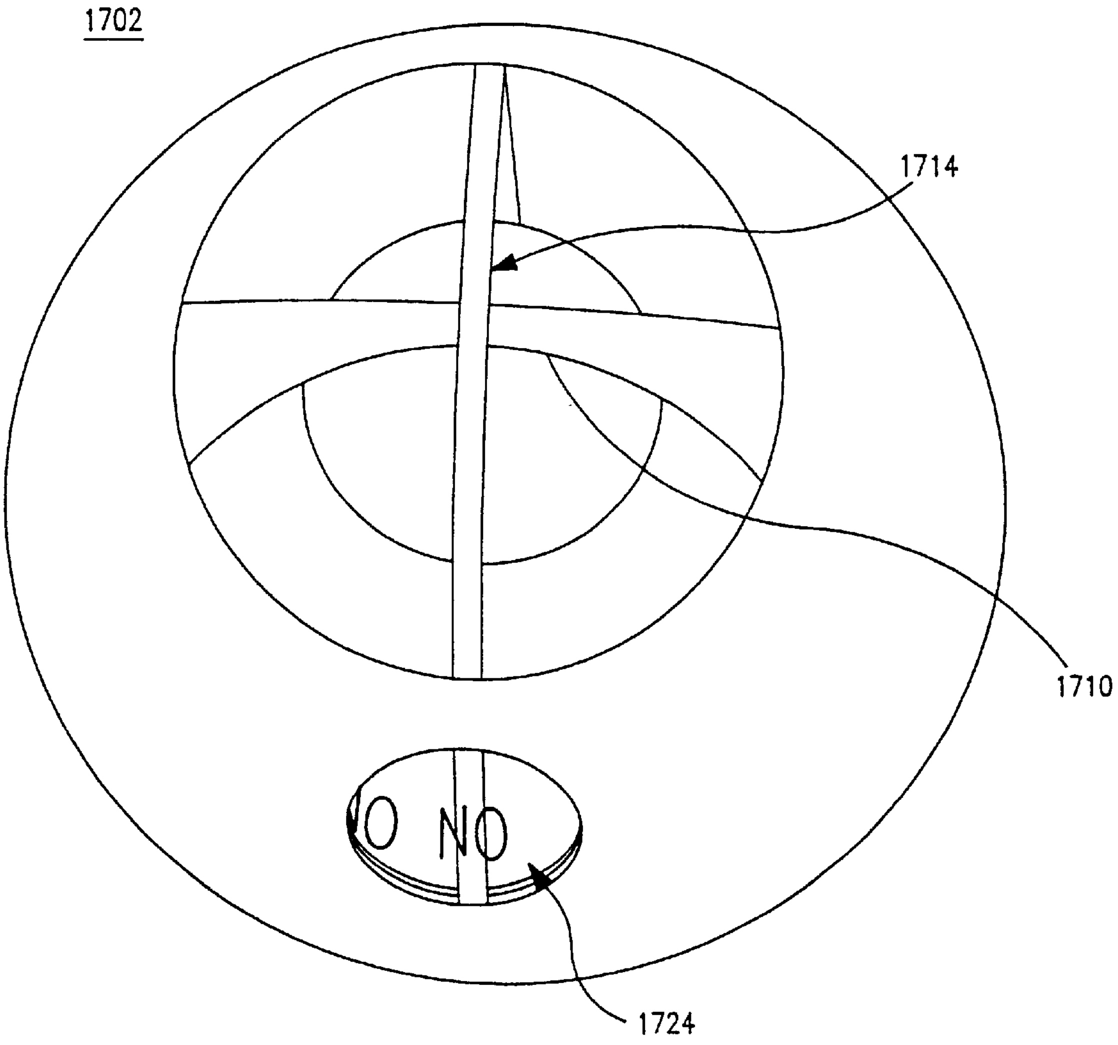
FIG. 15 shows a perspective view of a detector module used with the instant invention.

FIG. 15 shows an overview of a sensing unit 1702. The sensing unit 1702 includes sensor (not shown) with an LED (not shown) and an optic lens. The lens can be made of polyethylene or any other material which provides adequate IR transmission. A housing or guard 1710 protects the optic lens. The housing 1710 can be made from polypropylene, ABS or any other material which demonstrates adequate strength requirements. The housing 1710 protects the lens and also provides a thermal barrier to decrease false alarm conditions. The sensor is preferably disposed behind the lens.

An enable and disable switch 1724 is provided for manual override of the sensing unit 1702. The switch 1724 for the on-off function is preferably recessed within the housing 1710 so that it is not triggered accidentally. The LED or other illumination device is activated as described above and provides sufficient illumination to enable a trapped person to see inside the compartment or pull a manual handle. This facilitates the trapped person locating a release switch in the trunk, particularly if the trunk is dark. The sensing unit 1702 is typically a removable unit, that can be repaired or replaced with minimum time and effort.

Ribs 1714 provide a means of protecting the sensor and optic lens from being damaged by objects impacting the sensor and optic lens.

Figure 16A:
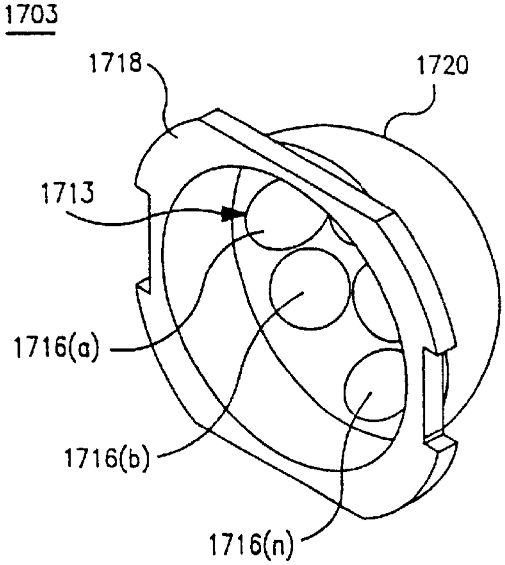
FIGS. 16A and 16B show perspective views of a lens used with the instant invention.
Figure 16B:
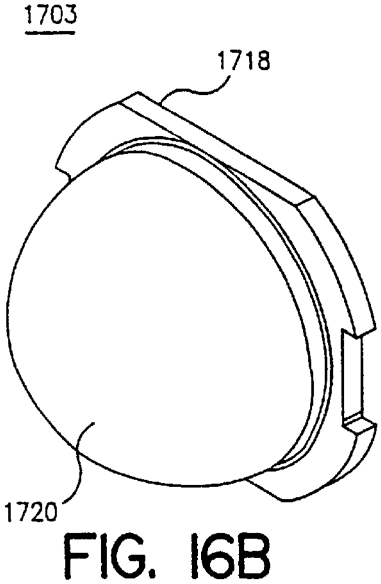

FIGS. 16(A) and 16(B) show schematic views of a lens 1703 that is suitably used with the instant invention. FIG. 16A shows an interior portion of lens 1703 and FIG. 16B shows an exterior portion of lens 1703. In order to maximize the signal that pyroelectric elements sense from a defined object e.g. a human being or animal, such as a pet, the pyroelectric element of the signal is proportional to $f/(f/\#)^2$; $f/\#=f/D$ where f is the lens focal length, # is the lens number, and D is the diameter of the lens. The preferred signal has the shortest focal length possible along with a large diameter lens aperture.

As shown in FIGS. 16A and 16B, a plurality of lenslets 1716(*a*) . . . (*n*) (where n is any suitable number) are used to form lens surface 1713 and increases the sensing ability of the device. An optical design consideration is the magnification of the object caused by the lenslets 1716(*a*) . . . (*n*). Due to the preferred detector arrangement of two electrically opposed pyroelectric elements (not shown), the image of the object to be detected needs to be small enough so that the two signals from the pyroelectric elements add constructively. This requires the use of short focal length lenslets, which typically have a focal length between approximately 5 and 11 mm and preferably approximately 9.3 mm.

The focal lengths of the lenslets are chosen to be just short enough so as to provide an image that produces constructive interference between the two parallel electrically opposed pyroelectric elements. In some pyroelements the elements are in electrical series. Each individual pyroelectric element comprises a piezo-electric element. Preferably the polarity of the one is connected so as to oppose the polarity of the other so that when both are exposed to the same influence they mutually cancel. This feature enables the sensor to distinguish movement from ambient conditions. If the ambient condition is changing all lenslets on average sense the same. The diameter of the lenslets are then made as large as physically possible. Typically, the allowed diameter is constrained by the area of coverage required in the trunk area. Since one lens typically cannot cover the entire area, multiple lenslets 1716 will be used that are located close to each other, similar to a fly's eye arrangement. The spacing of the lenslets 1716 is determined by the size of the image. The purpose is to allow a sufficient gap between the field of view in neighboring lenslets 1716 so that the image produces signals from the elements that add constructively.

The lens 1713 arrangement typically looks similar to a fly's eye with between approximately 3 and 6 lenslets 1716 across a diameter for a total number of lenslets 1716 from approximately 9 to 36. The lenslets 1716 will typically be between approximately 5 and 15 mm in focal length with diameters of between approximately 2 and 10 mm. In order to sense objects in the 8–14 micron range, the lens surface 1720 material will typically be a form of polyethylene. This material requires that the lens surface 1720 have clear apertures that are less than approximately 1.5 mm thick and in the final product will be approximately 0.5 mm thick.

The amount of energy radiated by objects in the thermal area is not only proportional to temperature, but is also a function of the objects' emissivity. Thus even if objects in the trunk compartment and portions of the trunk compartment (where the objects in the trunk and portions of the trunk comprise background emissions) are at the same temperature, the objects and portions may not be emitting the same amount of energy. Since the sensors sense changes in the compartment, the fact that the background emissions (ie., the objects and portions) may not be radiating uniformly, even when the objects and portions are at the same temperature, reduces the likelihood that a human being or pet will blend into the background and remain undetected. In order to take maximum benefit of this situation lenslets 1716 are suitably aimed at particular locations in the trunk which are known to have different emissivities. Preferable background items to aim the lenslets 1716 at are trunk carpet, black plastic and metal objects as well as other portions or objects in the trunk compartment that have a relatively constant emission.

Alternatively, the lenslets 1716 could be aimed at portions of the trunk compartment that typically do not reach the same temperature as the majority of objects in the trunk. For example, particular locations on the trunk carpet may be thermally coupled to various portions of the vehicle body resulting in a different equilibrium temperature than the majority of the carpeted area. A different equilibrium temperature typically results in a different radiative output. This variation in output reduces the uniformity of the background and reduces the likelihood that a child could blend into the background and not be detected by the sensor. One preferred trunk area to aim the lenslets 1716 is the spare tire compartment because of metal objects typically located there and a volume that forms a cavity.

Other features of the lens 1703 include a continuous outer optical surface 1720, spacing of the lenslets 1716, thin wall sections, a protective ribbing for the lens, varying lens apertures and focal lengths using aspherics, auxiliary lens features and using short focal length lenslets 1716 to increase stiffness.

Although refractive lens surfaces work in the trunk sensor application, alternatively, diffractive lens surfaces are also used instead of, or in conjunction with, refractive surfaces. A diffractive approach has the advantage of potential to balance-out chromatic aberrations. Thin lens sections would allow higher light transmission. Diffractive surfaces are easier to fabricate than they are for visible applications due to the larger diffractive surfaces used in the thermal infrared.

Refractive Fresnels

Fresnel lenses allow the introduction of thin lens sections for higher light transmission. Small Fresnel lenslets arranged in a roughly dome-shaped configuration are used.

Continuous Outer Optical Surface

FIGS. 16A and 16B show a lens 1703 with continuous outer optical surface 1720 having a smooth outer surface which is defined mathematically, for instance, a conic section or a two-dimensional polynomial function. It is preferred for the optical portion of the outer surface not to contain any discontinuities in its derivative. This allows the relative alignment between the outer and inner lens surfaces to not be as critical, thus reducing the manufacturing cost.

Spacing of Lenslets

Figure 17:
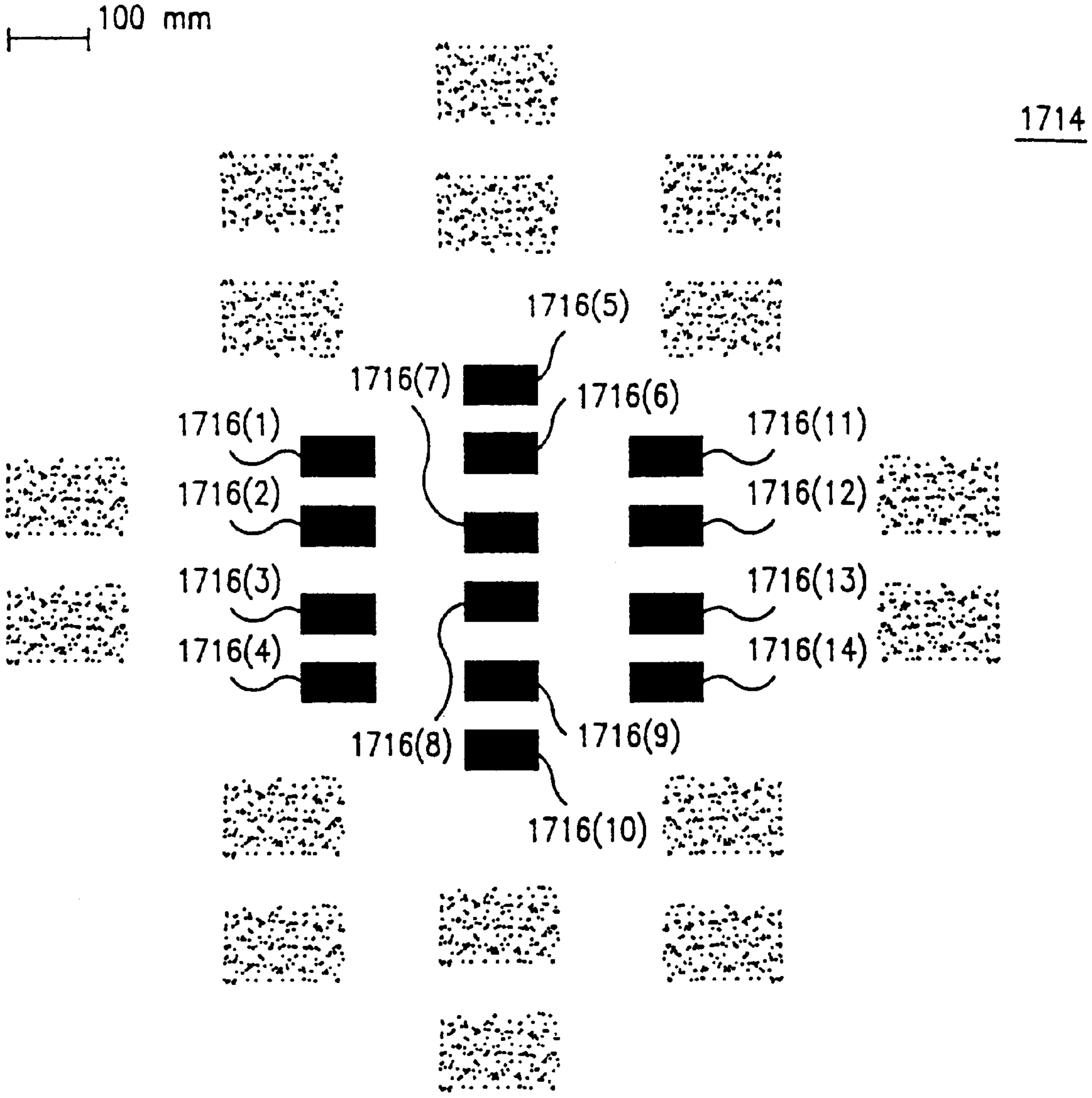
FIG. 17 shows a lenslet array used with the instant invention.

The use of a dual-element detector in lens applications utilizes a particular lenslet arrangement. The primary purpose of the lenslet 1716 is to provide a large detector field of view. The lenslets 1716 are typically arranged so that the projections of the two detector elements do not overlap. Partial overlapping could cause a reduction in signal intensity and a complete overlap could substantially diminish the signal intensity. The lenslets 1716 are typically arranged so that an object moving in any direction will first cross the field of view of one detector element and then the field of view of another detector element thereby providing a maximum signal. FIG. 17 shows the projection of the elements through a 15 lenslet design showing lenslets 1716(1) . . . (15). This arrangement has been optimized to detect horizontal and vertical movement.

Thin Wall Sections and a Large Optical Area

The signal received by the detector elements is proportional to $D^2\exp(-A\ t)$ where D is the optical aperture diameter, A is a material constant, and t is thickness. Typically, in most optical designs the exponential term is insignificant. Most plastics do not transmit infrared light well. Polyethylene is an economically feasible plastic for the lens 1720. In order to increase signal intensity, the lens thickness, t, must be as small as possible and the aperture diameter, D, as large as possible. If the lens surfaces 1720 are continuous surfaces, not Fresnel surfaces for instance, then the large D and small t parameters drive the lens edge thicknesses to be quite thin. Typical magnitudes for D are between approximately 3 mm and 6 mm and preferably about 4.3 mm. Typical magnitudes for t are approximately between 0.7 mm and 1.25 mm and preferably approximately 0.75 mm.

Protective Ribbing for Lens

Due to the lens wall thickness, the lens 1720 may need to be protected from damage. Referring to FIG. 15, preferably this protection will be offered by the device housing 1710 since the housing will typically be made from a stronger plastic, for example, glass-reinforced nylon, or acetal. The housing 1710 will provide thin ribs 1714 across the lens and partial ribs so as not to interfere with the lenslets fields of view. In this way the lens is protected from deformation by most items and forces that might otherwise destroy and/or distort the trunk sensor lens.

Variation of Lens Apertures and Focal Lengths

As shown in FIG. 17, typically the trunk sensor interior lens surface 1713 contains 15 separate the lenslets 1716(1) . . . (15). To remove cosine effects the lenslet apertures and/or focal lengths could be changed. Varying the focal lengths is a feasible solution but requires that the outer lens surface (shown as element 1720 in FIGS. 16A and 16B) be aspheric.

Use of Aspherics

Using aspheric surfaces can reduce spherical aberration, which is a source of aberration effecting the lens performance. Also, arranging the lenslets 1716 so that they form a geodesic dome shape increases lens stiffness and is compatible with an optimum lens arrangement.

Auxiliary Lens Features

Since the trunk sensor lens 1703 is typically fabricated from a pliable plastic, it is advantageous to include other mounting features and structures into it. Auxiliary features such as heat stake/orientation posts, a key-cap, and a mounting ring or plate facilitate mounting the sensor to either the trunk compartment or the passenger compartment of a vehicle. A mounting plate 1718 is shown in FIGS. 16A and 16B.

Focal Length Lenslets for Stiffness

The lenslet 1716 focal lengths not only effect the system's optical performance but its resistance to damage as well. Polyethylene, when used in thin wall sections (less than about 1.0 mm), is relatively pliable. The lens shape is designed to prevent lens damage. A hemispherical shape with a radius of about 12 mm or less increases lens strength, making it less vulnerable to damage when mounted in a car trunk.

Figure 18:
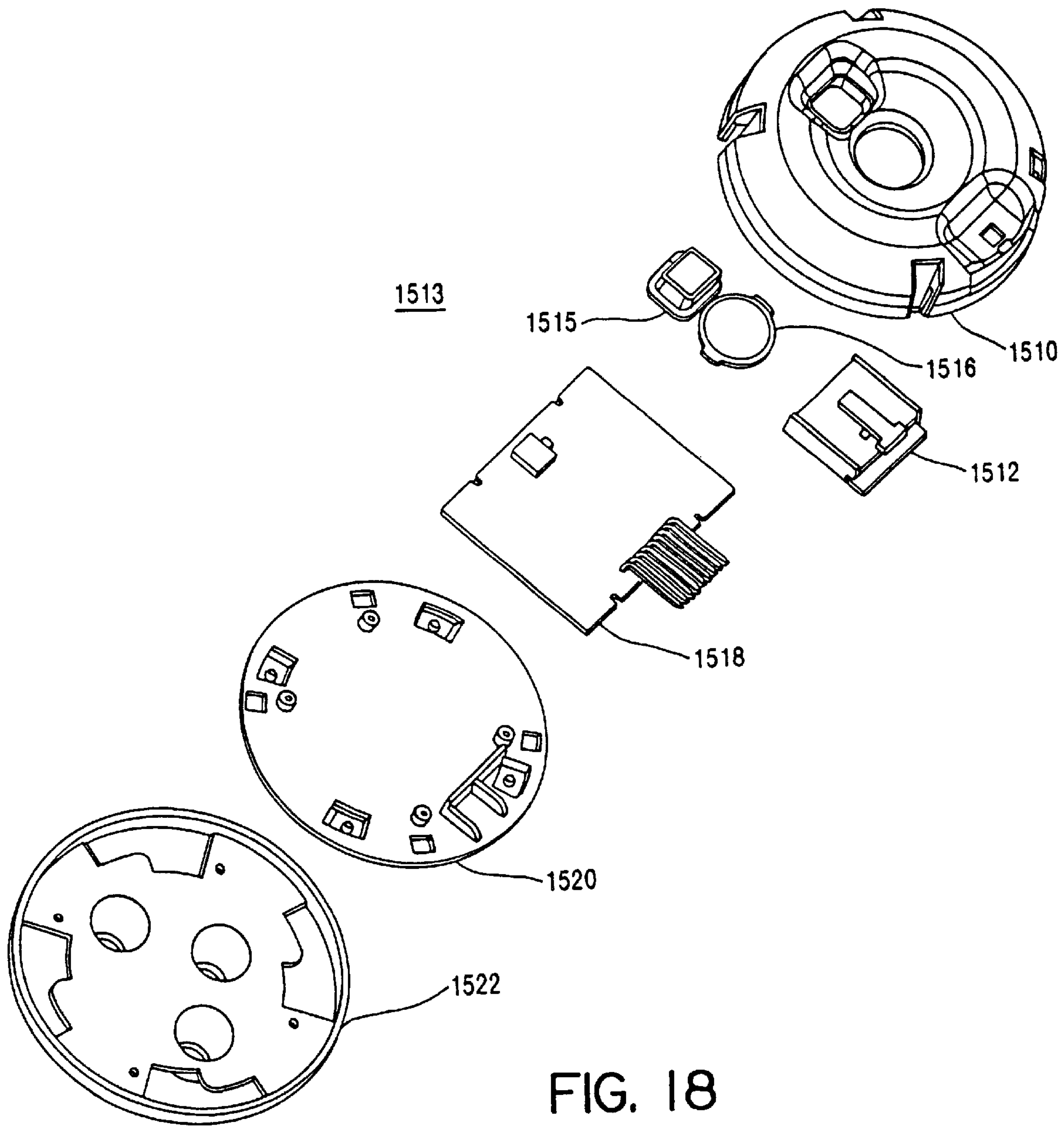
FIG. 18 shows an exploded view of a detector module used with the instant invention.

FIG. 18 shows an exploded view of detector 1513. Detector 1513 includes connector 1512, a lens cover 1510 and a base plate 1520. Lens cover 1510 and base plate 1520 join together to form a housing. A lens 1516 attaches to the cover 1510. A printed circuit board (PCB) 1518 is sandwiched between the cover 1510 and the base plate 1520. A clear button (on/off or panic) 1515 is used to activate or deactivate the device 1513. An LED (not shown) is situated behind the button 1515 so it illuminates the button 1515. The cover 1510 conceals and protects the connector 1512. The lens 1516 is recessed in the cover 1510 so it is protected from inadvertent damage by luggage and other objects in the trunk. Mounting device 1522 is used to mount the detector 1513 to a surface of a trunk compartment.

The printed circuit board (PCB) 1518 suitably has a memory associated therewith to record and store the behavior of the device 1513. Thus, the device 1513 stores previous received signals and thereby decreases the possibility of a false alert situation because previous alarm conditions, ie. state of peripheral modules, is stored in a memory on PCB 1518.

Figure 19:
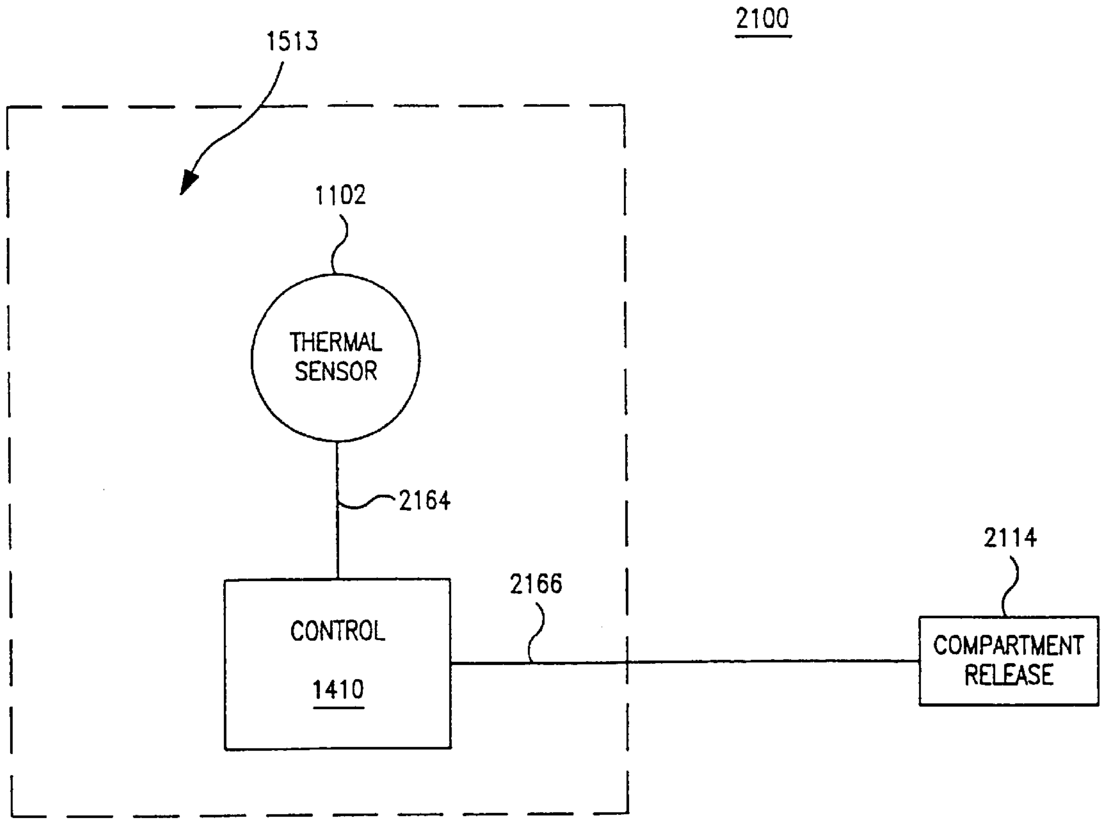
FIG. 19 shows a third embodiment of the compartment sensing system.

A specific embodiment of the present invention is shown in FIG. 19. The vehicle compartment occupancy detection system 2100 of FIG. 19 comprises a vehicle compartment occupancy detection assembly 1513 and a compartment release 2114. Detection assembly 1513 detects the presence of a living occupant within a compartment and preferably determines such occupancy by detection of movement by living beings (such as a child or an adult or a pet) within the compartment.

Preferably, vehicle compartment occupancy detection assembly 1513 comprises a thermal detector 1102 (such as a pyrodetector) that detects the differential in thermal energy generated by, for example, movement of a human having a body temperature typically at about 98.6 degrees Fahrenheit within the compartment. The ambient temperature within the compartment will mostly always be different than body temperature; for example, the air in a closed vehicle trunk compartment can reach a temperature of 150 degrees Fahrenheit, or higher, when parked in a hot climate, or as low as 20 degrees Fahrenheit, or lower, when parked in a cold climate. Thermal sensor 1102, most preferably a pyrodetector, monitors the thermal characteristic of the internal volume of the vehicle compartment (such as the trunk space in a vehicle trunk).

Thermal sensor 1102 generates an output signal 2164 indicative of the thermal characteristic of the compartment space being monitored. Signal 2164 is indicative of the thermal characteristic of the compartment and is provided to a control module 1410, where it is processed to produce an output signal 2166 indicative of detection of occupant presence in the compartment. Signal 2166 causes actuation of compartment release 2114 (such as electrically powered retraction of a trunk lid latch to allow the trunk lid to open), thus allowing escape of the detected trapped occupant.

In an embodiment in which the compartment comprises a trunk of a vehicle, the vehicle compartment occupancy detection system comprises a passive trunk release system (PTRS). The passive trunk release system comprises a PTRS module as described in FIG. 10, that can be mounted within the trunk of a vehicle. Preferably, the PTRS module is mounted in the trunk at a location above the floor of the trunk in order to reduce potential damage from objects loaded into the trunk. Suitable trunk mounting locations include sidewalls, a front or a rear wall, the trunk lid that lifts when the trunk is opened and a trunk roof portion such as under the parcel shelf of the interior cabin. Locating the PTRS module at the trunk portion below the parcel shelf is a preferred location as this location is typically recessed and relatively stable to opening/closing of the trunk lid, yet provides a suitable field of view of the trunk interior.

Figure 20:
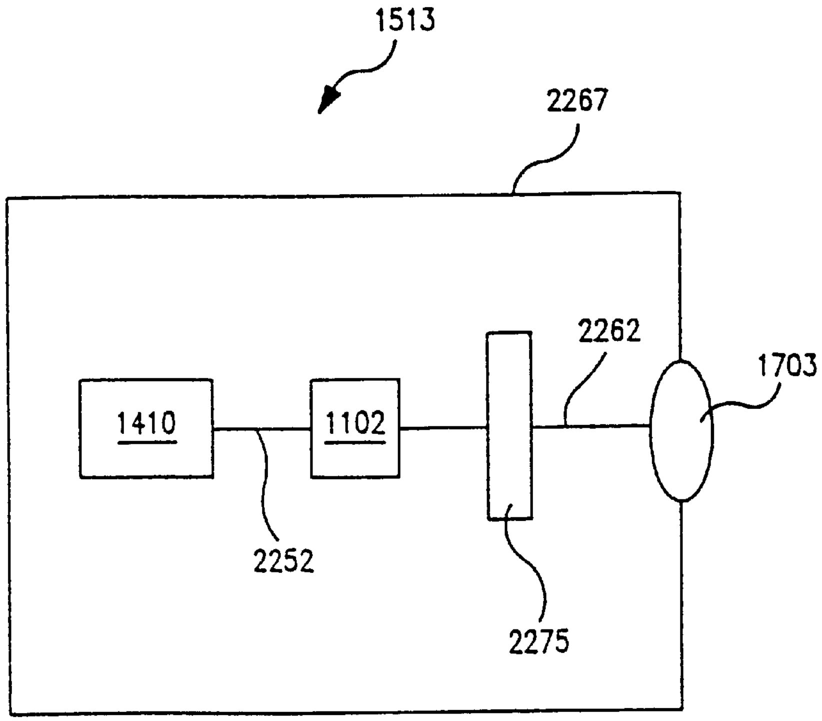
FIG. 20 shows a diagram of a detector module.

FIG. 20 illustrates an example of a PTRS detection module 1513. The vehicle occupancy detection assembly 1513 comprises a housing 2267, a lens 1703, a filter 2275, as well as thermal sensor 1102 and control module 1410. Lens 1703 is disposed in front of thermal sensor 1102.

Filter 2275 may be disposed between thermal sensor 1102 and lens 1703 (such as is shown in FIG. 20), or may be disposed in front of lens 1703. Also, filter 2275 may be part of lens 1703 such as a coating or a multilayer of coatings disposed on a surface of lens 1703. Further, filter 2275 can be formed as a component or composition of lens 1703, such as by including radiation absorbing and/or reflecting materials into the construction and/or composition of lens 1703 in order to form a filtering lens. As shown in FIG. 20, lens 1703 is coupled to filter 2275 via connector 2262. Filter 2275 is coupled to thermal sensor 1102. Thermal sensor 1102 is coupled to control module 1410 via interconnector 2252.

Filter 2275 may also be an integral part of the mechanical assembly constituting sensor 1102.

The spectral bandpass of filter 2275 along with the spectral bandpass of lens 1703 is chosen so as to facilitate transmission of infrared radiation in a spectral bandwidth useful for pyrodetection of movement of a human body in a closed trunk compartment, but with a reduced transmission of incident radiation at wavelengths outside the wavelengths that carry the majority of radiation emitted by a living person.

The majority of the spectral output of a human body at 98.6 degrees Fahrenheit typically has a range between about 3 and 14 microns and peaks around 9.3 microns. Preferably, the spectral bandpass of the optical element such as filter 2275 and/or lens 1703 is configured to be highly transmitting to the spectral signature generated by a human, and to reduce transmission of, or block, wavelengths outside this human characteristic signature so as to reduce the possibility of false triggers of vehicle compartment occupancy detection system such as the heating or cooling of walls of the compartment or thermal draughts caused by heated or cooled air movement in the compartment.

Also, the bandpass of the optical elements such as filter 2275 and/or lens 1703 is preferably configured to optimize the spectral sensitivity of thermal detector 1102. Filtering can be by absorbtive filtering and/or by reflective filtering. Typically, such filtering has a radiation transmission bandpass higher than about 8 microns and lower than about 14 microns; preferably between about 8.5 microns and 12 microns. Outside these spectral ranges, filter 2275 and/or lens 1703 is substantially non-transmitting so as to restrict the wavelengths of radiation incident on thermal sensor 1102 to those characteristic of a trapped occupant. Humans may also be detected at about a 3–5 micron range.

Thermal detector 1102 is preferably a dual-element detector, preferably comprising two pyroelectric elements disposed side by side. One of the two pyro-elements is preferably electrically poled opposite to the other, and the elements are thermally isolated from one another. Both elements are typically established, coplanar, on a common substrate.

It is also an embodiment to place any suitable number of elements in parallel opposed format (i.e. 2, 4, 6, etc.). Such a configuration would increase sensitivity and decrease the likelihood of false alarms.

Lens 1703 preferably has a field of view and focal length selected to optimize detection of a child trapped within a closed automobile trunk compartment while minimizing the occurrence of system false triggers due to non-human generated thermal differentials. While the specific selection will vary from one vehicle trunk configuration to another, in general it is preferred that lens 1703 have a field of view of at least about 40 degrees, more preferably at least about 70 degrees, and most preferably at least about 100 degrees. In general, the objective of the system optics is to provide comprehensive monitoring of the trunk compartment volume while obviating potential contributors to errant thermal signals such as from the heated or cooled walls of the trunk compartment.

It is also an embodiment to incorporate reflectors fabricated of, for example aluminum, gold or other suitable material, as known by those skilled in the art. Such reflectors increase the field of view for each sensor. This is desirable for interior applications.

Lens 1703 may comprise a single lens element or multiple lens elements, and may comprise a diffractive optical element and/or a refractive optical element. Preferably, lens

1703 comprises a wide angle lens and more preferably, lens 1703 comprises a plurality of lenslets arranged substantially hemispherically in front of thermal sensor 1102. In such an arrangement of multiple lenslets formed as a canopy over thermal sensor 1102, any two lenslets can be viewing two spaced but closely adjacent locations within the interior volume of a closed vehicle trunk. Differentials in thermal characteristic between the two locations is thus sensed by the optics and dual-element pyrodetector of the vehicle occupancy detection assembly 1513, and the presence of a child or equivalent body in the trunk compartment can be determined. By selecting the field of view and focal length of the individual lenslets, the internal volume of the trunk compartment can be preferentially monitored (a child will move in this volume) while minimizing thermal imaging of walls, floor panels and other portions of the compartment that potentially could contribute spurious thermal signatures leading to a false trigger event.

Figure 21B:
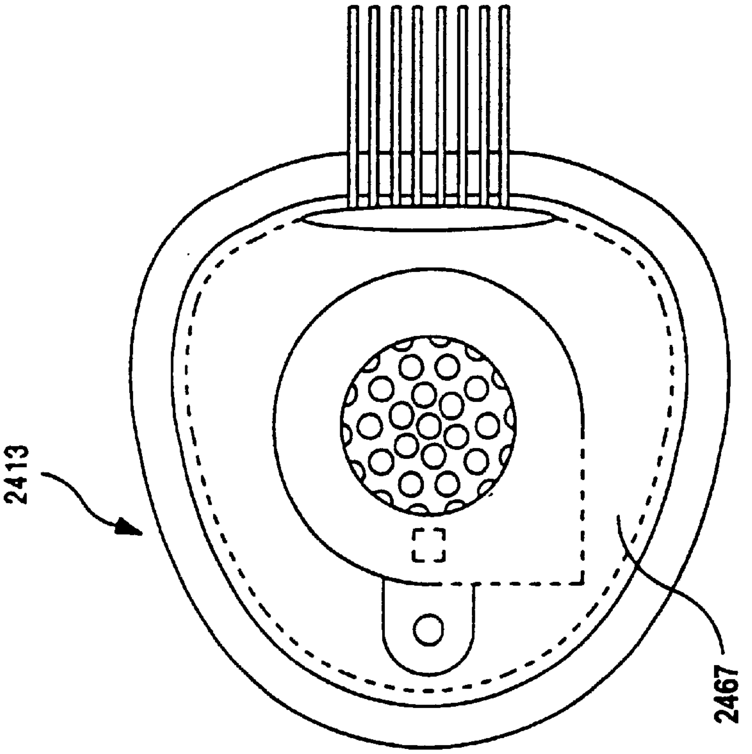
FIGS. 21A and 21B show views of the detector module.
Figure 21A:
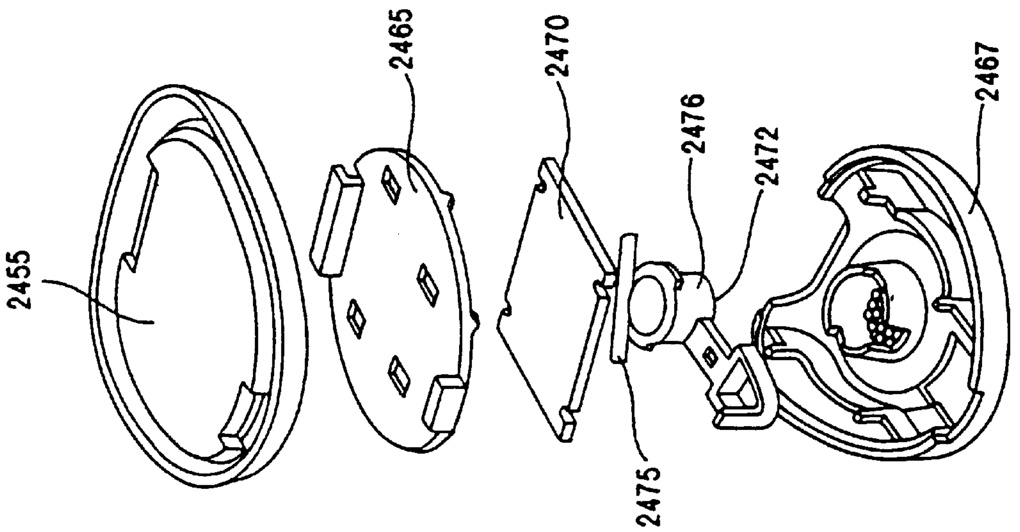

FIGS. 21(A) and 21(B) show two views of PTRS detection unitary module 2413. An exploded view is shown in FIG. 21(A) and a perspective view is shown in FIG. 21(B). The components attach to an adapter plate or mount 2455 that secures to an inner surface of a vehicle trunk compartment, such as to a sheet metal section. Mount 2455 can attach by an adhesive, such as an adhesive strip, or by mechanical attachment such as by screws, bolts, fasteners or snaps. A backplate 2465 attaches to mount 2455, preferably in a detachable fashion via fasteners or snaps so that the PTRS detection module 2413 is removable for replacement or service. Trunk constructions, and their interior surfaces, sizes and dimensions, vary from one vehicle model to another. A mount 2455 permits the detection module 2413 to be mounted in a variety of locations.

The arrangement as illustrated in FIGS. 21(A) and 21(B) shows that the mount 2455 can be customized for a particular vehicle model, but a standard and universally usable PTRS unitary detection module 2413 can be fabricated, and used in a wide variety of vehicle models by attaching to the customized mounting plate 2455 in a particular model. PTRS unitary detection module 2413 includes a housing 2467 that accommodates a printed circuit board 2470, which typically includes a thermal sensor and circuitry for a controller, as shown in FIG. 10, a lens 2472, a filter 2475, connectors and sockets for electrical inputs and outputs and a useroperable button 2476 for deactivating the PTRS unitary detection module 2413, if desired, and/or for performing a system self-test function in order to verify that the module 2413 is functional. Button 2476 is preferably backlit by a light source to aid visibility, especially at night, for example by a light emitting diode.

Preferably, lens 2472 is positioned in a crater formed by side-walls of housing 2467 so that the lens 2472, and the thermal sensor disposed therebehind, is protected by the walls of housing 2467 from damage by objects stored or placed in the trunk. Also, by disposing the lens 2472 in a well formed by the walls of housing 2467, the field of view of lens 2472 can be restricted, and the lens/thermal sensor in the module 2413 can be protected from spurious thermal draughts.

Optionally, housing 2467 can disconnect from backplate 2465 to allow service access to the thermal sensor and/or circuitry of the controller. Alternately, housing 2467 and backplate 2465 can be sealed so that the PTRS detection module 2413 is sealed against water, dust, dirt and other debris.

Figure 22:
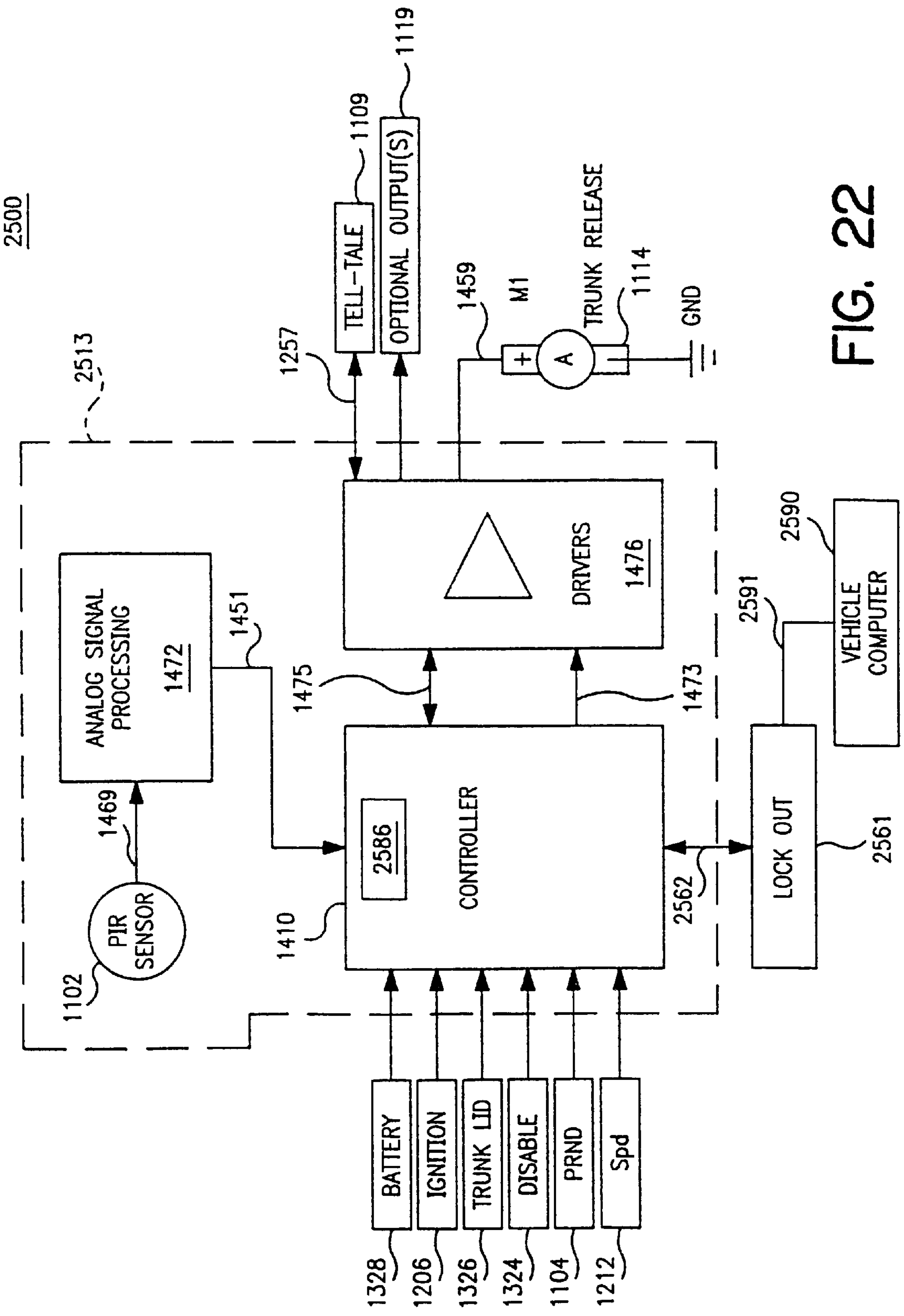
FIG. 22 shows a detector module used with a lock-out module.

FIG. 22 shows system 2500 including detection device 2513, input modules and output modules. Detection device 2513 includes a sensor 1102, analog signal processor 1472, controller 1410 and drivers 1476. Sensor 1102 generates an alert signal and this signal is processed by analog signal processor 1472. Controller 1410 includes a microcontroller 2586, preferably based on a microprocessor or microcomputer. Controller 1410 receives the processed alert signal from analog signal processor 1472 via interconnector 1451.

Detection device 2513 receives various inputs. An input 1328 provides vehicle battery power (typical 12 volts DC, although higher battery voltages such as 42 volts are contemplated for use automobiles) to detection device 2513. Ignition input 1206 provides input from the vehicle ignition system should it be desired to operate the vehicle occupancy detection system while the vehicle engine is operating. Ignition input 1206 also provides a signal regarding the status of the engine. Trunk lid input 1326 provides a signal from the trunk lid indicative of whether the trunk lid is open or not. For example, a proximity switch such as a Hall probe or a spring-loaded closure switch is suitably provided on the trunk lid. If the trunk lid closure switch 1326 indicates that the trunk lid is open, then an input is provided to detection device 2513 that will disable its operation. This is useful when the vehicle is parked whereupon the PTRS module 2512 circuitry would be automatically activated and when the trunk lid is purposely opened by the vehicle owner to access the trunk. Upon opening the lid, the detection device 2513 circuitry is automatically disabled, thus obviating inappropriate and unneeded repetitive actuation of the trunk release mechanism 2144 by the detection device 2513 as the driver reaches into the trunk cavity to place or retrieve objects.

Detection device 2513 is connected to a lockout module 2561 via bidirectional interconnector 2562. Lockout module 2561 prevents inadvertent actuation of the trunk occupancy detection system 2500 while the vehicle is in an operating state, such as driving on a highway, or when the engine is idling in traffic or idling when stopped at road-side. An example of a lockout circuit is disclosed in U.S. Pat. Nos. 5,371,659 and 5,669,704, both of which are hereby incorporated by reference in their entirety herein. Lockout circuit 2561 is responsive to the vehicle transmission being placed in gear via PRNDL module 1104 as well as responsive to a sensor sensing the speed of the vehicle via speedometer module 1212. The lockout circuit 2561 may also be included in the vehicle ignition system such that the detection device 2513 is disabled when the engine is started and the vehicle is operating. Thus, the trunk release mechanism 1114 and/or trunk occupancy detection device 2513 will be disabled when the ignition switch is turned to “start”.

A lockout input is transmitted from a lockout circuit 2561 to detection device 2513 via bidirectional interconnector 2562 and disables actuation of a trunk release signal and/or generation of a trunk occupancy control signal by the detection device 2513. The lockout module 2561 provides output via interconnector 2562 by sensing when the vehicle ignition key is turned on, or other starter mechanism, to “ignition on” and starting the engine, or by placing the gear lever of the vehicle out of “PARK” gear, or by sensing motion of the vehicle using an accelerometer (preferably, an accelerometer, most preferably a solid-state accelerometer, packaged in the detection device 2513 such as within the housing (not shown in FIG. 22). The lockout module 2561 also suitably receives an input from a vehicle computer 2590, via interconnector 2591, indicating that the engine is operating, or receiving an input from a speedometer system, or setting the ignition system to “accessory on” status, or a speed or motion detection system, and detecting that the vehicle is exceeding a predetermined minimum speed (such as 5 miles per hour).

Provision of a lockout signal 2562 prevents trunk release mechanism 1114 from actuating when the vehicle engine is operating or when the vehicle is powered and moving. The lockout module 2561 is part of the vehicle compartment occupancy detection system as shown in FIG. 22, and is beneficial in avoiding the possibility of false triggers, and undesired and unneeded release of the trunk lid under control of the detection device 2513 while the vehicle is in motion on the highway, or when stalled, or operating in traffic, or when stopped but with the engine running.

The detection device 2513 is provided with a user-operable button (button not shown in FIG. 22) that actuates a switch/disable input 1324 to controller 2587 that can disable operation of the vehicle compartment occupant detection system 2500 should it be so desired in a particular circumstance. Examples of this include when the vehicle is being serviced. However, deactivation of the system 2500 in response to user-actuation of such an input 1324 is preferably and desirably disabled whenever the trunk lid is closed and the vehicle is not operating under engine power. Thus, user-operation of such a button on the detection device 2513 by a child trapped in a closed trunk compartment will not disable automatic release of the trunk latch 1114 and opening of the trunk lid under control of the detection device 2513.

Figure 23:
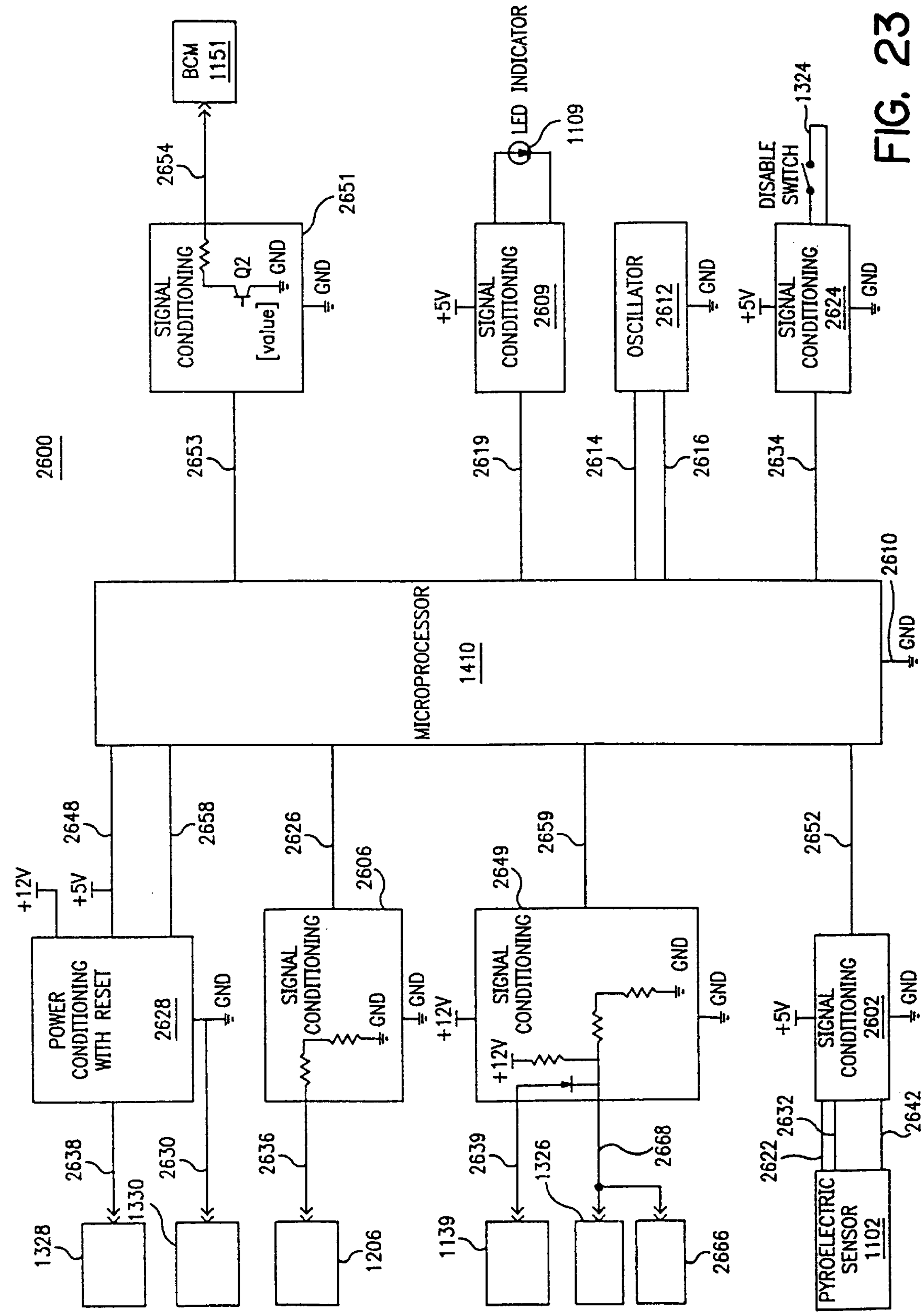
FIG. 23 shows a block diagram of a detection system.

FIG. 23 shows a block circuit diagram of system 2600. The diagram shows in greater detail the components discussed herein.

Battery module 1328 and ground module 1330 are coupled to power conditioning with reset circuit 2628 via interconnectors 2638 and 2630, respectively. Power conditioning with reset circuit 2628 is coupled to processor 1410, via interconnectors 2648 and 2658.

Ignition module 1206 is coupled to signal conditioning circuit 2606 via interconnector 2636. Signal conditioning circuit 2606 is coupled to processor 1410 via interconnector 2626.

Trunk lamp 1139 is coupled to signal conditioning circuit 2649 via interconnector 2639. Compartment lid modules 1326 and 2666 are coupled to signal conditioning circuit 2649 via interconnector 2668. Signal conditioning circuit 2649 is coupled to processor 1410 via interconnector 2659.

Sensor 1102 is coupled to signal conditioning circuit 2602 via interconnectors 2622, 2632, and 2642. Signal conditioning circuit 2602 is coupled to processor 1410 via interconnector 2652.

Processor 1410 is coupled to signal conditioning circuit 2651 via interconnector 2653. Signal conditioning circuit 2651 is connected to body control module (BCM) 1151 via interconnector 2654.

Processor 1410 is coupled to signal conditioning circuit 2609 via inter connector 2619. The output from signal conditioning circuit 2609 is received by LED indicator 1109.

Processor 1410 is coupled to an oscillator 2612 via interconnectors 2614 and 2616.

Processor 1410 is coupled to signal conditioning circuit 2624 via interconnector 2634. Signal conditioning circuit 2624 is coupled to disable switch 1324.

Figure 24A:
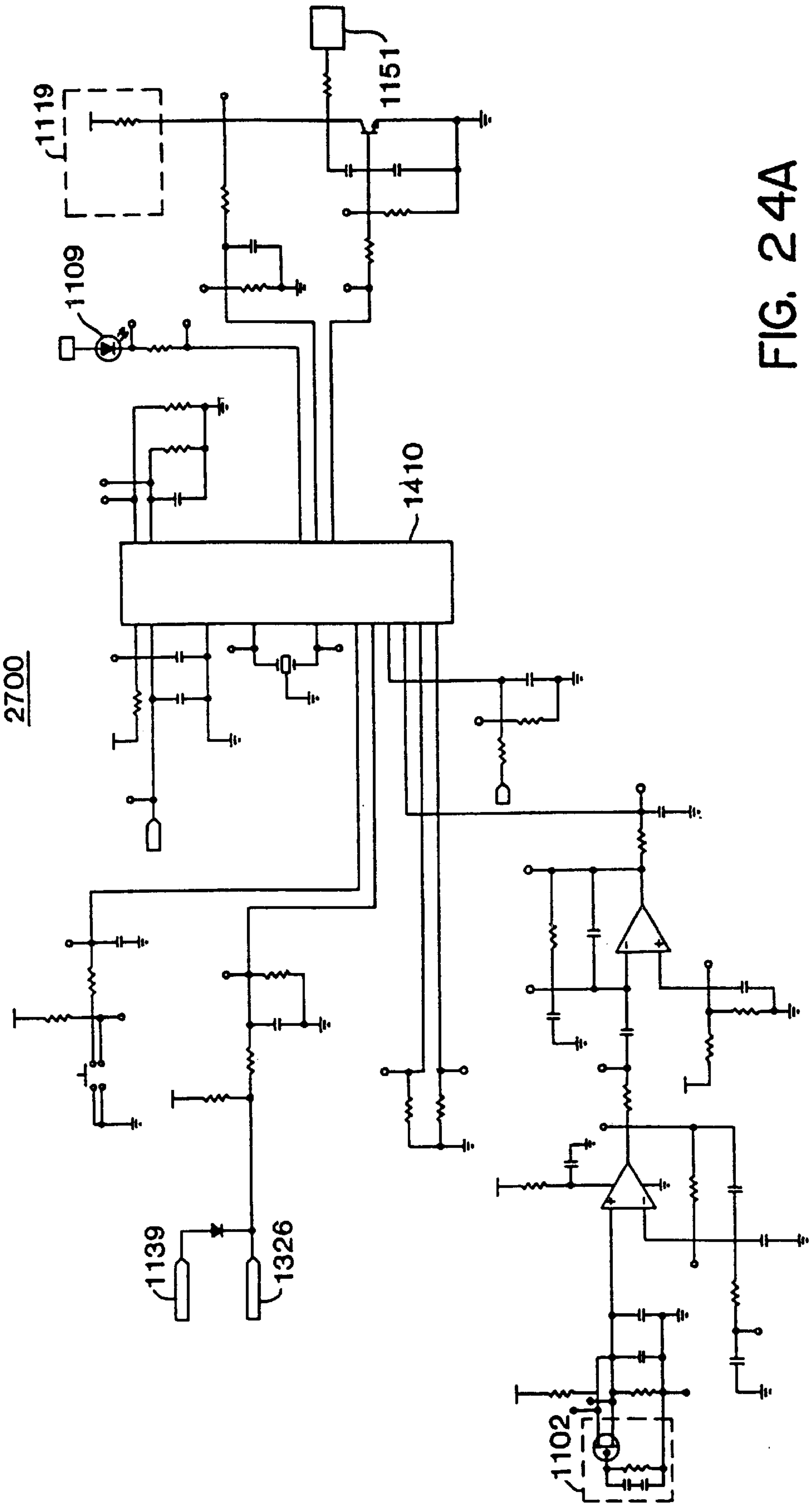
FIGS. 24(*a*)–(*c*) show a schematic diagram of the detection system.
Figure 24B:
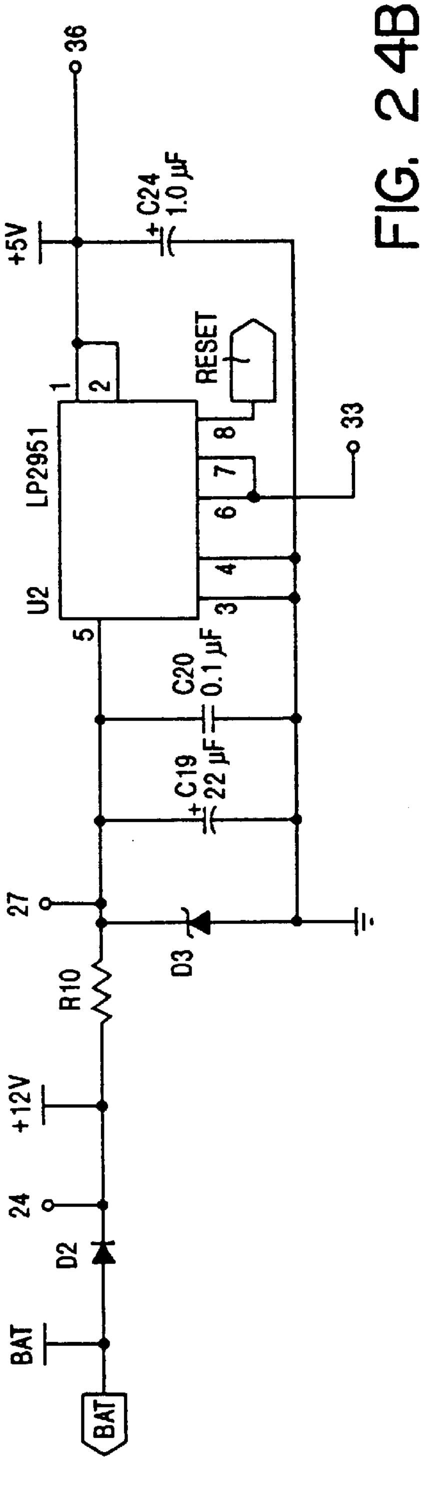
Figure 24C:
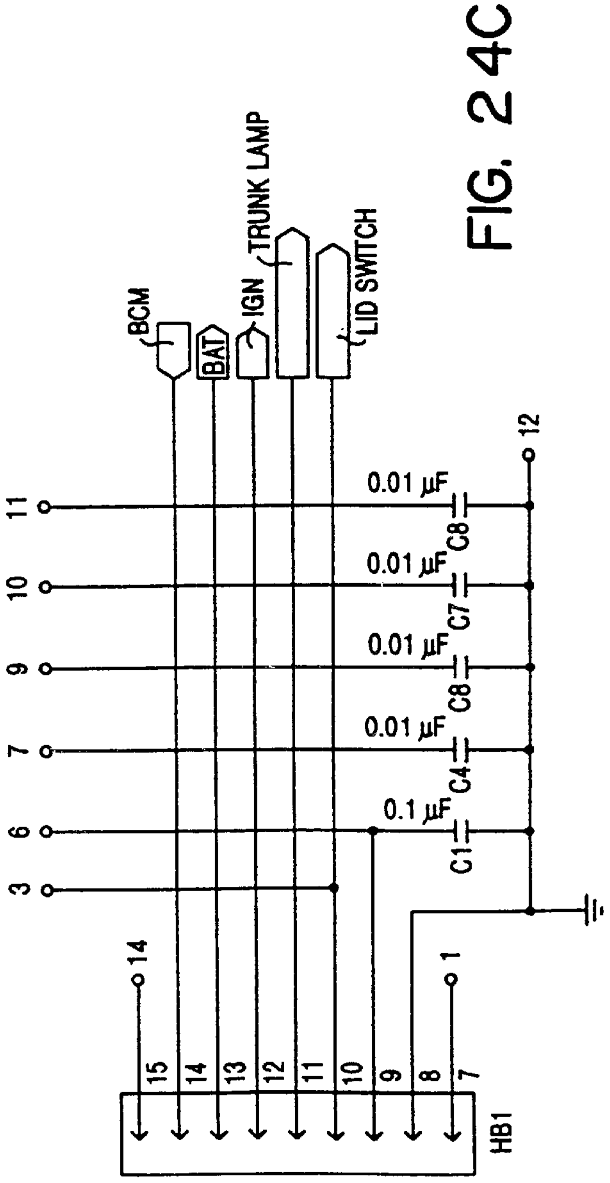

FIG. 24 is a schematic diagram of the detection system 2700. The connections described above are shown in greater detail in FIG. 24. For example, trunk lamp 1139, lid switch 1306 and sensor 1102 are coupled to processor 1410. The processor 1410 is coupled to LED 1109 and BCM module 1151. The connection from processor 1410 to optional outputs 1119, as discussed above, are also shown.

Referring back to FIG. 19, the vehicle occupancy detection system 2100 preferably incorporates various means to reduce the occurrence of false triggers that could cause release of a trunk lid by phenomena other than detection of a person or pet trapped in a closed vehicle compartment such as a trunk compartment. Such unnecessary and inappropriate false triggering of a trunk lid, can possibly cause inconvenience, security concerns and potential safety concerns. Thus, the vehicle occupancy detection system 2100 suitably includes one or more false trigger reduction means to reduce and/or substantially eliminate the occurrence of unwarranted opening a trunk lid by false triggering of the vehicle occupancy detection system.

Examples of vehicle occupancy detection system false trigger protection include mechanical vehicle occupancy detection system false trigger protection, thermal isolation vehicle occupancy detection system false trigger protection, filtering vehicle occupancy detection system false trigger protection, electrical/electronic vehicle occupancy detection system false trigger protection, optical vehicle occupancy detection system false trigger protection, analog vehicle occupancy detection system false trigger protection, digital vehicle occupancy detection system false trigger protection, computational vehicle occupancy detection system false trigger protection, mathematical vehicle occupancy detection system false trigger protection, algorithmic vehicle occupancy detection system false trigger protection and secondary vehicle occupancy detection system false trigger protection.

Mechanical vehicle occupancy detection system false trigger protection includes for example, placement of a PTRS module on a vehicle trunk wall portion, or preferably a vehicle trunk roof portion such as under a parcel shelf of the rear window region of the interior vehicular cabin, so as to be protected/insulated from heating/cooling effects of the vehicle sheet body metal or other vehicle components and not readily subject to impact from mechanical objects being placed into the trunk, being removed from the trunk, or moving about in the trunk. Mechanical vehicle occupancy detection system false trigger protection means also include recessing the lens (and thermal sensor therebehind) in a well or trough formed by the walls or other structures of the housing of PTRS module. Placing the thermal detector/lens in a crater formed by such walls provides protection from mechanical impact for the lens that could potentially initiate a false trigger and the walls provide mechanical protection against thermal draughts and other thermal abnormalities.

Thermal isolation vehicle occupancy detection system false trigger protection means include thermally isolating thermal the sensor (shown as element 1102 in FIG. 20) and the lens (shown as element 1703 in FIG. 20) from the heating and cooling of the vehicular body, such as the vehicular sheet metal, by mounting, in a housing that attaches, such as shown in FIG. 21, to an inner surface of a trunk compartment, but with the lens/thermal sensor, spaced from, and thermally isolated from the attachment point and thus from the vehicle body. Housing 2467 shown in FIG. 21(A) preferably provides a substantially isothermal thermal cage for thermal sensor shown in FIG. 20 as element 1102.

Figure 25:
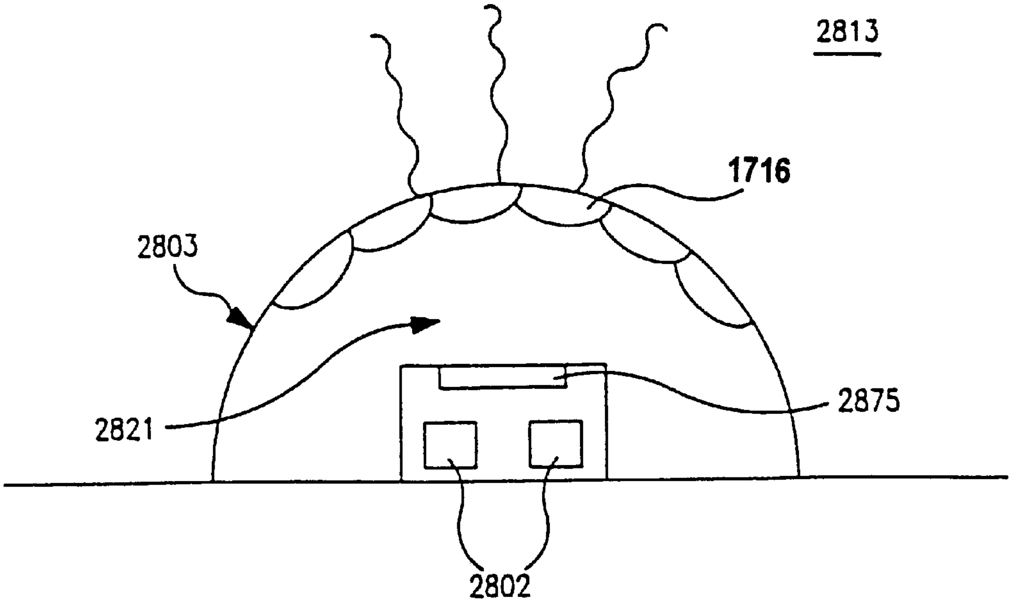
FIG. 25 shows a detector device with an air bubble.

FIG. 25 shows a detector device 2813 with a sensor 2802 a filter 2875, a lens surface 2803 and an air gap 2821. The air gap 2821 is a pocket of air between the lens surface 2803 and the filter 2875 that prevents a rapid change of temperature experienced by the sensor 2802.

Filtering vehicle occupancy detection system false trigger protection means include optical filtering and electrical or electronic or computational or mathematical or algorithmic or analog or digital filtering.

Optical filtering encompasses restricting the bandwidth of radiation incident on the thermal sensor to a spectral bandwidth emitted by a living body (typically from approximately 8 microns to 14 microns of the electromagnetic radiation spectrum). Since a living body will be at a relatively narrow temperature range for example, a human is typically 98.6 Fahrenheit but in cases of hypothermia or hyperthermia, potentially a slight variation of typically one to three degrees Fahrenheit. Use of infrared filters to reject radiation of spectral wavelength outside those wavelengths emitted by a living body reduces false triggers from movement or changes in temperature of heated or cooled vehicle body panels or compartment walls, and from movement or changes in temperature of objects in the vehicle, such as groceries loaded into a trunk compartment, trunk compartment local hot and cool spots, which phenomena are likely to have an emittance spectrum different from that of a human body, and thus be filtered by the filter absorbers and/or reflectors provided by filter 2275 and/or lens 1703 shown in FIG. 20).

Optical vehicle occupancy detection system false trigger protection means include selection of a lens structure, field of view and/or focal length that provides wide and adequate monitoring of a vehicular compartment, and particularly of any region in a vehicular trunk compartment where a frightened child might be located while reducing thermal imaging of regions and parts of the compartment, (such as vehicle body walls) more likely to contribute thermal signatures that could confuse and/or hinder determination of a true occupant presence signal by the controller.

Filtering, such as electrical or electronic or computational or mathematical or algorithmic or analog or digital filtering, reduces false triggers and encompasses analysis by the controller of the signal output of a thermal sensor to determine a signal component frequency and/or amplitude that is indicative of movement of a living body within a vehicle compartment. This signal component frequency is distinct from other signal components in the output of a thermal sensor that are at signal frequencies and/or amplitudes that are different from the signal frequency and/or amplitude characteristic of a living body. For example, a child moving within a closed trunk compartment will create a thermal differential signal as detected by a thermal sensor that will be typically at a frequency of at least about 0.15 to 10 Hertz whereas a grocery bag with frozen grocery items that are thawing or heated items that are cooling, will change its thermal signature at a rate different than the rate of thermal change created by a moving person in the compartment. The living person indicative thermal signal can be isolated and/or enhanced for example by analog signal processing; digital signal processing; signal enhancement or filtering by computer algorithms, by mathematical signal processing and by similar techniques.

Additionally, bandpass filters can be adjusted to avoid the vehicle frequency. This will reduce false alarms while still being sensitive to human movement. Inanimate objects are subject to the resonant frequency of each vehicle. Thus, a notch filter could be used that is adjusted to each vehicle.

Electrical or electronic vehicle occupancy detection system false trigger protection includes signal averaging, signal accumulation, signal verification and signal enhancement by analog, digital and mathematical and/or algorithmic and/or computational techniques. For example, controller can await detection of a confirmatory trapped occupant indicative signal or a plurality of trapped occupant indicative signals (such as, for example, confirmation of receipt of a minimum number of "viable" signals, for example at least three "viable" signals, in a determined time interval, for example 5 seconds or longer) before the controller generates an output signal to a trunk latch mechanism to open a trunk lid.

The controller can include pre-stored signal profiles indicative of "viable" signals that would be attributable to a trapped occupant and false signals attributable to non-occupation signals, such as for example heating or cooling grocery bags or items falling over in a trunk, would be attributable to trunk body heating and cooling. Actual signals being processed by the controller can be compared, such as by computational comparison, to stored signals in order to determine a true occupant detection signal and to reduce the incidence of false triggers.

A learning function can be included in the controller whereby the controller learns the normal thermal signatures experienced in a vehicle trunk used throughout the four climatic seasons in a variety of geographic locations. The presence of a trapped occupant is a rare event, and so the vehicle occupancy detection system, having learned what is normal for that particular compartment in that particular vehicle, will more readily recognize and react to the signal signature of a trapped living person or pet. Thus, a dynamic vehicle compartment occupant detection false trigger reduction system is provided that is adaptive to the thermal conditions experienced in a particular vehicular compartment, such as the trunk of a particular automobile.

An alternative form of a dynamic vehicle compartment occupant detection false trigger reduction system comprises providing an input to the controller that is indicative of the outside and/or compartment temperature. For example, a temperature sensor such as a thermocouple or thermistor can be included in the PTRS module in order to detect the air temperature in the compartment. Alternately, a temperature input can be provided from another location in the vehicle, such as via a car area network (also referred to as controlled area network), that provides information to the controller as to the outside temperature, the interior cabin temperature and/or the vehicle compartment temperature. The controller can determine, for example, the difference between the temperature of the trunk compartment and that expected of a human body (about 98.6 degrees Fahrenheit). If the magnitude of the temperature difference is substantial such as may occur when a trapped event occurs in a cold climate where the trunk interior will be cold relative to body temperature or such as may occur when the trapped event occurs in a hot climate where the trunk interior will be hot relative to body temperature, the sensitivity and reaction of the controller can be set accordingly. However, should the air temperature of the trunk compartment be very close to or equal to the body temperature of the body trapped therein, then detection of body presence by detection of the differential in temperature between that body and the trunk compartment is more challenging as that differential may, in such circumstance, be only a fraction of a degree Fahrenheit such as 0.5 degrees Fahrenheit, or smaller.

The temperature, and hence thermal emission signature, of a living body such as a human body is not the same over the entire body and can vary, for example, from the face to a hand or a leg, or even from one part of a leg to another part of a leg. Clothes may also have a different emissivity temperature compared to exposed body parts such as a head or a hand. Temperature differences can be small, lower than about 1 degree Fahrenheit, and for example, less than about 0.1 degrees Fahrenheit. Thus, when the temperature of the vehicular compartment is close to or at body temperature, the sensitivity of vehicle compartment occupancy detection system is desirably high so that it is sensitive to detecting small changes in temperature, and preferably is at a thermal differential sensitivity of about 5 degrees Fahrenheit or lower, more preferably at a thermal differential sensitivity of about 1 degree Fahrenheit or lower, most preferably at a thermal differential sensitivity of about 0.5 degrees Fahrenheit or lower. The thermal differential sensitivity of the vehicle compartment occupancy detection system can be set so that it reacts to release of a trunk latch only when a pre-determined temperature differential is detected such as for example, triggering of a latch release when a temperature differential of about 10 degrees Fahrenheit or less is detected or, for a more sensitive system, triggering of a latch release when a temperature differential of about 5 degrees Fahrenheit or less is detected, or for an even more sensitive system, triggering of a latch release when a temperature differential of about 1 degree Fahrenheit or less is detected, or for a very sensitive system, triggering of a latch release when a temperature differential of about 0.5 degrees Fahrenheit or less is detected.

Alternatively, instead of providing a fixed thermal differential sensitivity for the vehicle compartment occupancy detection system, a dynamic thermal differential sensitivity can be provided for the vehicle compartment occupancy detection system. This includes, for example, an algorithmic vehicle occupancy detection system false trigger protection system or a mathematical vehicle occupancy detection system false trigger protection system or a computational vehicle occupancy detection system false trigger protection system or an analog and/or digital electronic vehicle occupancy detection system false trigger protection system. These dynamically change the thermal differential sensitivity for the vehicle compartment occupancy detection system, and other characteristics of the controller, in response to actual inputs to the controller in response to the occurrence of a given event in a particular vehicle compartment. Thus, for example, should a temperature input to the controller indicate that the ambient temperature in the compartment is close to or equal to body temperature, then a higher thermal sensitivity can be selected by the controller for example, a thermal differential sensitivity of about 1 degree Fahrenheit may be chosen, preferably in conjunction with another false trigger reduction means such as utilization of a more stringent "viable" signal verification routine that requires a higher number of event detection signals in a predetermined time period or a longer duration can be chosen before an output to release a latch is given to raise a trunk lid.

The false trigger protection and/or reduction system of the vehicle compartment occupancy detection system may also include analog and/or digital circuitry that assists in distinguishing an occupant thermal signature from other non-occupant indicating signals detected by a thermal sensor. For example, use of an electrical lockout circuit, as described above, ensures that a false trigger event cannot occur while the vehicle is operating. Also, the false trigger protection and/or reduction system of the vehicle compartment occupancy detection system may include secondary vehicle occupancy detection system false trigger protection means.

For example, a microphone may be provided as part of PTRS module or may be mounted elsewhere in the vehicular compartment for use in conjunction with thermal sensor and as part of the vehicle compartment occupancy detection system. The microphone is suitably positioned to detect sounds within the closed compartment. The output of the microphone is processed by the controller to distinguish human vocal sounds and also suitably pet sounds from other non-occupant sounds in a vehicle. The controller distinguishes a vocal signal from ambient noise by analog and/or digital filtering that is configured to identify that a person is shouting or screaming in the compartment. Techniques such as digital sound processing can be used to enhance the vocal signal to background noise ratio, as described in commonly assigned U.S. patent application Ser. No. 09/449,121, filed Nov. 24, 1999, titled REARVIEW MIRROR ASSEMBLY WITH UTILITY FUNCTIONS, by Hutzel et al. of Donnelly Corporation and Ser. No. 09/585,379, filed Jun. 1, 2000 by Hutzel et al. and entitled REARVIEW MIRROR ASSEMBLY WITH UTILITY FUNCTIONS the entire disclosures of which are hereby incorporated by reference herein.

An audio system such as a sound processing system used in conjunction with a pyrodetector can be used to distinguish human (or pet) made sounds or frequencies or patterns from other sounds audible in the trunk of a vehicle, such as outside traffic noise, the sound of a grocery bag falling over, loose objects rolling or moving on a trunk floor. The microphone described above as element 1144 in FIGS. 8 and 11, or vocal sound detection system can augment the pyrodetection system and provide a confirmation that a person is present in the closed trunk.

Alternately, the audio system provided in the trunk or other closed vehicular compartment such as the interior cabin space can serve as a primary occupant detection device, such that a trunk lid will release when a microphone or audio processing system determines the presence of a human voice in a closed compartment. Additional occupant detectors are suitably used to augment the thermal sensor in order to reduce false trigger events, or alternatively replace the thermal sensor as the system occupant detector and serve as a stand-alone occupant detector, or serve as the primary occupant detector and with a pyrodetector to augment it in order to reduce false trigger occurrences. Other sensing mechanisms, include bolometers, camera systems such as CCD or CMOS-based digital camera systems, ultrasonic detection systems, and radar detection systems.

Where camera systems are used, it is desirable to use an in-trunk compartment illumination means to light-up the closed compartment for viewing by the camera. For example, a trunk light described as element 1139 in FIGS. 8 and 10 above, can illuminate thereby allowing the camera to capture an image of the trunk interior. Since such interior lights typically consume significant electrical current, it is preferred that this illumination be a momentary illumination for a brief period for example, between 1 and 5 seconds or shorter, depending on the exposure needs of the camera and the rate of illumination of the light source so as to conserve battery power. It is preferable to use non-incandescent, low-power, solid-state light sources such a light emitting diodes such as are described in commonly assigned U.S. patent application Ser. No. 09/449,121, filed Nov. 24, 1999, titled REARVIEW MIRROR ASSEMBLY WITH UTILITY FUNCTIONS by Hutzel et al. of Donnelly Corporation and in commonly assigned U.S. patent application Ser. No. 09/585,379, filed Jun. 1, 2000 by Barry W. Hutzel et al. and entitled REARVIEW MIRROR ASSEMBLY WITH UTILITY FUNCTIONS the entire disclosures of which are hereby incorporated by reference herein.

Cameras and camera field of view illuminators, including near-IR emitting light emitting diodes (LEDs), suitable for use in the present invention are disclosed in U.S. Provisional Pat. Applications, Ser. No. 60/186,520, filed Mar. 2, 2000 by Lynam et al. for INTERIOR REARVIEW MIRROR ASSEMBLY INCORPORATING A VIDEO SCREEN, and Ser. No. 60/218,336, filed Jul. 14, 2000 by Lynam et al. for INTERIOR REARVIEW MIRROR ASSEMBLY INCORPORATING A VIDEO SCREEN which are hereby incorporated herein by reference in their entireties. As described above in FIG. 9 above, The PTRS module, which typically is a very low current device, can be constantly monitoring the trunk space while the vehicle is parked. If the PTRS module suspects the presence of a trapped occupant, then optionally an additional trunk space monitoring device (such as a microphone or a camera or the like) is activated by the PTRS module to perform a confirmation of occupant presence.

Since the vehicle compartment occupancy detection system will operate while the vehicle is parked, it is desirable that vehicle battery drain be minimized. Preferably, for the 12 volt battery vehicles commonly used, the desired current drain for the vehicle compartment occupancy detection system (including the thermal sensor and any associated electronic circuitry) is less than about 10 milliamps, preferred is less than about 5 milliamps, more preferred is less than about 1 milliamp, and most preferred is less than about 0.5 milliamps. A low-current pyrodetection system, suitable for automobile compartment use while a vehicle is parked, is disclosed in commonly assigned U.S. patent application Ser. No. 08/901,929, filed Jul. 29, 1997, titled AUTOMOTIVE PYROELECTRIC INTRUSION DETECTION SYSTEM by Teowee et al. of Donnelly Corporation, now U.S. Pat. No. 6,166,625, the entire disclosure of which is hereby incorporated by reference herein.

The PTRS module, when used with vehicles with a higher battery voltage such as 42 volts, the current drain may be 0.1 milliamps, or lower. Since, even the smallest current draw by the vehicle compartment occupant detection system will eventually drain the vehicle battery if the vehicle is parked long enough and other vehicular accessories such as security systems, keyless entry systems and the like may drain the battery of a parked vehicle even before any such drain by the vehicle compartment occupant detection system. Thus, the vehicle compartment occupant detection system suitably includes a vehicle low battery detect and/or response system. This low battery detection is activated by an input from the vehicle battery, shown as element 1328 in FIG. 11 above. Input from the battery module (1328) causes the PTRS module to generate an output to an indicator indicating a low battery situation.

The vehicle compartment occupant detection system such as the passive trunk release system described herein is used in conjunction with an active trunk release system such as the manually-operated trunk release handle disclosed in commonly assigned U.S. patent applications Ser. No. 09/275,565, filed Mar. 24, 1999, titled SAFETY HANDLE FOR TRUNK OF VEHICLE, by Bingle et al. of Donnelly Corporation, now U.S. Pat. No. 6,086,131, Ser. No. 09/516,831, filed Mar. 1, 2000 by Bingle et al. for SAFETY RELEASE FOR A TRUNK OF A VEHICLE, now U.S. Pat. No. 6,390,529, and Ser. No. 09/605,233, filed Jun. 28, 2000 by Bingle et al. for SAFETY HANDLE FOR TRUNK OF VEHICLE, now U.S. Pat. No. 6,254,261 , the entire disclosures of which are hereby incorporated by reference herein.

Providing both an active and a passive occupant escape system in the same trunk further enhances compartment safety. Also, not all vehicle trunks are provided with a powered (typically by an electrically actuated solenoid or the like) trunk release latch, and in such vehicles, provision of an active trunk release such as by pulling a lever, handle or other release mechanism located in the trunk space is necessary to allow trunk escape. Also, active trunk release systems such as the manually-operated trunk release handle disclosed in the above-referenced patent applications, preferably have lighted handles or the like that illuminates for a period after the trunk lid is initially closed following a trunk closure (but ceases to illuminate after a time-out period in order to conserve battery power). This lighted handle is re-illuminated should it be touched or pulled in order to aid and encourage a child or similar trapped occupant to pull the handle to release the trunk lid and escape. When such a lighted safety handle is used in conjunction with a vehicle compartment occupancy detection system, the PTRS module, upon detection of person movement within the trunk space, can provide an output as discussed herein that illuminates the user-operable manual trunk lid release handle or other device provided in the trunk compartment. When the manual trunk handle light is not inclusive of light sources for self-illumination, then the output may illuminate a trunk space light provided in the trunk space compartment, which is preferably, a special purpose light source such as a single or a cluster of high intensity, directed, low-current, non-incandescent compact light emitting diodes or a electroluminescent strip which are suitably mounted as part of PTRS module.

Alternately, the trunk light is suitably, incandescent, which is commonly provided to illuminate trunk spaces.

Preferably, such lights, once initiated to illuminate by the PTRS module, cease to illuminate after a timed out period for example 30 to 60 minutes or even longer. Also, preferably, the controller includes circuitry, to monitor the state of charge of the vehicle battery. As the vehicle battery runs down, its output voltage declines. Once the controller determines that the state of charge of the vehicle battery has declined to a point close to it not having sufficient charge to power a trunk release latch and so open a trunk lid, the PTRS module can optionally provide a trunk release output to the trunk lid release latch and cause the trunk to open before the battery drains beyond a point capable of powering a trunk release event. The PTRS module also disables the trunk latch from allowing the trunk lid to engage closed again. Although the trunk will then be open presenting a potential theft opportunity, the vehicle is safe against children being trapped in the trunk. Given that such an event only normally occurs when a vehicle is parked or abandoned for an unusually long extended period, child safety concerns may warrant having the trunk lid open to a child-safe open position should the battery drain over time. Further, if desired, an auxiliary battery source for the occupant escape system, such as by provision of a back-up battery, preferably rechargeable via a vehicle exterior mounted solar panel, can be utilized.

Further, the PTRS module and/or the handle of any active manually actuatable trunk release handle can include a simulated or recorded voice generator, that outputs a message (preferably a multilingual message such as "Please stay calm" or "Please push the lid up" or "Please pull the handle to escape" that encourages, calms and instructs a trapped occupant. Preferably, a solid-state voice chip, such as is commonly used in toys is used. Such a voice-generation chip is useful with a sand-alone active trunk release handle, such as the system disclosed in U.S. patent application Ser. No. 09/275,565, filed Mar. 24, 1999, titled SAFETY HANDLE FOR TRUNK OF VEHICLE by Bingle et al. of Donnelly Corporation, now U.S. Pat. No. 6,086,131, and Ser. No. 09/605,233, filed Jun. 28, 2000 by Bingle et al. for SAFETY HANDLE FOR TRUNK OF VEHICLE, now U.S. Pat. No. 6,254,261 the entire disclosures of which are hereby incorporated by reference herein.

Also, since the PTRS module is particularly installed to assist escape of children from closed trunk compartments, preferably any automatic, electrically-operated trunk lid release latch is adapted so that the trunk lid readily and visibly raises so that a child will realize that escape is possible by pushing, with minimum effort, the opened trunk lid.

The controller, as described above includes an output that provides a variety of driver/logic outputs to various devices and accessories. Trunk release output provides an output to release the trunk latch and open the trunk lid. The trunk release output is typically provided to a trunk release controller in the vehicle that normally is activated by the driver or another interior cabin occupant actuating a trunk release button located such as in the glove compartment of the interior cabin. The vehicle trunk release controller typically powers a solenoid equipped trunk latch.

Alternately, the trunk release output can be provided to a vehicular computer that controls various vehicular functions, including release of the trunk latch (either by direct wire link or via a local area network in the vehicle. Optionally, once the controller of PTRS module has determined that an occupant is present in the closed vehicular compartment, output of the trunk release signal may be delayed for a short pre-determined period, for example five minutes. In certain instance involving carjackings and kidnappings, persons have been locked into trunks of vehicles. In such circumstances, provision of a trunk release delay on the trunk release output is preferred to allow the victim of the crime be placed into the trunk but to delay automatic opening of the trunk by the vehicle compartment occupant detection system for a short period preferably longer than about 1 minute, more preferably longer than about 3 minutes, in order to allow time for the criminal to move away from the trunk and so enable the victim escape, once the trunk lid ultimately releases at the end of the duration of the trunk release delay, unnoticed by the criminal. However, the trunk release delay should not be so long in duration as to cause undue stress to a trapped occupant under more normal circumstances where criminal activity is not involved. Thus, the duration of trunk release delay should preferably be no longer than about 15 minutes and more preferably be no longer than about 10 minutes. A trunk release delay in the 2–8 minute range is most preferred.

Also, the controller can include a power driver that provides a powering current to the trunk release latch to cause it to release the trunk lid. Such direct powering of the trunk release from the PTRS module is particularly beneficial for aftermarket installations of a powered trunk release latch. The controller can also provide an output that sounds the vehicle horn and/or flashes the vehicle lights to signal that a person is trapped in the trunk. It is preferred that the horn be sounded and/or the vehicle exterior lights be flashed in a manner that is unique and distinguishing for trunk occupancy.

For example, detection by PTRS module of a person trapped in the trunk could cause the horn to repetitively sound in the Morse code "SOS" pattern of three shorter duration horn soundings (each of equal short time duration) immediately followed by three distinctly longer duration horn soundings (again each of equal longer time duration) followed by three shorter duration horn soundings and so on and so on in order to audibly simulate, via the car horn, the "3 dot-3 dash-3 dot" Morse code for SOS, that is widely recognized as signaling an emergency event. Similarly, and preferably simultaneously with the sounding of the car horn, the vehicle exterior lights flash in a "3 short flash-3 long flash-3 short flash" repetition to signal an emergency event in response to detection by the PTRS module of an occupant trapped in the vehicle. This is of particular benefit when the trunk lid is not electrically releasable. The sounding of the horn pattern and/or flashing of the lights pattern can be customized depending on the country that the vehicle is used. For example, people in different countries may recognize different patterns as a distress signal. The actual signals output can be programmed to correspond to a recognized distress signal of various countries.

The vehicle compartment occupancy detection identifier signal should be chosen to be different and distinct from such as a theft/security/intrusion alarm horn sounding/lights flashing. When the presence of an occupant trapped in the trunk is determined by the PTRS module, the vehicle compartment occupancy detection system preferably causes the vehicle horn to sound and/or lights to flash in a manner that is recognizable as being different from such as a car alarm activating, and in a manner that the public at large can recognize as a trunk occupancy detection event. The Morse "SOS" pattern is a preferred vehicle compartment occupancy detection identifier signal that can alert that a person is trapped in a vehicular trunk or another vehicular compartment; however another distinctive tone, frequency and/or intensity pattern can be adopted as the vehicle compartment occupancy detection identifier signal.

The PTRS module may also have an output to an indicator light in the vehicle cabin. For example, once the ignition of the vehicle is turned on, PTRS module may initiate a self-check. If it be properly functioning, an indicator, such as a backlighted icon or an LED or the like, flashes for a short time period, for example 5 to 10 seconds, to indicate to the operator that the PTRS module is capable of operating properly. If, however, the PTRS module is malfunctioning, the controller suitably provides an output to a vehicle occupancy detection system malfunction indicator which can illuminate in the vehicle cabin, visible to the operator, indicating a system malfinction. Placement of such indicator displays at or on the interior rearview mirror assembly is preferred, as looking at the rearview mirror is typically part of the driving task, and so a compartment occupancy system malfunction indication display, placed at or on the interior rearview mirror assembly, is readily visible to the operator. For example, an information display can be provided at the reflective element, at the bezel of the mirror case or attached to a mirror support or mount such as is disclosed in commonly assigned U.S. patent application Ser. No. 09/396,179, filed Sep. 14, 1999, titled INDICATOR FOR VEHICLE ACCESSORY by DeLine et al. of Donnelly Corporation, now U.S. Pat. No. 6,278,377, the entire disclosure of which is hereby incorporated by reference herein. As an alternative to placing the indicator at the interior rearview mirror assembly, trunk occupancy detection indicators can be placed at or on either or both of the exterior rearview mirror assemblies. Other in-cabin locations are also possible, such as in the dash or in an overhead console.

Also, detection of a child trapped in a trunk compartment by the automatic occupancy sensing systems as described herein can be optionally wirelessly transmitted from the vehicle to a remote site such as via a telematic wireless automotive telecommunication system. For example, the controller may suitably provide an output to a vehicular wireless transmitter such as a cellular phone system or an ONSTAR™ telematic telecommunication system from General Motors Corporation or RESCU™ available from Ford Motor Company, such as disclosed in commonly assigned U.S. patent application Ser. No. 09/275,565, filed Mar. 24, 1999, titled SAFETY HANDLE FOR TRUNK OF VEHICLE by Bingle et al. of Donnelly Corporation, now U.S. Pat. No. 6,086,131, U.S. patent application Ser. No.

09/605,233, filed Jun. 28, 2000 by Bingle et al. for SAFETY HANDLE FOR TRUNK OF VEHICLE, now U.S. Pat. No. 6,254,261 and in U.S. patent application Ser. No. 09/449,121, filed Nov. 24, 1999, titled REARVIEW MIRROR ASSEMBLY WITH UTILITY FUNCTIONS by Hutzel et al. of Donnelly Corporation, the entire disclosures of both are hereby incorporated by reference herein. Acting in response to this output, a call can automatically be place via the in-vehicle telecommunication system to the emergency services or the like alerting that a person or pet is trapped in a vehicle compartment such as a trunk. Since such cellular phone type transmissions will be traceable as to the geographic origin of the call the location of the vehicle where the compartment occupancy entrapment event is occurring can be traced, and help can be dispatched. If the vehicle is already equipped with a global positioning system (GPS), then upon receipt of the output alerting of a trunk entrapment, the GPS data specifying the present geographic location of the subject vehicle can be transmitted by the vehicle telecommunication system to the alert rescue authorities as to the location of the vehicle and to summon help.

Changes and modifications in the specifically described embodiments can be carried out without departing from the principles of the invention, which is intended to be limited only by the scope of the appended claims, as interpreted to the principles of patent law.

The embodiments of the invention in which an exclusive property right or privilege is claimed are defined as follows:

1. A release system adapted for use in opening a deck lid of a vehicle, said release system being positionable within a trunk compartment at least partially closed by the deck lid, the trunk compartment having a release mechanism for opening the deck lid, said release system being adapted for operation from the interior of the trunk compartment and comprising:

a gas operable assist device connectable to the release mechanism, said gas operable actuating device comprising a compressed gas container which includes a movable piston in communication with a compressed gas source; and at least one of a manual input device and an occupant detector, said gas operable assist device being operable to actuate the release mechanism to open the deck lid in response to at least one of a user input to said manual input device and a detection of an occupant within the trunk compartment by said occupant detector, said gas operable assist device including at least one of a compressed gas container and a pyrotechnic element, said gas operable assist device utilizing energy stored within said at least one of a compressed gas container and a pyrotechnic element to actuate the release mechanism to open the deck lid, wherein said gas operable assist device comprises a compressed carbon dioxide container.

2. A release system adapted for use in opening a deck lid of a vehicle, said release system being positionable within a trunk compartment at least partially closed by the deck lid, the trunk compartment having a release mechanism for opening the deck lid, said release system being adapted for operation from the interior of the trunk compartment and comprising:

a gas operable assist device connectable to the release mechanism; and at least one of a manual input device and an occupant detector, said gas operable assist device being operable to actuate the release mechanism to open the deck lid in response to at least one of a user input to said manual input device and a detection of an occupant within the trunk compartment by said occupant detector, said gas operable assist device including at least one of a compressed gas container and a pyrotechnic element, said gas operable assist device utilizing energy stored within said at least one of a compressed gas container and a pyrotechnic element to actuate the release mechanism to open the deck lid, wherein said gas operable assist device is actuatable to generate a pulling action on a cable connected to the release mechanism.

3. The release system of claim 2, wherein said gas operable assist device is actuatable to generate a force of at least approximately 10 Newtons at the release mechanism.

4. The release system of claim 2, wherein said gas operable assist device is actuatable to generate a force of at least approximately 50 Newtons at the release mechanism.

5. The release system of claim 2, wherein said manual input device comprises a handle for activating the release mechanism for opening the deck lid, the user input being at least one of a movement and a contact of said handle by a user.

6. The release system of claim 2 further comprising a control which is operable to actuate said gas operable assist device in response to said manual input device or said occupant detector.

7. A release system adapted for use in opening a deck lid of a vehicle, said release system being positionable within a trunk compartment at least partially closed by the deck lid, the trunk compartment having a release mechanism for opening the deck lid, said release system being adapted for operation from the interior of the trunk compartment and comprising:

a gas operable assist device connectable to the release mechanism; and at least one of a manual input device and an occupant detector, said gas operable assist device being operable to actuate the release mechanism to open the deck lid in response to at least one of a user input to said manual input device and a detection of an occupant within the trunk compartment by said occupant detector, said gas operable assist device including at least one of a compressed gas container and a pyrotechnic element, said gas operable assist device utilizing energy stored within said at least one of a compressed gas container and a pyrotechnic element to actuate the release mechanism to open the deck lid, wherein said gas operable assist device comprises a pyrotechnic element.

8. The release system of claim 7, wherein said gas operable assist device includes a canister containing an explosive substance, which generates a high volume of gas when actuated.

9. The release system of claim 8, wherein the resultant gas generated by actuation of said explosive substance causes a mechanical element to move, thus exerting a force at a portion of the release mechanism to release the deck lid.

10. The release system of claim 7, wherein said gas operable assist device is operable to mechanically actuate the release mechanism irrespective of electrical power to said release system.

11. A release system adapted for use in opening a deck lid of a vehicle, said release system being positionable within a trunk compartment at least partially closed by the deck lid, the trunk compartment having a release mechanism for opening the deck lid, said release system being adapted for operation from the interior of the trunk compartment and comprising:

a gas operable assist device connectable to the release mechanism; and at least one of a manual input device and an occupant detector, said gas operable assist device being operable to actuate the release mechanism to open the deck lid in response to at least one of a user input to said manual input device and a detection of an occupant within the trunk compartment by said occupant detector, said gas operable assist device including at least one of a compressed gas container and a pyrotechnic element, said gas operable assist device utilizing energy stored within said at least one of a compressed gas container and a pyrotechnic element to actuate the release mechanism to open the deck lid, wherein said gas operable assist device is selectably locked to limit unintentional actuation of said gas operable assist device.

12. The release system of claim 11, wherein said gas operable actuating device comprises a compressed gas container which includes a movable piston in communication with a compressed gas source.

13. A release system adapted for use in opening a deck lid of a vehicle, said release system being positionable within a trunk compartment at least partially closed by the deck lid, the trunk compartment having a release mechanism for opening the deck lid, said release system being adapted for operation from the interior of the trunk compartment and comprising:

a gas operable assist device connectable to the release mechanism; and at least one of a manual input device and an occupant detector, said gas operable assist device being operable to actuate the release mechanism to open the deck lid in response to at least one of a user input to said manual input device and a detection of an occupant within the trunk compartment by said occupant detector, said gas operable assist device including at least one of a compressed gas container and a pyrotechnic element, said gas operable assist device utilizing energy stored within said at least one of a compressed gas container and a pyrotechnic element to actuate the release mechanism to open the deck lid, said manual input device comprising a handle for activating the release mechanism for opening the deck lid, the user input being at least one of a movement and a contact of said handle by a user, wherein said assist device is operable to increase the mechanical advantage of said handle such that a lesser force is required on said handle to activate the release mechanism.

14. A release system adapted for use in opening a deck lid of a vehicle, said release system being positionable within a trunk compartment at least partially closed by the deck lid, the trunk compartment having a release mechanism for opening the deck lid, said release system being adapted for operation from the interior of the trunk compartment and comprising:

a gas operable assist device connectable to the release mechanism; and at least one of a manual input device and an occupant detector, said gas operable assist device being operable to actuate the release mechanism to open the deck lid in response to at least one of a user input to said manual input device and a detection of an occupant within the trunk compartment by said occupant detector, said gas operable assist device including at least one of a compressed gas container and a pyrotechnic element, said gas operable assist device utilizing energy stored within said at least one of a compressed gas container and a pyrotechnic element to actuate the release mechanism to open the deck lid, wherein said release system includes a manual input device and wherein said manual input device is operable to activate the release mechanism independent of said assist device.

15. A release system adapted for use in opening a deck lid of a vehicle, said release system being positionable within a trunk compartment at least partially closed by the deck lid, the trunk compartment having a release mechanism for opening the deck lid, said release system being adapted for operation from the interior of the trunk compartment and comprising:

a gas operable assist device connectable to the release mechanism; and at least one of a manual input device and an occupant detector, said gas operable assist device being operable to actuate the release mechanism to open the deck lid in response to at least one of a user input to said manual input device and a detection of an occupant within the trunk compartment by said occupant detector, said gas operable assist device including at least one of a compressed gas container and a pyrotechnic element, said gas operable assist device utilizing energy stored within said at least one of a compressed gas container and a pyrotechnic element to actuate the release mechanism to open the deck lid, wherein said release system includes an occupant detector and wherein said occupant detector comprises at least one of a motion sensor and a temperature sensor.

16. A release system adapted for use in opening a deck lid of a vehicle, said release system being positionable within a trunk compartment at least partially closed by the deck lid, the trunk compartment having a release mechanism for opening the deck lid, said release system being adapted for operation from the interior of the trunk compartment and comprising:

a gas operable assist device connectable to the release mechanism; and a manual input device and an occupant detector, said gas operable assist device being operable to actuate the release mechanism to open the deck lid in response to at least one of a user input to said manual input device and a detection of an occupant within the trunk compartment by said occupant detector, said gas operable assist device including at least one of a compressed gas container and a pyrotechnic element, said gas operable assist device utilizing energy stored within said at least one of a compressed gas container and a pyrotechnic element to actuate the release mechanism to open the deck lid, wherein said occupant detector comprises a first sensor, disposed in the trunk compartment, for generating an alert signal responsive to sensed conditions in the trunk compartment, and a controller, coupled to the sensor, for receiving the alert signal and generating a control signal in accordance with the alert signal, said gas operable assist device being actuatable by said controller.

17. The release system of claim 16, wherein said controller receives a motion signal, generated by the vehicle, indicative of vehicle motion.

18. The release system of claim 17, wherein the control signal will not actuate said gas operable assist device while the vehicle is in a non-stationary state.

19. The release system of claim 18 further comprising an output indicator, coupled to said controller, for receiving the control signal and outputting an indication in accordance with the alert signal.

20. The release system of claim 19, wherein said output indicator is selected from the group consisting of headlamp, horn, siren, pager, mirror indicator and dashboard indicator.

21. The release system of claim 16, wherein the alert signal is generated by the first sensor sensing a predetermined quantity of stimuli within a predetermined period of time.

22. The release system of claim 21 further comprising a temperature sensor, coupled to said controller, for sensing compartment ambient temperature, wherein said controller generates the control signal based on a lower quantity of stimuli when the compartment ambient temperature exceeds a predetermined temperature.

23. A release system adapted for use in opening a deck lid of a vehicle, said release system being positionable within a trunk compartment at least partially closed by the deck lid, the trunk compartment having a release mechanism for opening the deck lid, said release system being adapted for operation from the interior of the trunk compartment and comprising:

a gas operable assist device connectable to the release mechanism; and at least one of a manual input device and an occupant detector, said gas operable assist device being operable to actuate the release mechanism to open the deck lid in response to at least one of a user input to said manual input device and a detection of an occupant within the trunk compartment by said occupant detector, said gas operable assist device including at least one of a compressed gas container and a pyrotechnic element, said gas operable assist device utilizing energy stored within said at least one of a compressed gas container and a pyrotechnic element to actuate the release mechanism to open the deck lid;

a control which is operable to actuate said gas operable assist device in response to said manual input device or said occupant detector; and at least one illumination source, said control being operable to at least occasionally activate said at least one illumination source to provide illumination of said manual input device.

24. The release system of claim 23, wherein said control is operable to deactivate said at least one illumination source a period of time following activation of said at lease one illumination source.

25. An apparatus adapted for use in opening a deck lid of a vehicle, said apparatus being positionable within a trunk compartment substantially enclosed by the deck lid, the trunk compartment having a release mechanism for opening the deck lid, said apparatus adapted for operation from the interior of the trunk compartment and comprising:

a gas operable assist device connectable to the release mechanism, said gas operable assist device including at least one of a compressed gas container and a pyrotechnic element;

a control circuit for activating said gas operable assist device when the deck lid is closed in response to an occurrence of at least one activating event;

a manual input device for manually activating the release mechanism for opening the trunk compartment, said manual input device having an attachment for interconnection with the release mechanism of the trunk compartment; and at least one illumination source which is at least occasionally activated to provide illumination of said manual input device.

26. The apparatus of claim 25, wherein said gas operable actuating device comprises a compressed gas container which includes a piston in communication with a compressed gas source.

27. An apparatus adapted for use in opening a deck lid of a vehicle, said apparatus being positionable within a trunk compartment substantially enclosed by the deck lid, the trunk compartment having a release mechanism for opening the deck lid, said apparatus adapted for operation from the interior of the trunk compartment and comprising:

a gas operable assist device connectable to the release mechanism, said gas operable assist device including at least one of a compressed gas container and a pyrotechnic element;

a control circuit for activating said gas operable assist device when the deck lid is closed in response to an occurrence of at least one activating event;

a manual input device for manually activating the release mechanism for opening the trunk compartment, said manual input device having an attachment for interconnection with the release mechanism of the trunk compartment, said manual input device being movable to actuate the release mechanism; and at least one of a motion sensor and a temperature sensor, said at least one activating event being at least one of a movement of said manual input device, a detection of a movement within the trunk compartment by said motion sensor and a detection of a predetermined temperature of an object within the trunk compartment by said temperature sensor.

28. The apparatus of claim 27, wherein said control circuit further activates at least one of an alarm, a lock release, a horn and at least one auxiliary illumination source on the vehicle in response to at least one of a movement of said manual input device, an output of said motion sensor and an output of said temperature sensor.

29. An apparatus adapted for use in opening a deck lid of a vehicle, said apparatus being positionable within a trunk compartment substantially enclosed by the deck lid, the trunk compartment having a release mechanism for opening the deck lid, said apparatus adapted for operation from the interior of the trunk compartment and comprising:

a gas operable assist device connectable to the release mechanism, said gas operable assist device including at least one of a compressed gas container and a pyrotechnic element;

a control circuit for activating said gas operable assist device when the deck lid is closed in response to an occurrence of at least one activating event; and at least one of a motion sensor and a temperature sensor, said at least one activating event being at least one of a detection of a movement within the trunk compartment by said motion sensor and a detection of a predetermined temperature of an object within the trunk compartment by said temperature sensor.

30. An apparatus adapted for use in opening a deck lid of a vehicle, said apparatus being positionable within a trunk compartment substantially enclosed by the deck lid, the trunk compartment having a release mechanism for opening the deck lid, said apparatus adapted for operation from the interior of the trunk compartment and comprising:

a gas operable assist device connectable to the release mechanism, said gas operable assist device including at least one of a compressed gas container and a pyrotechnic element;

a control circuit for activating said gas operable assist device when the deck lid is closed in response to an occurrence of at least one activating event; and an occupant detector, wherein said occupant detector comprises a first sensor, disposed in the trunk compartment, for generating an alert signal responsive to sensed conditions in the trunk compartment, said control circuit being coupled to the sensor and operable to receive the alert signal and generate a control signal in accordance with the alert signal.

31. The apparatus of claim 30, wherein said control circuit receives a motion signal, generated by the vehicle, indicative of vehicle motion.

32. The apparatus of claim 31, wherein the control signal will not actuate said gas operable assist device while the vehicle is in a non-stationary state.

33. The apparatus of claim 32 further comprising an output indicator, coupled to said control circuit, for receiving the control signal and outputting an indication in accordance with the alert signal.

34. The apparatus of claim 33, wherein said output indicator is selected from the group consisting of headlamp, horn, siren, pager, mirror indicator and dashboard indicator.

35. The apparatus of claim 30, wherein the alert signal is generated by the first sensor sensing a predetermined quantity of stimuli within a predetermined period of time.

36. The apparatus of claim 35 further comprising a temperature sensor coupled to said control circuit for sensing compartment ambient temperature, wherein said control circuit generates the control signal based on a second quantity of stimuli that is a lower quantity of stimuli than said predetermined quantity of stimuli when the compartment ambient temperature exceeds a predetermined temperature.

37. An apparatus adapted for use in opening a deck lid of a vehicle, said apparatus being positionable within a trunk compartment substantially enclosed by the deck lid, the trunk compartment having a release mechanism for opening the deck lid, said apparatus adapted for operation from the interior of the trunk compartment and comprising:

a gas operable assist device connectable to the release mechanism, said gas operable assist device including at least one of a compressed gas container and a pyrotechnic element, said gas operable actuating device comprising a compressed gas container which includes a piston in communication with a compressed gas source; and a control circuit for activating said gas operable assist device when the deck lid is closed in response to an occurrence of at least one activating event, wherein said gas operable assist device comprises a compressed carbon dioxide container.

38. An apparatus adapted for use in opening a deck lid of a vehicle, said apparatus being positionable within a trunk compartment substantially enclosed by the deck lid, the trunk compartment having a release mechanism for opening the deck lid, said apparatus adapted for operation from the interior of the trunk compartment and comprising:

a gas operable assist device connectable to the release mechanism, said gas operable assist device including at least one of a compressed gas container and a pyrotechnic element; and a control circuit for activating said gas operable assist device when the deck lid is closed in response to an occurrence of at least one activating event, wherein said gas operable assist device is actuatable to generate movement of a cable connected to the release mechanism.

39. The apparatus of claim 38 further including a manual input device for manually activating the release mechanism for opening the trunk compartment, said manual input device having an attachment for interconnection with the release mechanism of the trunk compartment.

40. The apparatus of claim 39, wherein said manual input device is movable to actuate the release mechanism.

41. The apparatus of claim 40, wherein said at least one activating event is movement of said manual input device.

42. The apparatus of claim 38, wherein said gas operable assist device is actuatable to generate a force of at least approximately 10 Newtons at the release mechanism.

43. The apparatus of claim 38, wherein said gas operable assist device is actuatable to generate a force of at least approximately 50 Newtons at the release mechanism.

44. An apparatus adapted for use in opening a deck lid of a vehicle, said apparatus being positionable within a trunk compartment substantially enclosed by the deck lid, the trunk compartment having a release mechanism for opening the deck lid, said apparatus adapted for operation from the interior of the trunk compartment and comprising:

a gas operable assist device connectable to the release mechanism, said gas operable assist device including at least one of a compressed gas container and a pyrotechnic element; and a control circuit for activating said gas operable assist device when the deck lid is closed in response to an occurrence of at least one activating event, wherein said gas operable assist device comprises a pyrotechnic device.

45. The apparatus of claim 44, wherein said gas operable assist device includes a canister containing an explosive substance, which generates a high volume of gas when actuated.

46. The apparatus of claim 45, wherein the resultant gas generated by actuation of said explosive substance causes a mechanical element to move, thus exerting a force on a portion of the release mechanism to release the deck lid.

* * * * *

UNITED STATES PATENT AND TRADEMARK OFFICE

CERTIFICATE OF CORRECTION

PATENT NO. : 6,485,081 B1
APPLICATION NO. : 09/648560
DATED : November 26, 2002
INVENTOR(S) : Robert L. Bingle et al.

It is certified that error appears in the above-identified patent and that said Letters Patent is hereby corrected as shown below:

Column 50:
Line 56, “sand” should be --stand--.

Column 52:
Line 35, “malfinction” should be --malfunction--.

Column 53:
Line 26, Insert --according-- after “interpreted”.

Column 57:
Line 44, Claim 24, “lease” should be --least--.

Signed and Sealed this

Seventeenth Day of April, 2007

JON W. DUDAS
*Director of the United States Patent and Trademark Office*